United States Patent
Satoh et al.

(10) Patent No.: US 7,208,559 B2
(45) Date of Patent: Apr. 24, 2007

(54) ETHYLENED POLYMER AND MOLDED OBJECT OBTAINED THEREFROM

(75) Inventors: Yasuo Satoh, Sodegaura (JP); Mamoru Takahashi, Sodegaura (JP); Hideki Bando, Sodegaura (JP); Yoshiho Sonobe, Sodegaura (JP); Yasushi Nakayama, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/539,038

(22) PCT Filed: Dec. 15, 2003

(86) PCT No.: PCT/JP03/16660

§ 371 (c)(1),
(2), (4) Date: Jun. 15, 2005

(87) PCT Pub. No.: WO2004/060932

PCT Pub. Date: Jul. 22, 2004

(65) Prior Publication Data

US 2006/0135712 A1 Jun. 22, 2006

(30) Foreign Application Priority Data

Dec. 27, 2002 (JP) ............................ 2002-381141
Dec. 27, 2002 (JP) ............................ 2002-381142

(51) Int. Cl.
*C08F 10/08* (2006.01)
*C08F 10/02* (2006.01)

(52) U.S. Cl. ................ 526/348.6; 526/348; 526/348.2; 526/348.5; 526/348.3; 526/352.2; 526/160; 526/170; 526/142; 526/141; 526/143; 526/147; 528/396; 502/129; 502/125; 502/123; 502/124

(58) Field of Classification Search ................ 528/396; 526/348, 160, 170, 143, 141, 147, 348.6, 526/348.2, 348.5, 348.3, 142; 502/129, 125, 502/123, 124
See application file for complete search history.

(56) References Cited

U.S. PATENT DOCUMENTS

| | | | |
|---|---|---|---|
| 5,798,427 A | 8/1998 | Foster et al. | |
| 5,916,988 A | 6/1999 | Tsutsui et al. | |
| 6,284,699 B1 * | 9/2001 | Ohgane et al. | 502/103 |
| 6,528,596 B2 * | 3/2003 | Takaoki et al. | 526/113 |
| 6,586,356 B2 * | 7/2003 | Takaoki et al. | 502/155 |
| 6,870,015 B2 * | 3/2005 | Oshima et al. | 526/114 |
| 6,914,108 B2 * | 7/2005 | Takaoki et al. | 526/89 |
| 7,022,782 B2 * | 4/2006 | Ogane | 526/160 |
| 2004/0210004 A1 | 10/2004 | Takahashi et al. | |

FOREIGN PATENT DOCUMENTS

| | | |
|---|---|---|
| EP | 0 452 920 A2 | 10/1991 |
| JP | 2-276807 A | 11/1990 |
| JP | 4-213309 A | 8/1992 |
| JP | 6-65443 A | 3/1994 |
| JP | 6-172594 A | 6/1994 |
| JP | 8/34819 A | 2/1996 |
| JP | 8/311260 A | 11/1996 |
| JP | 8-319313 A | 12/1996 |
| JP | 9-249707 A | 9/1997 |
| JP | 11-166083 A | 6/1999 |
| WO | WO-93/08221 A2 | 4/1993 |

* cited by examiner

*Primary Examiner*—Ling-Sui Choi
*Assistant Examiner*—Rip A. Lee
(74) *Attorney, Agent, or Firm*—Birch, Stewart, Kolasch & Birch, LLP

(57) ABSTRACT

An ethylene-based polymer which is an ethylene/C4 to C10 α-olefin copolymer and satisfies the following requirements [k1] to [k3]: [k1] melt flow rate (MFR) under a loading of 2.16 kg at 190° C. is in the range of 1.0 to 50 g/10 minutes; [k2] LNR defined as a scale of neck-in upon film molding is in the range of 0.6 to 1.4; and [k3] take-up speed at break [DS (m/min)] at 160° C. and melt flow rate (MFR) satisfy the following relationship (Eq-1): $12 \times MFR^{0.577} \leq DS \leq 165 \times MFR^{0.577}$ (Eq-1), and a thermoplastic resin composition containing the ethylene-based polymer, provide a molded product, preferably a film, excellent in moldability and mechanical strength.

The ethylene-based polymer can be efficiently obtained by polymerization in the presence of an olefin polymerization catalyst formed from a solid carrier, (A) a solid transition metal catalyst component obtained by contacting (a) a compound of a transition metal of the group 4 in the periodic table, containing at least one ligand having a cyclopentadienyl skeleton, (b) an organoaluminum oxy compound, (c) a multifunctional organic halide, and if necessary (d) an organoaluminum compound, and if necessary (B) organoaluminum compound.

10 Claims, 4 Drawing Sheets

[Fig.1]
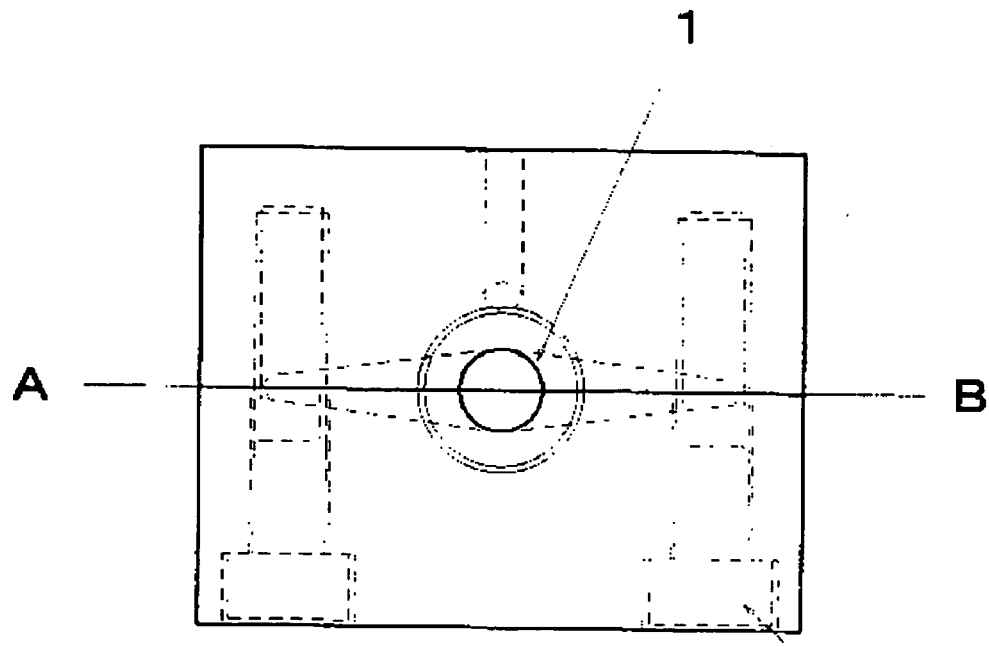
[Fig.2]
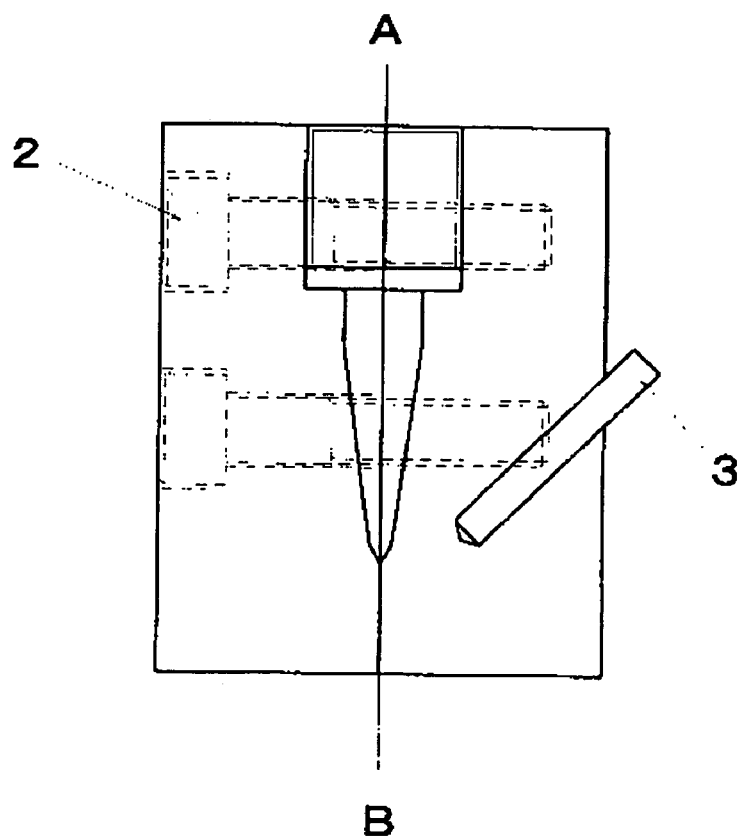

[Fig.3]
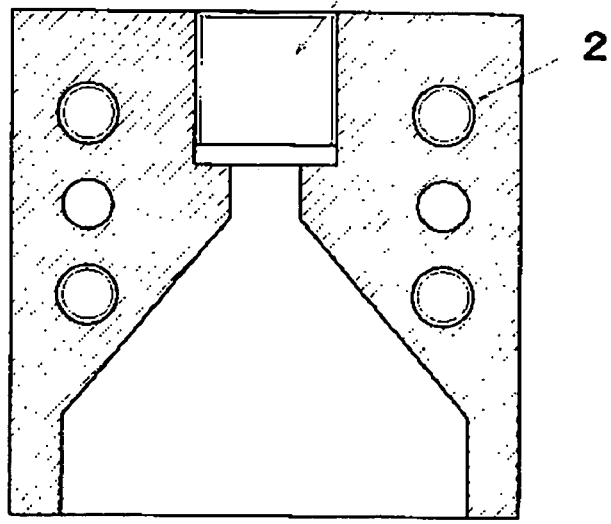
[Fig.4]
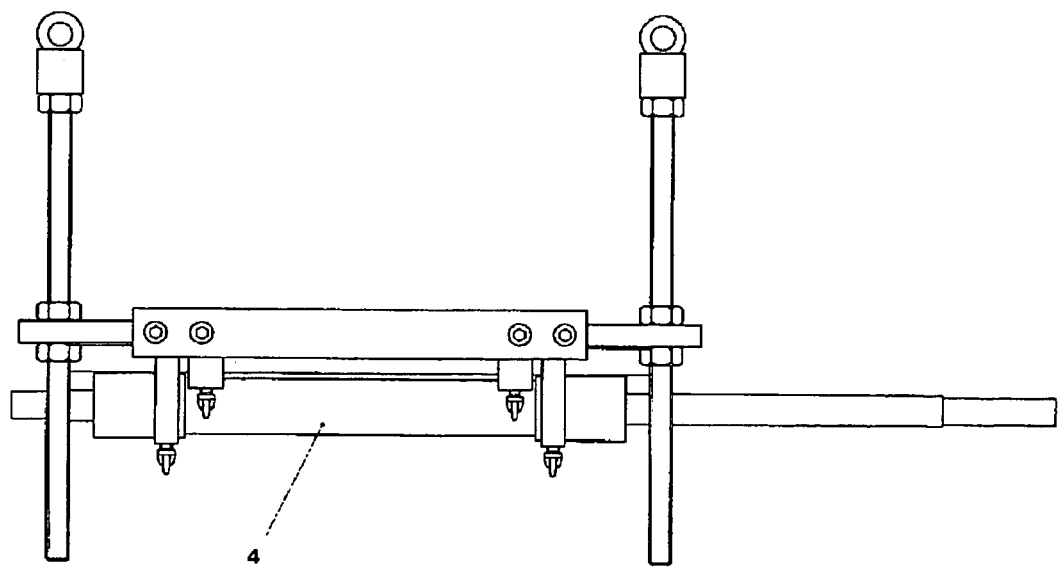

[Fig.5]
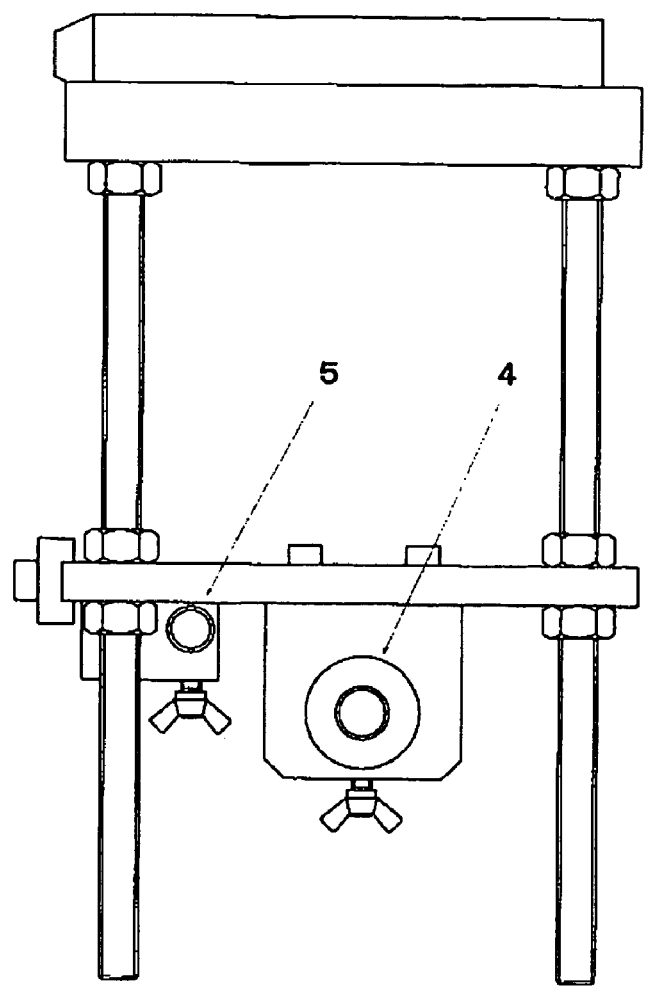
[Fig.6]
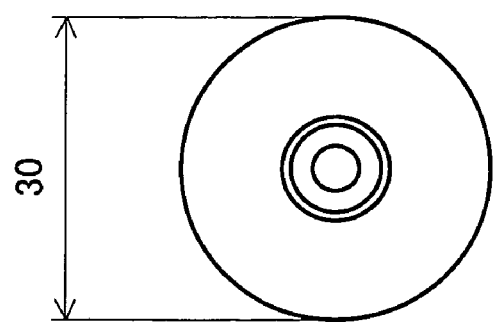

[Fig.7]
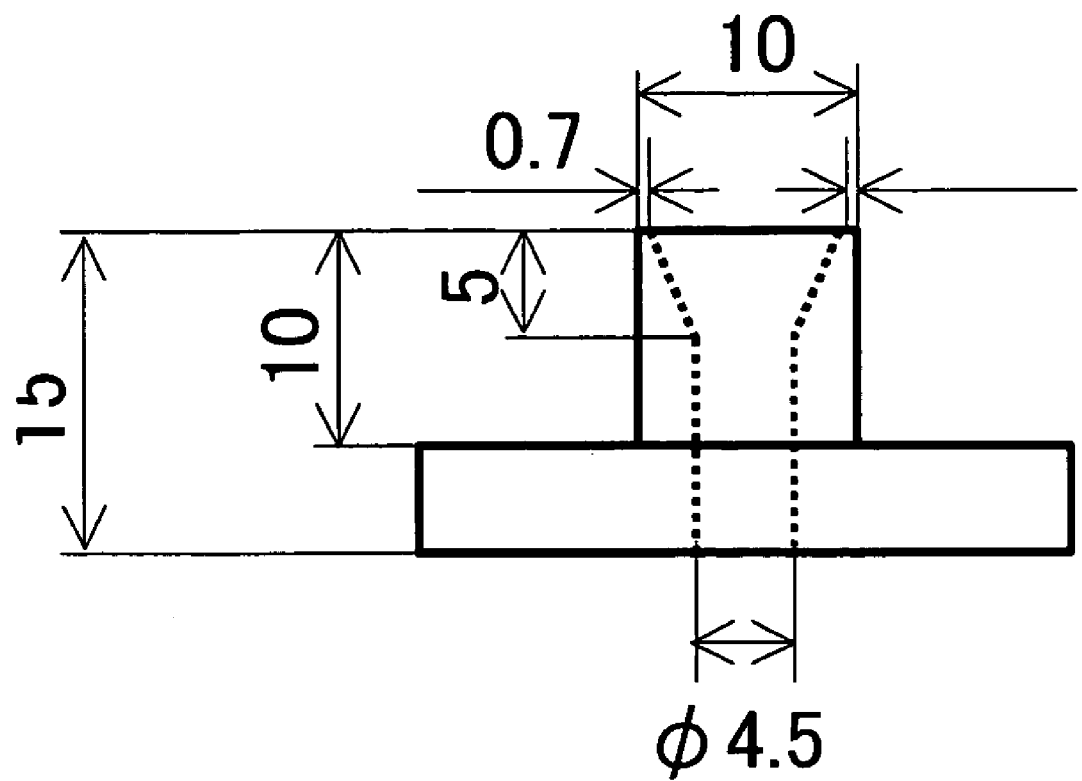

ETHYLENED POLYMER AND MOLDED OBJECT OBTAINED THEREFROM

TECHNICAL FIELD

The present invention relates to a novel ethylene-based polymer superior in moldability and mechanical strength to conventionally known ethylene-based polymers, a thermoplastic resin composition containing the ethylene-based polymer, and a molded product, preferably a film, obtained from the ethylene-based polymer and the thermoplastic resin composition. The present invention also relates to the ethylene-basedpolymer obtained from a specific olefin polymerization catalyst.

BACKGROUND ART

Ethylene-based polymers are formed by various molding methods and subjected to various applications. Characteristics required of the ethylene-based polymer vary depending on the molding method and applications. For example, when a cast film is to be formed in T-die molding, there arises neck-in wherein the edge of the film is shrunk in a direction toward the center. When neck-in occurs, the film width is decreased and simultaneously the film edge is thicker than the film center, thus reducing the product yield. To minimize neck-in, an ethylene-based polymer having high melt tension relative to molecular weight should be selected. This property is also necessary for preventing sagging or rupture in blow molding or for preventing bubble tremble or rupture in inflation film.

High-pressure low-density polyethylene is used in films and hollow containers because it is superior in moldability with high melt tension to an ethylene-based polymer produced using a Ziegler catalyst. However, the high-pressure low-density polyethylene has a complicated long-chain branched structure, and is thus expected to be inferior in mechanical strength such as tensile strength, tear strength or impact resistance. For the same reason, it is expected to be inferior in high-speed film processability in T-die molding.

The ethylene-based polymer obtained by using a metallocene catalyst among the Ziegler catalysts is excellent in mechanical strength such as tensile strength, tear strength or impact resistance but is inferior in melt tension, and is thus expected to exhibit a deterioration in moldability such as significant neck-in.

As an ethylene-based polymer excellent in moldability and mechanical strength, a composition comprising high-pressure low-densitypoly ethylene and an ethylene-based polymer obtained by using a metallocene catalyst is proposed for example in Japanese Patent Publication No. H06-65443 etc. However, when the content of high-pressure low-density polyethylene is low, the composition does not sufficiently improve melt tension, and is thus expected to exhibit a deterioration in moldability, such as significant neck-in in T-die molding. When the content of high-pressure low-density polyethylene is high, the composition is expected to be inferior in mechanical strength such as tensile strength, tear strength or impact resistance.

To solve the problem, various ethylene-based polymers having long branches introduced into them have been disclosed.

Japanese Patent Publication No. H02-276807 discloses an ethylene-based polymer obtained by solution polymerization in the presence of a catalyst consisting of ethylene bis(indenyl) hafnium dichloride and methyl alumoxane, Japanese Patent Publication No. H04-213309 discloses an ethylene-based polymer obtained by gaseous phase polymerization in the presence of a catalyst comprising ethylene bis(indenyl) zirconium dichloride and methyl alumoxane carried on silica, WO93/08221 discloses an ethylene-based polymer obtained by solution polymerization in the presence of a constraint geometrical catalyst, Japanese Patent Publication No. H08-311260 discloses an ethylene-based polymer obtained by gaseous phase polymerization in the presence of a catalyst comprising a racemate and mesoisomer of $Me_2Si(2-Me-Ind)_2$ and methyl alumoxane carried on silica, Japanese Patent Publication No. H08-34819 discloses an ethylene-based polymer obtained by slurry polymerization in the presence of a catalyst comprising bis(cyclopentadienyl) zirconium dichloride carried on chemically treated montmorilonite, and Japanese Patent Publication No. H08-319313 discloses an ethylene-based polymer obtained by polymerization using a catalyst consisting of $Cp^*Ti(OMe)_3$ and methyl alumoxane.

It is described that these ethylene-based polymers, as compared with long branch-free linear ethylene-based polymers, are excellent in moldability with improvement in melt tension, but neck-in is still significant so improvement in moldability is expected to be insufficient.

To improve moldability, an ethylene-based polymer having a small amount of a high-molecular component introduced into it is disclosed.

Japanese Patent Publication No. H06-172594 discloses an ethylene-based resin composition comprising a high-molecular component and a low-molecular component, obtained by using a Ziegler catalyst. This ethylene-based resin composition is expected to be inferior in moldability because of its too high molecular weight. Its compositional distribution is expected to be broad because of use of a Ziegler catalyst that is a multi-site catalyst.

Japanese Patent Publication No. H11-166083 discloses an ethylene-based resin composition comprising an ethylene-based polymer consisting of high- and low-molecular components obtained by using a Ziegler catalyst and an ethylene-based polymer obtained by using a Phillips catalyst. This ethylene-based resin composition is expected to be inferior in low-temperature sealability because of its too high density. Further the ethylene-based polymer obtained by using a Phillips catalyst is known to have many terminal vinyl groups. Accordingly, this ethylene-based resin composition is inferior in thermal stability. Further, its compositional distribution is expected to be broad because of use of a Ziegler catalyst that is a multi-site catalyst.

As described above, resin excellent in moldability and mechanical strength is hardly efficiently obtained on the basis of the conventional known techniques. In other words, if an ethylene-based polymer excellent in moldability and mechanical strength would appear, its industrial value would be extremely significant.

The present inventors made extensive study in view of these circumstances, and as a result, they found that an ethylene-based polymer excellent in high-speed film processability and mechanical strength with less neck-in in T-die molding is obtained by conferring a specific molecular structure and melt physical properties thereon, and the present invention was thereby completed.

DISCLOSURE OF INVENTION

The object of the present invention is to provide a novel ethylene-based polymer superior in moldability and mechanical strength to conventionally known ethylene-based polymers, a polymerization catalyst for efficiently producing the ethylene-based polymer, a thermoplastic resin composition containing the ethylene-based polymer, and a molded product, preferably a film, obtained from the ethylene-based polymer and the thermoplastic resin composition.

The ethylene-based polymer of the present invention is an ethylene/C4 to C10 α-olefin copolymer satisfying the following requirements [k1] to [k3] simultaneously:

[k1] melt flow rate (MFR) under a loading of 2.16 kg at 190° C. is in the range of 1.0 to 50 g/10 minutes;

[k2] LNR defined as a scale of neck-in upon film molding is in the range of 0.6 to 1.4; and

[k3] take-up speed at break [DS (m/min)] at 160° C. and melt flow rate (MFR) satisfy the following relationship (Eq-1):

$$12 \times MFR^{0.577} \leq DS \leq 165 \times MFR^{0.577} \quad (Eq-1)$$

Preferably, the ethylene-based polymer according to the present invention simultaneously satisfies the following requirements [m1] to [m3] in addition to the above requirements:

[m1] density [d] is in the range of 890 to 950 kg/m³;

[m2] ratio [MT/η* (g/Poise)] of melt tension [MT (g)] at 190° C. to shearing viscosity [η* (Poise)] at 200° C. at an angular velocity of 1.0 rad/sec. is in the range of $2.00 \times 10^{-4}$ to $9.00 \times 10^{-4}$; and

[m3] sum [(A+B) (/1000C)] of the number of methyl branches [A (1000C)] and the number of ethyl branches [B (/1000C)] measured by $^{13}$C-NMR is 1.4 or less.

Preferably, the ethylene-based polymer according to the present invention simultaneously satisfies any one of the following requirements [n1] to [n3] in addition to the above requirements:

[n1] ratio (Mz/Mw) of Z-average molecular weight (Mz) to weight-average molecular weight (Mw), measured by GPC, is 10 or more;

[n2] the number of terminal vinyl groups (V) per molecular chain calculated from the number of terminal vinyl groups [v (/1000C)] per 1000 carbon atoms measured by IR and number-average molecular weight (Mn) measured by GPC is not higher than 0.47 per molecular chain; and

[n3] melting-point maximum peak [Tm (° C.)] in DSC and density (d) satisfy the following relationship (Eq-2):

$$0.315 \times d - 200 \leq Tm \leq 0.315 \times d - 170 \quad (Eq-2)$$

The ethylene-based polymer of the present invention can be efficiently produced by polymerization in the presence of an olefin polymerization catalyst formed from a solid carrier, (A) a solid transition metal catalyst component obtained by contacting (a) a compound of a transition metal of the group 4 in the periodic table, containing at least one ligand having a cyclopentadienyl skeleton, (b) an organoaluminum oxy compound, (c) a multifunctional organic halide represented by the general formula (I), and if necessary (d) an organoaluminum compound, and if necessary (B) organoaluminum compound.

The ethylene-based polymer of the present invention can also be produced efficiently by polymerization in the presence of a pre-polymerized catalyst formed from a prepolymer having a z-average molecular weight of 6,000,000 or more by GPC and having a die-swell ratio of 1.4 or more, obtained by contacting ethylene, or ethylene and a C4 to C10 α-olefin, with the solid transition metal catalyst component, wherein 0.01 to 1000 g of the prepolymer is contained per g of the solid transition metal catalyst component, and if necessary (B) an organoaluminum compound.

The multifunctional organic halide (c) is preferably a compound represented by the following general formula (I):

where in R is a (o+p)-valent group containing at least one halogen atom, o and p each represent a positive integer satisfying the relationship (o+p)≧2, $Q^1$ and $Q^2$ each represent —OH, —NH$_2$ or —NLH whereupon L is an arbitrary group selected from a C1 to C20 hydrocarbon group, a C1 to C20 halogen-containing hydrocarbon group, a silicon-containing group, an oxygen-containing group, a sulfur-containing group, a nitrogen-containing group and a phosphorus-containing group, and L and R, N and R, or N and N may be bound to each other to form a ring.

The compound (a) of a transition metal of the group 4 in the periodic table, containing at least one ligand having a cyclopentadienyl skeleton, is preferably a compound represented by the following general formula (II), (III) or (IV):

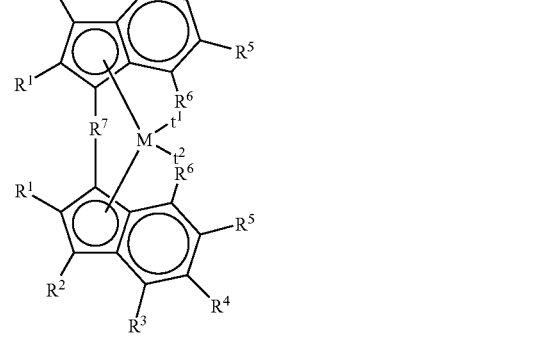

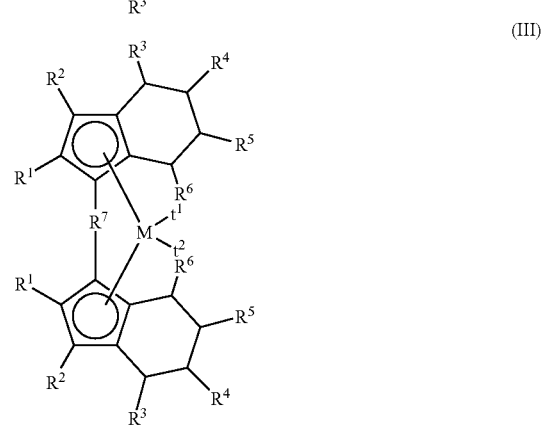

wherein $R^1$ to $R^6$ are independently selected from a hydrogen atom, a halogen atom, a C1 to C20 alkyl group, a C3 to C20 cycloalkyl group, a C2 to C20 alkenyl group, a C6 to C20 aryl group, and a C7 to C20 arylalkyl group, respectively, and can contain a silicon, halogen or germanium atom, and at least one pair of $R^3$ and $R^4$, $R^4$ and $R^5$, and $R^5$ and $R^6$ may be bound to each other to form a ring, $R^7$ is a divalent group having two ligands, and is a C1 to C20 hydrocarbon group, a C1 to C20 halogen-containing hydrocarbon group, a silicon-containing group or a germanium- or tin-containing group, and two substituent groups on the same carbon, silicon, germanium or tin atom may be bound to each other to form a ring, $t^1$ and $t^2$ independently represent a group selected from a hydrogen atom, a halogen atom, a C1 to C20 hydrocarbon group, a C1 to C20 halogen-containing hydrocarbon group, a silicon-containing group, an oxygen-containing group, a sulfur-containing group, a nitrogen-containing group and a phosphorus-containing group, respectively, and M is a transition metal selected from titanium, zirconium and hafnium,

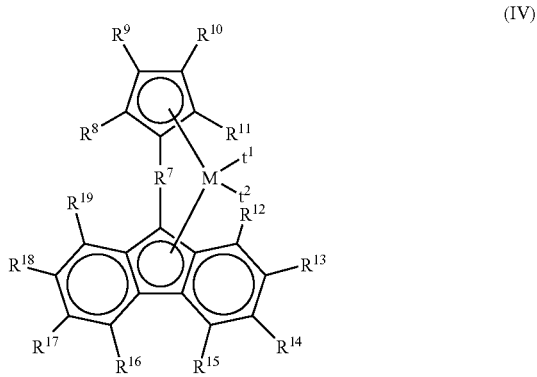

(IV)

wherein $R^7$, $t^1$, $t^2$ and M each have the same meaning as defined in formula (II), $R^8$ to $R^{19}$ independently represent a hydrogen atom, a halogen atom, a C1 to C20 alkyl group, a C3 to C20 cycloalkyl group, a C2 to C20 alkenyl group, a C6 to C20 aryl group or a C7 to C20 arylalkyl group, respectively, and can contain a silicon, halogen or germanium atom, and adjacent substituent groups out of $R^8$ to $R^{19}$ may be bound to each other to form a ring.

Further, the ethylene-based polymer according to the present invention can be blended with another thermoplastic resin to give a thermoplastic resin composition excellent in moldability and mechanical strength. The ethylene-based polymer according to the present invention, and a resin composition containing the ethylene-based polymer, can be processed to give a molded product, preferably a film, excellent in moldability and mechanical strength.

BRIEF DESCRIPTION OF DRAWINGS

FIG. 1 is a top view of a slit dice for measuring the neck-in ratio of a sample according to the present invention.
FIG. 2 is a side view of the slit dice.
FIG. 3 is a sectional view of the slit dice along line A–B.
FIG. 4 is a front view of a cooling roll and an air nozzle.
FIG. 5 is a side view of a cooling roll and an air nozzle.
FIG. 6 is a top view of a capillary rheometer for measuring the die-swell ratio according to the present invention.
FIG. 7 is a side view of the capillary rheometer.

BEST MODE FOR CARRYING OUT THE INVENTION

Hereinafter, the best mode for carrying out the invention is described in more detail by reference to the following 3 parts, that is, (1) the ethylene-based polymer according to the present invention, (2) a polymerization catalyst for producing the ethylene-based polymer, and (3) use of the ethylene-based polymer.

(1) The Ethylene-Based Polymer According to the Present Invention

The ethylene-based polymer according to the present invention is a copolymer of ethylene and a C4 to C10 α-olefin, preferably ethylene and a C4 to C10 α-olefin (provided that when butene-1 is used as a comonomer, a C6 to C10 α-olefin shall also be essential), more preferably ethylene and a C6 to C10 α-olefin. The C4 to C10 α-olefin used in copolymerization with ethylene includes 1-butene, 1-hexene, 4-methyl-1-pentene, 1-octene, 1-decene etc.

The ethylene-based polymer has the following properties [k1] to [k3].

[k1] The melt flow rate (MFR) is in the range of 1.0 to 50 g/10 minutes, preferably 2.0 to 50 g/10 minutes, more preferably 4.0 to 50 g/10 minutes.

When the melt flow rate (MFR) is not lower than 1.0 g/10 minutes, the shearing viscosity of the resulting ethylene-based polymer is not too high and is excellent in moldability. When the melt flow rate (MFR) is not higher than 50 g/10 minutes, the resulting ethylene-based polymer is excellent in tensile strength.

The melt flow rate (MFR) depends highly on molecular weight, and as the melt flow rate (MFR) is decreased, the molecular weight is increased, while as the melt flow rate (MFR) is increased, the molecular weight is decreased. It is known that the molecular weight of the ethylene-based polymer is determined by the compositional ratio of hydrogen to ethylene (hydrogen/ethylene) in the polymerization system (for example, Kazuo Soga, KODANSHA "CATALYTICOLEFINPOLYMERIZATION", p. 376 (1990)). Accordingly, hydrogen/ethylene is increased or decreased, whereby an ethylene-based polymer having a melt flow rate (MFR) in the upper and lower limits in the claims can be produced.

The melt flow rate (MFR) is measured under the conditions of 190° C. and 2.16 kg loading according to ASTM D1238-89.

[k2] LNR is in the range of 0.6 to 1.4, preferably 0.7 to 1.3, more preferably 0.8 to 1.2.

When LNR is 1.4 or less, the resulting ethylene-based polymer is excellent in neck-in. As used herein, neck-in refers to a reduction of the width of a product relative to the width of a dice lip opening in T-die molding.

LNR depends highly on the ratio of the molecular weight of the ethylene-based polymer polymerized in <former stage> to the molecular weight of the ethylene-based polymer polymerized in <latter stage> (<former stage> molecular weight/<latter stage> molecular weight) in the production process shown in Example 1; as (<former stage> molecular weight/<latter stage> molecular weight) is increased, LNR tends to be decreased, while as (<former stage> molecular weight/<latter stage> molecular weight) is decreased, LNR tends to be increased. It is known that the molecular weight of the ethylene-based polymer is determined by the compositional ratio of hydrogen to ethylene (hydrogen/ethylene) in the polymerization system (for example, Kazuo Soga, KODANSHA "CATALYTIC OLEFIN POLYMERIZATION", p. 376 (1990)). Accordingly, hydrogen/ethylene is regulated to increase or decrease (<former stage> molecular weight/<latter stage> molecular weight), whereby an ethylene-based polymer having LNR in the upper and lower limits in the claims can be produced.

LNR is determined by the ratio of neck-in upon molding of a measurement sample through a small slit dice into a film to neck-in upon molding of polyethylene (trade name: MIRASON M11, produced by high-pressure radical polymerization, commercially available from Mitsui Chemicals, Inc.) into a film in the same manner. LNR is measured by using an apparatus including (a) a capillary rheometer, (b) a slit dice, (c) a cooling roll, air nozzle, and (d) a wind-up roll.

The capillary rheometer (a) plays a role in extruding a molten resin. As the capillary rheometer, a capillary rheometer (Capillograph 1B (barrel diameter 10 mmϕ)) manufactured by Toyo Seiki Seisaku-sho, Ltd. was used under the conditions of a barrel temperature of 200° C. and a piston speed of 50 mm/min. 20 g measurement sample was used in each measurement, and the melting time was 6 minutes.

A top view of the slit dice (b) is shown in FIG. 1, a side view thereof is shown in FIG. 2, and an A–B sectional view is shown in FIG. 3. The slit dice, which is butted with fixing bolt (2), was fixed below a barrel of the capillary rheometer via an inserted nozzle and an adaptor connected to a joint (1), and heated by a plate heater to 200° C. ((3) in FIG. 2 is a part where a thermocouple is inserted).

A front view of the cooling roll, air nozzle (c) is shown in FIG. 4 and a side view thereof is shown in FIG. 5. The cooling roll (4) and air nozzle (5) are arranged below the slit dice and fixed such that the distance between the lower end of the slit dice and the upper end of the cooling roll (4) is 10 mm. The air nozzle is 26 cm in length, and is provided with air-blowing openings of 1 mm in diameter at 5.5 mm intervals. The flow rate of cooling air was under the conditions of 50 L/min.

The measurement sample was molded into a film by the above apparatus, and 1.75 m to 1.95 mm film was sampled from the terminal of the film. The neck-in (C) of the measurement sample is determined from a value obtained by subtracting the width of the sampled film from the width (40 mm) of the slit dice. The width of the film was measured at 3 arbitrary points, and the average width was used. The neck-in (d) of polyethylene (trade name: MIRASON M11) produced by high-pressure radical polymerization, commercially available from Mitsui Chemicals, Inc. is also determined in the same manner as above. LNR is determined by the following equation (Eq-3):

$$LNR = C/D \quad (Eq\text{-}3)$$

[k3] Take-up speed at break [DS (m/min)] at 160° C. and melt flow rate (MFR) satisfy the following relationship (Eq-1):

$$12 \times MFR^{0.577} \leq DS \leq 165 \times MFR^{0.577} \quad (Eq\text{-}1)$$

Preferably, the following relationship (Eq-4) is satisfied:

$$17 \times MFR^{0.577} \leq DS \leq 53 \times MFR^{0.577} \quad (Eq\text{-}4)$$

More preferably, the following relationship (Eq-5) is satisfied:

$$17 \times MFR^{0.577} \leq DS \leq 40 \times MFR^{0.577} \quad (Eq\text{-}5)$$

When the take-up speed at break (DS) is $17 \times MFR^{0.577}$ or more, the resulting ethylene-based polymer is excellent in high-speed film processability.

The take-up speed at break (DS) depends on the amount of the components in the ethylene-based polymer polymerized in <former stage> and the amount of the components in the ethylene-based polymer polymerized in <latter stage> (<former stage> component amount/(<latter stage> component amount), in the production process shown in Example 1; as (<former stage> component amount/(<latter stage> component amount) is increased, the take-up speed at break (DS) in the same melt flow rate (MFR) is decreased, while as (<former stage> component amount/(<latter stage> component amount) is decreased, the take-up speed at break (DS) in the same melt flow rate (MFR) is increased. Accordingly, the polymerization time in <former stage> and the polymerization time in <latter stage> in the production process shown in Example 1 are regulated to increase or decrease (<former stage> component amount/(<latter stage> component amount), whereby an ethylene-based polymer satisfying the relationship between take-up speed at break (DS) and melt flow rate (MFR) in the claims can be produced.

The take-up speed at break (DS) is determined by the take-up speed upon breakage of the ethylene-based polymer stretched by taking up the melted ethylene-based polymer at a varying take-up speed. In this measurement, a capillary rheometer (Capillograph 1B (barrel diameter, 10 mmϕ) manufactured by Toyo Seiki Seisaku-sho, Ltd.) was used. The measurement was conducted under conditions where the resin temperature was 160° C., the melting time was 6 minutes, the barrel diameter was 10 mmϕ, the extrusion speed was 15 mm/min., the capillary diameter was 2.00 mmϕ, the capillary length was 10 mm, the take-up speed was 15 to 400 m/min., and the take-up acceleration was 100 m/min². When bubbles etc. are present in the ethylene-based polymer, the take-up speed at break (DS) may be significantly reduced. Accordingly, the measurement was conducted 7 times, and the average of higher 3 take-up speeds among the measurements was indicated as the take-up speed at break (DS).

The ethylene-based polymer according to the present invention preferably satisfies the following requirements [m1] to [m3] in addition to the requirements described above.

[m1] Density (d) is in the range of 890 to 950 kg/m³, preferably 900 to 940 kg/m³, more preferably 905 to 935 kg/m³.

When the density (d) is not lower than 890 kg/m³, the resulting ethylene-based polymer is excellent in heat resistance, while when the density (d) is not higher than 950 g/m³, the resulting ethylene-based polymer is excellent in low-temperature sealing properties.

The density depends on the content of α-olefin in the ethylene-based polymer, and as the content of α-olefin is decreased, the density is increased, while the content of α-olefin is increased, the density is decreased. It is known that the content of α-olefin in the ethylene-based polymer is determined by the compositional ratio of α-olefin to ethylene (α-olefin/ethylene) in the polymerization system (for example, Walter Kaminsky, Makromol. Chem., 193, p. 606 (1992)). Accordingly, α-olefin/ethylene is increased or decreased, whereby an ethylene-based polymer having density in the upper and lower limits in the claims can be produced.

The density (d) was measured by thermally treating a measurement sample at 120° C. for 1 hour, then gradually cooling it linearly to room temperature over 1 hour and measuring its density in a density gradient tube.

[m2] Ratio [MT/η* (g/Poise)] of melt tension [MT (g)] to shearing viscosity [η* (Poise)] at 200° C. at an angular rate of 1.0 rad/sec. is in the range of $2.00 \times 10^{-4}$ to $9.00 \times 10^{-4}$, preferably $2.30 \times 10^{-4}$ to $9.00 \times 10^{-4}$, more preferably $3.00 \times 10^{-4}$ to $9.00 \times 10^{-4}$.

When MT/η* is not lower than $2.00 \times 10^{-4}$, the resulting ethylene-based polymer is excellent in neck-in.

MT/η* depends highly on the ratio of the molecular weight of the ethylene-based polymer polymerized in <former stage> to the molecular weight of the ethylene-based polymer polymerized in <latter stage> (<former stage> molecular weight/<latter stage> molecular weight), in the production process shown in Example 1; as (<former stage> molecular weight/<latter stage> molecular weight) is increased, MT/η* is increased, while as (<former stage> molecular weight/<latter stage> molecular weight) is decreased, MT/η* is decreased. It is known that the molecular weight of the ethylene-based polymer is determined by the compositional ratio of hydrogen to ethylene (hydrogen/ethylene) in the polymerization system (for example, Kazuo Soga, KODANSHA "CATALYTIC OLEFIN POLYMERIZATION", p. 376 (1990)). Accordingly, hydrogen/ethylene is regulated to increase or decrease (<former stage> molecular weight/<latter stage> molecular weight), whereby an ethylene-based polymer having MT/η* in the upper and lower limits in the claims can be produced.

The melt tension (MT) is determined by measuring the stress upon stretching a molten polymer at a constant speed. In this measurement, a MT measuring machine manufactured by Toyo Seiki Seisaku-sho, Ltd. was used. The measurement was conducted under conditions where the resin temperature was 190° C., the melting time was 6 minutes, the barrel diameter was 9.55 mmφ, the extrusion speed was 15 mm/min., the take-up speed was 10 to 20 m/min., the nozzle diameter was 2.095 mmφ, and the nozzle length was 8 mm.

The shearing viscosity (*η) at 200° C. at an angular velocity of 1.0 rad/sec. is determined by measuring the angular velocity [ω (rad/sec)] dispersion of shearing viscosity (*η) at a measurement temperature of 200° C. in the range of $0.02512 \leq \omega \leq 400$. In this measurement, Rheometer RDS-II manufactured by Rheometrix was used. In a sample holder, 25 mmφ parallel plate was used, and the sample thickness was about 1.8 mm. 5 points were measured per digit of ω. Distortion was selected suitably in the range of 10 to 30% so as not to be over torque so that torque could be detected in the measurement range. The sample used in measurement of shearing viscosity was prepared by press-molding the measurement sample to a thickness of 2 mm under the conditions of a preheating temperature of 190° C., a preheating time of 5 minutes, a heating temperature of 190° C., a heating time of 2 minutes, a heating pressure of 100 kg/cm$^2$, a cooling temperature of 20° C., a cooling time of 5 minutes and a cooling pressure of 100 kg/cm$^2$ with a press molding machine manufactured by Shinto Metal Industries, Ltd.

[m3] The sum [(A+B) (/1000C)] of the number of methyl branches [A (/1000C)] and the number of ethyl branches [B (1000C)] measured by $^{13}$C-NMR is 1.4 or less, preferably 1.0 or less, more preferably 0.6 or less. The number of methyl branches and the number of ethyl branches defined in the present invention is defined in terms of number per 1000 carbons as defined later.

It is known that when short branches such as methyl branches, ethyl branches etc. occur in the ethylene-based polymer, the short branches are incorporated into crystals to broaden the spacing of the crystals, thus lowering the mechanical strength of the resin (for example, Zenjiro Ohsawa, et al: Kobunshi No Jyumyoyosoku To Chojyumyoka Gijyutsu (Estimation of Longevity of Polymer and Techniques of Pronging Longevity), p. 481, N.T.S (2002)). Accordingly, when the sum (A+B) of the number of methyl branches and the number of ethyl branches is 1.4 or less, the resulting ethylene-based polymer is excellent in mechanical strength.

The number of methyl branches and the number of ethyl branches depend highly on the method of polymerizing the ethylene-based polymer, and the ethylene-based polymer obtained by high-pressure radical polymerization has more methyl and ethyl branches than those in an ethylene-based polymer obtained by coordination polymerization using a Ziegler catalyst system. In the coordination polymerization, the number of methyl branches and the number of ethyl branches in the ethylene-based polymer, depend highly on the compositional ratio among propylene, 1-butene, and ethylene (propylene/ethylene, 1-butene/ethylene) in the polymerization system. Accordingly, 1-butene/ethylene can be regulated to produce an ethylene-based polymer having the sum (A+B) of the number of methyl branches and the number of ethyl branches in the claims.

The number of methyl branches and the number of ethyl branches measured by $^{13}$C-NMR are determined as follows. Measurement was conducted with an integration frequency of 10,000 to 30,000 by using ECP500 nuclear magnetic resonance apparatus (1H: 500 MHz) manufactured by JEOL. As a chemical shift standard, a peak (29.97 ppm) of main-chain methylene was used. 250 to 400 mg PE sample and 3 ml mixture consisting of o-dichlorobenzene (special grade, manufactured by Wako Pure Chemical Industries, Ltd.) and benzene-d6 (manufactured by ISOTEC) in the 5/1 ratio (ratio by volume) were introduced into a commercial quartz glass tube of 10 mm in diameter for NMR measurement, then heated at 120° C. and dispersed uniformly. Assignment of each absorption in an NMR spectrum was conducted according to Kagaku no Ryoiki (Chemical Field), extra volume 141, NMR—General Remarks and Experimental Guide [I], pages 132 to 133. The number of methyl branches per 1,000 carbons was calculated from the integrated intensity ratio of the absorption (19.9 ppm) of methyl groups derived from methyl branches to the total integration of absorption appearing in the range of 5 to 45 ppm. The number of ethyl branches was calculated from the integrated intensity ratio of the absorption (10.8 ppm) of ethyl groups derived from ethyl branches to the total integration of absorption appearing in the range of 5 to 45 ppm.

The ethylene-based polymer according to the present invention preferably satisfies at least one of the following [n1] to [n3] in addition to the requirements described above.

[n1] The ratio (Mz/Mw) of Z-average molecular weight (Mz) to weight-average molecular weight (Mw), both of which were measured by GPC, is preferably 10 or more, preferably 20 or more, still more preferably 30 or more. When Mz/Mw is 10 or more, the resulting ethylene-based polymer has high melt tension and is excellent in moldability.

Mz/Mw is increased with an increase in the difference between the molecular weight of the ethylene-based polymer polymerized in <former stage> and the molecular weight of the ethylene-based polymer polymerized in <latter stage>, in the production process shown in Example 1, while Mz/Mw is decreased with a decrease in the difference therebetween. It is known that the molecular weight of the ethylene-based polymer is determined by the compositional ratio of hydrogen to ethylene (hydrogen/ethylene) in the polymerization system (for example, Kazuo Soga, KODANSHA "CATALYTIC OLEFIN POLYMERIZATION", p. 376 (1990)). Accordingly, hydrogen/ethylene is regulated to increase or decrease the ratio of the molecular weight of the ethylene-based polymer polymerized in <former stage> to the molecular weight of the ethylene-based polymer polymerized in <latter stage>, whereby an ethylene-based polymer having Mz/Mw in the upper and lower limits in the claims can be produced.

The Z-average molecular weight (Mz) and average-molecular weight (Mw) were measured in the following manner by using GPC-150C manufactured by Waters. As columns for separation, TSK gel GMH6-HT and TSK gel GMH6-HTL were used, and their column sizes were 7.5 mm in inner diameter and 600 mm in length respectively, and the column temperature was 140° C., and o-dichlorobenzene (Wako Pure Chemical Industries, Ltd.) was used as the mobile phase and transferred at 1.0 ml/min. with 0.025 wt % BHT (Takeda Chemical Industries, Ltd.) as an antioxidant. The concentration of a sample was 0.1 wt %, and the volume of the sample injected was 500 μL, and a differential refractometer was used as the detector. Standard polystyrene having a molecular weight of Mw≦1000 and Mw≧4×10⁶ was a product of Tosoh Corporation, and standard polystyrene having a molecular weight of 1000≦Mw≦4×10⁶ was a product of Pressure Chemical. The molecular weight is a value determined using universal calibration with PE as the standard.

[n2] The number of terminal vinyl groups (V) per molecular chain calculated from the number of terminal vinyl groups [v (/1000C)] per 1000 carbon atoms measured by IR and number-average molecular weight (Mn) measured by GPC is not higher than 0.47/molecular chain, preferably not higher than 0.30/molecular chain, still more preferably not higher than 0.16/molecular chain. When the number of terminal vinyl groups (V) per molecular chain is not higher than 0.47/molecular chain, the resulting ethylene-based polymer is excellent in thermal stability at the time of molding processing.

The number of terminal vinyl groups (V) per molecular chain depends highly on the compositional ratio of hydrogen to ethylene (hydrogen/ethylene) in the polymerization system, and as hydrogen/ethylene is increased, the number of terminal vinyl groups (V) per molecular chain is decreased, while as hydrogen/ethylene is decreased, the number of terminal vinyl groups (V) per molecular chain is increased. Accordingly, hydrogen/ethylene in <former stage> in the production process shown in Example 1 is increased or decreased, whereby an ethylene-based polymer having the number of terminal vinyl groups (V) per molecular chain in the claims can be produced.

Using the number-average molecular weight (Mn) measured by GPC and the number of terminal vinyl groups (v) per 1000 carbon atoms measured by IR, the number of terminal vinyl groups (V) per molecular chain is determined by the following equation (Eq-6):

$$V = Mn \times v / 14,000 \quad \text{(Eq-6)}$$

The number-average molecular weight (Mn) was measured in the same manner as described above by usingGPC-15oC manufactured by Waters.

The number (v) of terminal vinyl groups per 1000 carbon atoms was measured in the following manner by using an infrared spectrophotometer FT-IR 410 manufactured by Nippon Bunko Co., Ltd. About 0.3 g ethylene-based polymer was sandwiched with a Teflon sheet (0.1 mm in thickness), an aluminum plate (0.1 mm in thickness) and an iron plate (2 to 3 mm in thickness) in this order and pressed at a molding pressure of 50 to 100 kg/cm² at a heating temperature of 180° C. for a heating time of 3 minutes in a hydraulic molding machine and then cooled at room temperature for 1 minute at a pressure of 0 to 50 kg/cm² to prepare a measurement sample. Measurement was carried out in the measurement range of 5000 cm⁻¹ to 400 cm⁻¹ with a resolution of 2 cm⁻¹ and the integration frequency of 4 by a transmission method. From a calibration curve prepared using unsaturated bond-free polyethylene and polyethylene having all vinyl group at one end, the number of terminal vinyl groups per 1000 carbon atoms [v (/1000C)] was quantified using, as a key band, an absorption derived from terminal vinyl group detected at 910 cm⁻¹.

[n3] Melting-point maximum peak [Tm (° C.)] in DSC and density (d) satisfy the following relationship (Eq-2):

$$(0.315 \times d) - 200 \leq Tm \leq (0.315 \times d) - 170 \quad \text{(Eq-2)}$$

More preferably, the following relationship (Eq-7) is satisfied:

$$(0.315 \times d) - 200 \leq Tm \leq (0.315 \times d) - 173 \quad \text{(Eq-7)}$$

When the melting-point maximum peak (Tm) is lower than (0.315×d)−170, the resulting ethylene-based polymer is excellent in low-temperature sealing properties.

The melting-point maximum peak (Tm) depends not only density (d) but also on the distribution of α-olefins (compositional distribution) among molecular chains of the resulting ethylene-based polymer. When the density is the same, a broader compositional distribution gives rise to thicker crystals with molecular chains with less α-olefin, thus increasing the melting-point maximum peak (Tm), while with a narrower compositional distribution given, molecular chains with uniform α-olefin occur and thick crystals are not formed, and thus the melting-point maximum peak (Tm) is lowered. In the case of the Ziegler catalyst, the active site is heterogeneous, and thus the compositional distribution of the resulting ethylene-based polymer is known to be broad (for example, Kazuo Matsuura et al.: Polyethylene Gijutsu Dokuhon (Technical Book of Polyethylene), p. 20, (2001), Kogyo Chosakai Publishing Co., Ltd.). Accordingly, when the density of the ethylene-based polymer is the same, the melting-point maximum peak (Tm) is increased. In the case of the metallocene catalyst, the active site is homogeneous so that the compositional distribution of the resulting ethylene-based polymer is narrowed, and as a result, when the density is the same, the melting-point maximum peak (Tm) is decreased. The melting-point maximum peak (Tm) at the same density can also be changed by polymerization temperature. When the polymerization temperature is increased, the polymerization system tends to become uniform to narrow the compositional distribution. As a result, the melting-point maximum peak (Tm) at the same density is decreased. When the polymerization temperature is decreased, the polymerization systemtends to become heterogeneous to broaden the compositional distribution. As a result, the melting-point maximum peak (Tm) at the same density is increased. Accordingly, the polymerization temperature in <latter stage> in the production process shown in Example 1 is increased or decreased, whereby an ethylene-based polymer satisfying the relationship between the melting-point maximum peak (Tm) and the density (d) in the claims can be produced.

Using Pyris 1 manufactured by PERKIN ELMER, the melting-point maximum peak (Tm) was measured in the following manner. The sample used in measurement was prepared by press-molding a measurement sample to a thickness of 2 mm under the conditions of a preheating temperature of 190° C., a preheating time of 5 minutes, a heating temperature of 190° C., a heating time of 2 minutes, a heating pressure of 100 kg/cm², a cooling temperature of 20° C., a cooling time of 5 minutes and a cooling pressure of 100 kg/cm² with a press molding machine manufactured by Shinto Metal Industries, Ltd. The measurement sample, about 5 mg, was placed in an aluminum pan and measured in a nitrogen atmosphere (nitrogen: 20 ml/min) by the following temperature profiles [1] to [3]:

[1] The temperature was increased from30° C. at 10° C./min. to 200° C.,

[2] The temperature was kept at 200° C. for 5 minutes and then decreased at 20° C./min. to 30° C., and

[3] The temperature was increased from 30° C. at 10° C./min. to 200° C.

The temperature of the maximum peak in an endothermic curve obtained in [3] was indicated as the melting-point maximum peak (Tm (° C.)).

(2) Polymerization Catalyst for Producing the Ethylene-based Polymer

The ethylene-based polymer of the present invention can be produced in a single-stage polymerization system or in a multi-stage (two or more stage) polymerization system. As described above, usually a multi-stage (preferably two- or three-stage) polymerization reaction system is used in the multi-stage polymerization system. The multi-stage polymerization in the present invention is composed of a former-stage polymerization (also referred to hereinafter as "pre-polymerization" or "preliminary polymerization") as the first polymerization step and a latter-stage polymerization including second and subsequent stages (also referred to hereinafter as "polymerization"). An ethylene-based polymer obtained by (co)polymerizing ethylene, or ethylene and a C4 to C10 α-olefin, by using a prepolymer obtained under specific conditions (also referred to hereinafter as "preliminary polymer") as the polymerization catalyst also constitutes one aspect of the present invention. That is, the ethylene-based polymer of the present invention can be produced by (co)polymerizing ethylene, or ethylene and a C4 to C10 α-olefin, in the presence of any one of the following four polymerization catalysts (C-1) to (C-4), among which the third olefin polymerization catalyst (C-3) and the fourth olefin polymerization catalyst (C-4) are preferable, and particularly the fourth olefin polymerization catalyst (C-4) is a preferable catalyst.

The first olefin polymerization catalyst (C-1) according to the present invention comprises:

a solid carrier, (A) a solid transition metal catalyst component obtained by contacting (a) a compound of a transition metal of the group 4 in the periodic table, containing at least one ligand having a cyclopentadienyl skeleton, (b) an organoaluminum oxy compound, and (c) a multifunctional organic halide component represented by the following general formula (I):

$$(Q^1)_o—R—(Q^2)_p \quad (I)$$

wherein R is a (o+p)-valent group containing at least one halogen atom, o and p each represent a positive integer satisfying the relationship (o+p)≧2, $Q^1$ and $Q^2$ each represent —OH, —NH$_2$ or —NLH whereupon L is an arbitrary group selected from a C1 to C20 hydrocarbon group, a C1 to C20 halogen-containing hydrocarbon group, a silicon-containing group, an oxygen-containing group, a sulfur-containing group, a nitrogen-containing group and a phosphorus-containing group, and L and R, N and R, or N and N may be bound to each other to form a ring, and if necessary (B) An Organoaluminum Compound.

The second olefin polymerization catalyst (C-2) according to the present invention comprises a solid carrier, (A) a solid catalyst component obtained by contacting (a) a compound of a transition metal of the group 4 in the periodic table, containing at least one ligand having a cyclopentadienyl skeleton, (b) an organoaluminum oxy compound, (c) a multifunctional organic halide component represented by the general formula (I), and (d) an organoaluminum compound, and if necessary (B) an organoaluminum compound.

The third olefin polymerization catalyst (C-3) according to the present invention comprises a prepolymer obtained by pre-polymerizing the solid transition metal catalyst component constituting the olefin polymerization catalyst (C-1), with ethylene, or ethylene/α-olefin, wherein 0.01 to 1000 g prepolymer having a z-average molecular weight of 6,000,000 or more by GPC and having a die-swell ratio of 1.4 or more, is contained per g of the solid transition metal catalyst component, and if necessary (B) an organoaluminum compound.

The fourth olefin polymerization catalyst (C-4) according to the present invention comprises a prepolymer obtained by pre-polymerizing the solid transition metal catalyst component constituting the olefin polymerization catalyst (C-2), with ethylene, orethylene/α-olefin, wherein 0.01 to 1000 g prepolymer having a z-average molecular weight of 6,000,000 or more by GPC and having a die-swell ratio of 1.4 or more, is contained per g of the solid transition metal catalyst component, and if necessary (B) an organoaluminum compound.

Hereinafter, the olefin polymerization catalyst according to the present invention and a process for producing an olefin by using the olefin polymerization catalyst are specifically described. In the present invention, the term "polymerization" may be used to mean not only homopolymerization but also copolymerization, and the term "polymer" may be used to mean not only homopolymer but also copolymer.

First, the respective components used in the olefin polymerization catalyst of the present invention are described. In the present invention, (a) a compound of a transition metal of the group 4 in the periodic table, containing at least one ligand having a cyclopentadienyl skeleton, (also referred to hereinafter as component (a)) is a transition metal compound represented by the following general formula (V):

$$MG^1_x \quad (V)$$

wherein M is a transition metal atom selected from the group 4 in the periodic table, G represents a ligand coordinated with a transition metal atom, and at least one $G^1$ is a ligand having a cyclopentadienyl skeleton, $G^1$ other than the ligand having a cyclopentadienyl skeleton is a hydrocarbon group, an alkoxy group, an aryloxy group, a trialkylsilyl group, an SO$_3$J group (J is a C1 to C8 hydrocarbon group which may have a substituent group such as halogen), a halogen atom or a hydrogen atom, and x represents the valance of a transition metal. In the general formula (V), M is a transition metal atom selected from the group 4 in the periodic table, and is specifically a zirconium atom, titanium atom or hafnium atom, preferably a zirconium atom.

The ligand having a cyclopentadienyl skeleton can be exemplified by, for example, an alkyl-substituted cyclopentadienyl group such as cyclopentadienyl group, methyl cyclopentadienyl group, dimethyl cyclopentadienyl group, trimethyl cyclopentadienyl group, tetramethyl cyclopentadienyl group, pentamethyl cyclopentadienyl group, ethyl cyclopentadienyl group, methylethyl cyclopentadienyl group, propyl cyclopentadienyl group, methylpropyl cyclopentadienyl group, butyl cyclopentadienyl group, methylbutyl cyclopentadienyl group, hexyl cyclopentadienyl group etc.; or an indenyl group, 2-methyl indenyl, 2-ethyl indenyl group, 2-n-propyl indenyl group, 2-phenyl indenyl group, 4-phenyl indenyl group, 2-methyl-4-phenyl indenyl group, 2-methyl-4,6-di-i-propyl indenyl group, 2-methyl-4,5-benzoindenyl group, 4,5,6,7-tetrahydroindenyl group, fluorenyl group, 9-methyl fluorenyl group, 2, 7-dimethyl fluorenyl group, 2,7-di-t-butyl fluorenyl group etc. These groups may be substituted with a halogen atom, a trialkylsilyl group etc.

When the compound represented by the general formula (V) contains two or more ligands each having a cyclopentadienyl skeleton, two of the ligands each having a cyclopentadienyl skeleton may be bound to each other via methylene, diisopropyl methylene, methyl-t-butyl methylene, dicyclohexyl methylene, methylcyclohexyl methylene, methyl phenyl methylene, diphenyl methylene, methyl naphthyl methylene, dinaphthyl methylene, ethylene, propylene, isopropylidene, cyclopropylidene, cyclobutylidene, cyclopentylidene, cyclohexylidene, cycloheptylidene, bicycle[3.3.1] nonylidene, norbornylidene, adamantylidene, tetrahydronaphthylidene, dihydroindanylidene, chloroethylene group, chloromethylene group, silylene, methyl silylene, dimethyl silylene, diisopropyl silylene, methyl-t-butyl silylene, dicyclohexyl silylene, methyl cyclohexyl silylene, methyl phenyl silylene, diphenyl silylene, methyl naphthyl silylene, dinaphthyl silylene, cyclodimethylene silylene, cyclotrimethylene silylene, cyclotetramethylene silylene, cyclopentamethylene silylene, cycloxamethylene silylene, cycloheptamethylene silylene, or a germanium-containing group or a tin-containing group wherein in the above silicon-containing group, silicon was converted into germanium or tin.

The ligand $G^1$ other than the ligand having a cyclopentadienyl skeleton is specifically as follows. The hydrocarbon group represented by the ligand $G^1$ includes an alkyl group, cycloalkyl group, aryl group and aralkyl group, and specifically the alkyl group is exemplified by a methyl group, ethyl group, propyl group, isopropyl group, butyl group etc., the cycloalkyl group is exemplified by a cyclopentyl group, cyclohexyl group etc., the aryl group is exemplified by a phenyl group, tolyl group etc., and the aralkyl group is exemplified by a benzyl group, neophyl group etc. The alkoxy group is exemplified by a methoxy group, ethoxy group, butoxy group etc., the aryloxy group is exemplified by a phenoxy group etc., and the halogen is exemplified by fluorine, chlorine, bromine, iodine etc.

The ligand represented by $SO_3J$ includes, for example, a p-toluenesulfonato group, methanesulfonato group, trifluoromethanesulfonato group etc. The compound of a transition metal containing the ligand having a cyclopentadienyl skeleton, for example where the valance of the transition metal is 4, is represented more specifically by the following general formula (Va):

$$G^2_k G^3_l G^4_m G^5_n M \qquad (Va)$$

wherein M represents a transition metal atom selected from the group 4 in the periodic table, $G^2$ represents a group (ligand) having a cyclopentadienyl skeleton, $G^3$, $G^4$ and $G^5$ each represent a group (ligand) having a cyclopentadienyl skeleton or an alkyl group, a cycloalkyl group, an aryl group, an aralkyl group, an alkoxy group, an aryloxy group, a trialkylsilyl group, an $SO_3J$ group, a halogen atom or a hydrogen atom, k is an integer of 1 or more, and k+l+m+n=4.

In the present invention, the transition metal compound represented by the general formula (Va) above includes the compounds wherein at least one of $G^3$, $G^4$ and $G^5$ is a group (ligand) having a cyclopentadienyl skeleton, for example the compounds wherein each of $G^2$ and $G^3$ is a group (ligand) having a cyclopentadienyl skeleton. In such compounds, two of the groups (ligands) each having a cyclopentadienyl skeleton may be bound to each other via an alkylene group such as methylene, ethylene, propylene or the like, a substituted alkylene group such as diisopropyl methylene, methyl-t-butyl methylene, dicyclohexyl methylene, methylcyclohexyl methylene, methyl phenyl methylene, diphenyl methylene, methyl naphthyl methylene, dinaphthyl methylene, isopropylidene or the like, a cycloalkylene group such as cyclopropylidene, cyclobutylidene, cyclopentylidene, cyclohexylidene, cycloheptylidene, bicycle [3.3.1] nonylidene, norbornylidene, adamantylidene, tetrahydronaphthylidene, dihydroindanylidene or the like, a halogen-containing alkylene group such as chloroethylene, chloromethylene or the like, a (substituted) silylene group such as silylene, methyl silylene, dimethyl silylene, diisopropyl silylene, methyl-t-butyl silylene, dicyclohexyl silylene, methyl cyclohexyl silylene, methyl phenyl silylene, diphenyl silylene, methyl naphthyl silylene, dinaphthyl silylene, cyclodimethylene silylene, cyclotrimethylene silylene, cyclotetramethylene silylene, cyclopentamethylene silylene, cycloxamethylene silylene, cycloheptamethylene silylene or the like, or a germanium-containing group or a tin-containing group wherein in the above silicon-containing group, silicon was converted into germanium or tin. When each of $G^2$ and $G^3$ is a group (ligand) having a cyclopentadienyl skeleton, each of $G^4$ and $G^5$ is a group having a cyclopentadienyl skeleton or an alkyl group, a cycloalkyl group, an aryl group, an aralkyl group, an alkoxy group, an aryloxy group, a trialkylsilyl group, an $SO_3J$ group, a halogen atom or a hydrogen atom.

Among the transition metal compounds containing two or more groups (ligands) having a cyclopentadienyl skeleton, at least one component selected from the following components (a-1), (a-2) and (a-3) is preferably used.

The components (a-1) and (a-2) are transition metal compounds represented by the general formulae (II) and (III) respectively:

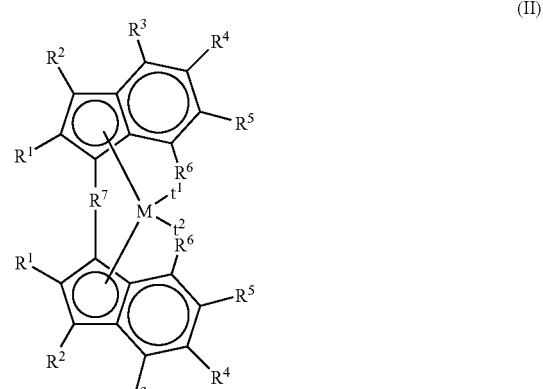

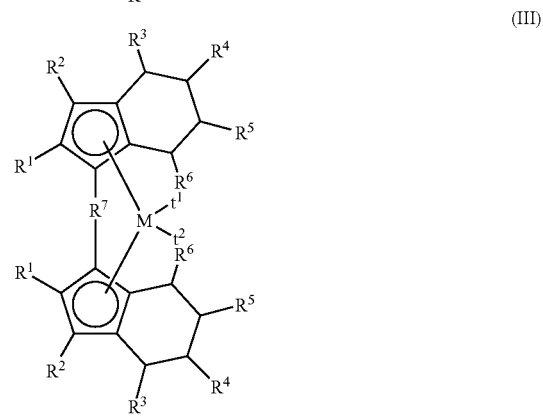

wherein $R^1$ to $R^6$ are independently selected from a hydrogen atom, a halogen atom, a C1 to C20 alkyl group, a C3 to C20 cycloalkyl group, a C2 to C20 alkenyl group, a C6 to C20 aryl group, and a C7 to C20 arylalkyl group, respectively, and can contain a silicon, halogen or germanium atom, and at least one pair of $R^3$ and $R^4$, $R^4$ and $R^5$, and $R^5$ and $R^6$ may be bound to each other to form a ring, $R^7$ is a divalent group bounding two ligands, and is a C1 to C20 hydrocarbon group, a C1 to C20 halogen-containing hydrocarbon group, a silicon-containing group or a germanium- or tin-containing group, and two substituent groups on the same carbon, silicon, germanium or tin atom may be bound to each other to form a ring, $t^1$ and $t^2$ independently represent a group selected from a hydrogen atom, a halogen atom, a C1 to C20 hydrocarbon group, a C1 to C20 halogen-containing hydrocarbon group, a silicon-containing group, an oxygen-containing group, a sulfur-containing group, a nitrogen-containing group and a phosphorus-containing group, respectively, and M is a transition metal selected from titanium, zirconium and hafnium.

Among the groups represented by $R^1$ to $R^6$ in the general formulae (II) and (III), the halogen atom includes chlorine, bromine, fluorine and iodine atoms; the C1 to C20 alkyl group includes, for example, a methyl group, ethyl group, n-propyl group, isopropyl group, n-butyl group, isobutyl group, s-butyl group, t-butyl group, n-pentyl group, neopentyl group, n-hexyl group, octyl group, nonyl group, dodecyl group, eicosyl group, norbornyl group, adamantyl group etc.; the C3 to C20 cycloalkyl group includes a cyclopropyl group, cyclobutyl group, cyclopentyl group, cyclohexyl group etc.; the C2 to C20 alkenyl group includes a vinyl group, propenyl group, cyclohexenyl group etc.; the C7 to C20 arylalkyl group includes benzyl, phenylethyl, phenylpropyl etc.; and the C6 to C20 aryl group includes phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenarenyl, aceanthrenyl, tetrahydronaphthyl, indanyl, biphenylyl etc.

The halogen-containing group represented by $R^1$ to $R^6$ includes groups wherein in the above-mentioned alkyl group, cycloalkyl group, alkenyl group, arylalkyl group and aryl group, one or more hydrogen atoms were replaced by suitable halogen atoms.

The silicon- or germanium-containing group includes groups wherein in the above-mentioned alkyl group, cycloalkyl group, alkenyl group, arylalkyl group and aryl group, one or more carbon atoms were replaced by silicon or germanium atoms.

$R^1$ to $R^6$ may be the same or different from one another, and at least one pair of adjacent groups, that is, at least one pair of $R^3$ and $R^4$, $R^4$ and $R^5$, and $R^5$ and $R^6$ may be bound to each other to form a ring. The indenyl group having formed such a ring includes, for example, 4,5-benzoindenyl group, 5,6-benzoindenyl group, 6,7-benzoindenyl group, α-acenaphthoindenyl group, and C1 to C10 alkyl-substituted derivatives thereof.

$R^7$ is a divalent group having two ligands, and the C1 to C20 hydrocarbon group represented by $R^7$ includes an alkylene group such as methylene, ethylene, propylene etc., a substituted alkylene group such as diisopropyl methylene, methyl-t-butyl methylene, dicyclohexylmethylene, methylcyclohexylmethylene, methyl phenyl methylene, diphenyl methylene, methyl naphthyl methylene, dinaphthyl methylene, isopropylidene etc., and a cycloalkylene group such as cyclopropylidene, cyclobutylidene, cyclopentylidene, cyclohexylidene, cycloheptylidene, bicycle[3.3.1] nonylidene, norbornylidene, adamantylidene, tetrahydronaphthylidene, dihydroindanylidene etc., and the C1 to C20 halogen-containing hydrocarbon group includes groups wherein in the above hydrocarbon group, one or more hydrogen atoms were replaced by suitable halogen atoms.

The C1 to C20 silicon-containing group includes (substituted) silylene groups such as silylene, methyl silylene, dimethyl silylene, diisopropyl silylene, methyl-t-butyl silylene, dicyclohexyl silylene, methylcyclohexyl silylene, methylphenyl silylene, diphenyl silylene, methyl naphthyl silylene, dinaphthyl silylene, cyclodimethylene silylene, cyclotrimethylene silylene, cyclotetramethylene silylene, cyclopentamethylene silylene, cyclohexamethylene silylene, cycloheptamethylene silylene etc., and the germanium- or tin-containing group includes groups wherein in the above silicone-containing group, silicone was replaced by germanium or tin.

$t^1$ and $t^2$ independently represent a group selected from a hydrogen atom, a halogen atom, a C1 to C20 hydrocarbon group, a C1 to C20 halogen-containing hydrocarbon group, a silicon-containing group, an oxygen-containing group, a sulfur-containing group, a nitrogen-containing group and a phosphorus-containing group, respectively. The halogen atom includes chlorine, bromine, fluorine and iodine atoms, and the C1 to C20 hydrocarbon group includes, for example, an alkyl group such as a methyl group, ethyl group, n-propyl group, isopropyl group, n-butyl group, isobutyl group, t-butyl group, n-hexyl group, n-octyl group, n-decyl group etc., an aryl group such as a phenyl group, 1-naphthyl group, 2-naphthyl group etc., and an aralkyl group such as a benzyl group, and the C1 to C20 halogen-containing hydrocarbon group includes groups wherein in the above hydrocarbon group, one or more hydrogen atoms were replaced by suitable halogen atoms, for example a trifluoromethy group. The silicon-containing group includes a trimethyl silyl group, dimethyl (t-butyl) silyl group etc., the oxygen-containing group includes a methoxy group, ethoxy group etc., the sulfur-containing group includes a thiol group, sulfonic acid group etc., the nitrogen-containing group includes a dimethyl amino group etc., and the phosphorus-containing group includes a phenyl phosphine group etc. $t^1$ and $t^2$ maybe the same or different from each other.

The transition metal compounds as components (a-1) and component (a-2) represented by the general formulae (I) and (II) respectively include, for example, compounds described in Japanese Patent Application No. 4-268308, Japanese Patent Application No. 5-306304, Japanese Patent Application No. 6-100579, Japanese Patent Application No. 6-157661, Japanese Patent Application No. 6-184179, Japanese Patent Application No. 6-345809, Japanese Patent Application No. 7-149815, Japanese Patent Application No. 7-188318, Japanese Patent Application No. 7-258321 etc.

Specific examples include ethylene bis(indenyl) zirconium dichloride, ethylene bis(2-methylindenyl) zirconium dichloride, ethylene bis(tetrahydroindenyl) zirconium dichloride, ethylene bis(2-methyltetrahydroindenyl) zirconium dichloride, 1,3-propylene bis(indenyl) zirconium dichloride, 1,3-propylene bis(2-methylindenyl) zirconium dichloride, 1,3-propylene bis(tetrahydroindenyl) zirconium dichloride, 1,3-propylene bis(2-methyltetrahydroindenyl) zirconium dichloride, 1,2-propylene bis(indenyl) zirconium dichloride, 1,2-propylene bis(2-methylindenyl) zirconium dichloride, 1,2-propylene bis(tetrahydroindenyl) zirconium dichloride, 1,2-propylene bis(2-methyltetrahydroindenyl) zirconium dichloride, 2,3-butylene bis(indenyl) zirconium dichloride, 2,3-butylene bis(2-methylindenyl) zirconium dichloride, 2,3-butylene bis(tetrahydroindenyl) zirconium dichloride, 2,3-butylene bis(2-methyltetrahydroindenyl) zirconium dichloride, dimethyl silylene bis(indenyl) zirconium dichloride, dimethyl silylene bis(2-methylindenyl) zirconium dichloride, dimethyl silylene bis(2-methyl-4-methylindenyl) zirconium dichloride, dimethyl silylene bis(2-methyl-4-ethylindenyl) zirconium dichloride, dimethyl silylene bis(2-methyl-4-propylindenyl) zirconium dichloride, dimethyl silylene bis(2-methyl-4-phenylindenyl) zirconium dichloride, dimethyl silylene bis(2-methyl-4-naphthylindenyl) zirconium dichloride, dimethyl silylene bis(2-methyl-4-anthracenylindenyl) zirconium dichloride, dimethyl silylene bis(2-methylbenz[e]indenyl) zirconium dichloride, dimethyl silylene bis(2-methylbenz[f]indenyl) zirconium dichloride, dimethyl silylene bis(2-ethylindenyl) zirconium dichloride, dimethyl silylene bis(2-ethyl-4-phenylindenyl) zirconium dichloride, dimethyl silylene bis(2-ethylbenz[e]indenyl) zirconium dichloride, dimethylsilylene bis(2,5-dimethyl-4-methylindenyl) zirconium dichloride, dimethyl silylene bis(2,5-dimethyl-4-ethylindenyl) zirconium dichloride, dimethylsilylene bis(2,5-dimethyl-4-propylindenyl) zirconium dichloride, dimethyl silylene bis(2,5-dimethyl-4-phenylindenyl) zirconium dichloride, dimethyl silylene bis(2,5-dimethyl-4-naphthylindenyl) zirconium dichloride, dimethyl silylene bis(2,5-dimethyl-4-anthracenylindenyl) zirconium dichloride, dimethyl silylene bis(2,6-dimethyl-4-methylindenyl) zirconium dichloride, dimethyl silylene bis(2,6-dimethyl-4-ethylindenyl) zirconium dichloride, dimethyl silylene bis(2,6-dimethyl-4-propylindenyl) zirconium dichloride, dimethyl silylene bis(2,6-dimethyl-4-phenylindenyl) zirconium dichloride, dimethyl silylene bis(2,6-dimethyl-4-naphthylindenyl) zirconium dichloride, dimethyl silylene bis(2,6-dimethyl-4-anthracenylindenyl) zirconium dichloride, dimethyl silylene bis(2,7-dimethyl-4-methylindenyl) zirconium dichloride, dimethyl silylene bis(2,7-dimethyl-4-ethylindenyl) zirconium dichloride, dimethyl silylene bis(2,7-dimethyl-4-propylindenyl) zirconium dichloride, dimethyl silylene bis(2,7-dimethyl-4-phenylindenyl) zirconium dichloride, dimethyl silylene bis(2,7-dimethyl-4-naphthylindenyl) zirconium dichloride, dimethyl silylene bis(2,7-dimethyl-4-anthracenylindenyl) zirconium dichloride, phenylmethyl silylene bis(indenyl) zirconium dichloride, phenylmethyl silylene bis(2-methylindenyl) zirconium dichloride, phenylmethyl silylene bis(2-methyl-4-methylindenyl) zirconium dichloride, phenylmethyl silylene bis(2-methyl-4-ethylindenyl) zirconium dichloride, phenylmethyl silylene bis(2-methyl-4-propylindenyl) zirconium dichloride, phenylmethyl silylene bis(2-methyl-4-phenylindenyl) zirconium dichloride, phenylmethyl silylene bis(2-methyl-4-naphthylindenyl) zirconium dichloride, phenylmethyl silylene bis(2-methyl-4-anthracenylindenyl) zirconium dichloride, phenylmethyl silylene bis(2-methylbenz[e]indenyl) zirconium dichloride, phenylmethyl silylene bis(2-methylbenz[f]indenyl) zirconium dichloride, phenylmethyl silylene bis(2-ethylindenyl) zirconium dichloride, phenylmethyl silylene bis(2-ethyl-4-phenylindenyl) zirconium dichloride, phenylmethyl silylene bis(2-ethylbenz[e]indenyl) zirconium dichloride, phenylmethyl silylene bis(2,5-dimethyl-4-methylindenyl) zirconium dichloride, phenylmethyl silylene bis(2,5-dimethyl-4-ethylindenyl) zirconium dichloride, phenylmethyl silylene bis(2,5-dimethyl-4-propylindenyl) zirconium dichloride, phenylmethyl silylene bis(2,5-dimethyl-4-phenylindenyl) zirconium dichloride, phenylmethyl silylene bis(2,5-dimethyl-4-naphthylindenyl) zirconium dichloride, phenylmethyl silylene bis(2,5-dimethyl-4-anthracenylindenyl) zirconium dichloride, phenylmethyl silylene bis(2,6-dimethyl-4-methylindenyl) zirconium dichloride, phenylmethyl silylene bis(2,6-dimethyl-4-ethylindenyl) zirconium dichloride, phenylmethyl silylene bis(2,6-dimethyl-4-propylindenyl) zirconium dichloride, phenylmethyl silylene bis(2,6-dimethyl-4-ethyl-4-phenylindenyl) zirconium dichloride, phenylmethyl silylene bis(2,6-dimethyl-4-naphthylindenyl) zirconium dichloride, phenylmethyl silylene bis(2,6-dimethyl-4-anthracenylindenyl) zirconium dichloride, phenylmethyl silylene bis(2,7-dimethyl-4-methylindenyl) zirconium dichloride, phenylmethyl silylene bis(2,7-dimethyl-4-ethylindenyl) zirconium dichloride, phenylmethyl silylene bis(2, 7-dimethyl-4-propylindenyl) zirconium dichloride, phenylmethyl silylene bis(2,7-dimethyl-4-phenylindenyl) zirconium dichloride, phenylmethyl silylene bis(2,7-dimethyl-4-naphthylindenyl) zirconium dichloride, phenylmethyl silylene bis(2,7-dimethyl-4-anthracenylindenyl) zirconium dichloride, and dibromide compounds, dialkyl compounds, diaralkyl compounds, disilyl compounds, dialkoxy compounds, dithiol compounds, disulfonic acid compounds, diamino compounds or diphosphinic compounds of the above metallocene compounds, or metallocene compounds wherein in the above compound, a central metal is titanium or hafnium.

The component (a-3) is a transition metal compound represented by the general formula (IV):

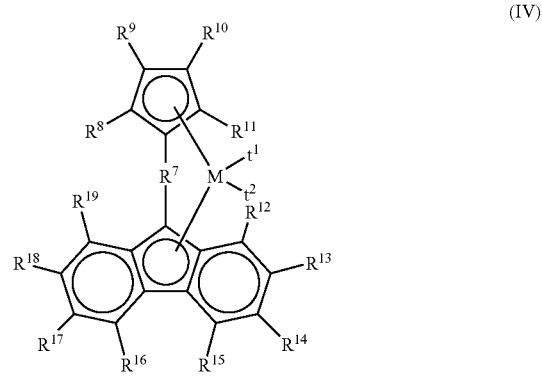

wherein $R^8$ to $R^{19}$ are independently selected from a hydrogen atom, a halogen atom, a C1 to C20 alkyl group, a C3 to C20 cycloalkyl group, a C2 to C20 alkenyl group, a C6 to C20 aryl group and a C7 to C20 arylalkyl group, respectively, and can contain a silicon, halogen or germanium atom, and adjacent substituent groups out of $R^{12}$ to $R^{19}$ may be bound to each other to form a ring, $R^7$ is a divalent group having two ligands, and is a C1 to C20 hydrocarbon group, a C1 to C20 halogen-containing hydrocarbon group, a silicon-containing group or a germanium- or tin-containing group, and two substituent groups on the same carbon, silicon, germanium or tin atom may be bound to each other to form a ring, $t^1$ and $t^2$ independently represent a group selected from a hydrogen atom, a halogen atom, a C1 to C20 hydrocarbon group, a C1 to C20 halogen-containirig hydrocarbon group, a silicon-containing group, an oxygen-containing group, a sulfur-containing group, a nitrogen-containing group and a phosphorus-containing group, respectively, and M is a transition metal selected from titanium, zirconium and hafnium.

Among the groups represented by $R^8$ to $R^{19}$ in the general formula (IV), the halogen atom includes chlorine, bromine, fluorine and iodine atoms; the C1 to C20 alkyl group includes, for example, a methyl group, ethyl group, n-propyl group, isopropyl group, n-butyl group, isobutyl group, s-butyl group, t-butyl group, n-pentyl group, neopentyl group, n-hexyl group, octyl group, nonyl group, dodecyl group, eicosyl group, norbornyl group, adamantyl group etc.; the C3 to C20 cycloalkyl group includes a cyclopropyl group, cyclobutyl group, cyclopentyl group, cyclohexyl group etc.; the C2 to C20 alkenyl group includes a vinyl group, propenyl group, cyclohexenyl group etc.; the C7 to C20 arylalkyl group includes benzyl, phenylethyl, phenylpropyl etc.; and the C6 to C20 aryl group includes phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenarenyl, aceanthrenyl, tetrahydronaphthyl, indanyl, biphenylyl etc. The halogen-containing group represented by $R^8$ to $R^{19}$ includes groups wherein in the above-mentioned alkyl group, cycloalkyl group, alkenyl group, arylalkyl group and aryl group, one or more hydrogen atoms were replaced by suitable halogen atoms. The silicon- or germanium-containing group includes groups wherein in the above-mentioned alkyl group, cycloalkyl group, alkenyl group, arylalkyl group and aryl group, one or more carbon atoms were replaced by silicon or germanium atoms. $R^8$ to $R^{19}$ may be the same or different from one another.

At least one adjacent pair out of $R^{12}$ to $R^{19}$ on the fluorene ring may be bound to each other to form a ring. The fluorenyl group having formed such a ring includes, for example, a benzofluorenyl group, dibenzofluorenyl group, octahydrodibenzofluorenyl group, octamethyloctahydrodibenzofluorenyl group etc. $R^7$, $t^1$ and $t^2$ each have the same meaning as defined in the general formula (II) and (III), and can be exemplified by groups similar to those described above.

Specific examples of the transition metal compound (a-3) represented by the general formula (IV) include isopropylidene (cyclopentadienyl) (fluorenyl) zirconium dichloride, isopropylidene (cyclopentadienyl) (2,7-di-tert-butylfluorenyl) zirconium dichloride, isopropylidene (cyclopentadienyl) (3,6-di-tert-butylfluorenyl) zirconium dichloride, isopropylidene (cyclopentadienyl) (octamethyloctahydridedibenzfluorenyl) zirconium dichloride, diphenylmethylene (cyclopentadienyl) (fluotenyl) zirconium dichloride, diphenylmethylene (cyclopentadienyl) (2,7-di-tert-butylfluorenyl) zirconium dichloride, diphenylmethylene (cyclopentadienyl) (3,6-di-tert-butylfluorenyl) zirconium dichloride, diphenylmethylene (cyclopentadienyl) (octamethyloctahydridedibenzfluorenyl) zirconium dichloride, cyclohexylidene (cyclopentadienyl) (fluorenyl) zirconium dichloride, cyclohexylidene (cyclopentadienyl) (2,7-di-tert-butylfluorenyl) zirconium dichloride, cyclohexylidene (cyclopentadienyl) (3,6-di-tert-butylfluorenyl) zirconium dichloride, cyclohexylidene (cyclopentadienyl) (octamethyloctahydridedibenzfluorenyl) zirconium dichloride, phenylmethylmethylene (cyclopentadienyl) (fluorenyl) zirconium dichloride, phenylmethylmethylene (cyclopentadienyl) (2,7-di-tert-butylfluorenyl) zirconium dichloride, phenylmethylmethylene (cyclopentadienyl) (3,6-di-tert-butylfluorenyl) zirconium dichloride, phenylmethylmethylene (cyclopentadienyl) (octamethyloctahydridedibenzfluorenyl) zirconium dichloride, isopropylidene (3-tert-butylcyclopentadienyl) (fluorenyl), zirconium dichloride, isopropylidene (3-tert-butylcyclopentadienyl) (2,7-di-tert-butylfluorenyl) zirconium dichloride, isopropylidene (3-tert-butylcyclopentadienyl) (3,6-di-tert-butylfluorenyl) zirconium dichloride, isopropylidene (3-tert-butylcyclopentadienyl) (octamethyloctahydridedibenzfluorenyl) zirconium dichloride, diphenylmethylene (3-tert-butylcyclopentadienyl) (fluorenyl) zirconium dichloride, diphenylmethylene (3-tert-butylcyclopentadienyl) (2,7-di-tert-butylfluorenyl) zirconium dichloride, diphenylmethylene (3-tert-butylcyclopentadienyl) (3,6-di-tert-butylfluorenyl) zirconium dichloride, diphenylmethylene (3-tert-butylcyclopentadienyl) (octamethyloctahydridedibenzfluorenyl) zirconium dichloride, cyclohexylidene (3-tert-butylcyclopentadienyl) (fluorenyl) zirconium dichloride, cyclohexylidene (3-tert-butylcyclopentadienyl) (2,7-di-tert-butylfluorenyl) zirconium dichloride, cyclohexylidene (3-tert-butylcyclopentadienyl) (3,6-di-tert-butylfluorenyl) zirconium dichloride, cyclohexylidene (3-tert-butylcyclopentadienyl) (octamethyloctahydridedibenzfluorenyl) zirconium dichloride, phenylmethylmethylene (3-tert-butylcyclopentadienyl) (fluorenyl) zirconium dichloride, phenylmethylmethylene (3-tert-butylcyclopentadienyl) (2,7-di-tert-butylfluorenyl) zirconium dichloride, phenylmethylmethylene (3-tert-butylcyclopentadienyl) (3,6-di-tert-butylfluorenyl) zirconium dichloride, phenylmethylmethylene (3-tert-butylcyclopentadienyl) (octamethyloctahydridedibenzfluorenyl) zirconium dichloride, isopropylidene (3-tert-butyl-5-methylcyclopentadienyl) (fluorenyl) zirconium dichloride, isopropylidene (3-tert-butyl-5-methylcyclopentadienyl) (2,7-di-tert-butylfluorenyl) zirconium dichloride, isopropylidene (3-tert-butyl-5-methylcyclopentadienyl) (3,6-di-tert-butylfluorenyl) zirconium dichloride, isopropylidene (3-tert-butyl-5-methylcyclopentadienyl) (octamethyloctahydridedibenzfluorenyl) zirconium dichloride, diphenylmethylene (3-tert-butyl-5-methylcyclopentadienyl) (fluorenyl) zirconium dichloride, diphenylmethylene (3-tert-butyl-5-methylcyclopentadienyl) (2,7-di-tert-butylfluorenyl) zirconium dichloride, diphenylmethylene (3-tert-butyl-5-methylcyclopentadienyl) (3,6-di-tert-butylfluorenyl) zirconium dichloride, diphenylmethylene (3-tert-butyl-5-methylcyclopentadienyl) (octamethyloctahydridedibenzfluorenyl) zirconium dichloride, cyclohexylidene (3-tert-butyl-5-methylcyclopentadienyl) (fluorenyl) zirconium dichloride, cyclohexylidene (3-tert-butyl-5-methylcyclopentadienyl) (2,7-di-tert-butylfluorenyl) zirconium dichloride, cyclohexylidene (3-tert-butyl-5-methylcyclopentadienyl) (3,6-di-tert-butylfluorenyl) zirconium dichloride, cyclohexylidene (3-tert-butyl-5-methylcyclopentadienyl) (octamethyloctahydridedibenzfluorenyl) zirconium dichloride, phenylmethylmethylene (3-tert-butyl-5-methylcyclopentadienyl) (fluorenyl) zirconium dichloride, phenylmethylmethylene (3-tert-butyl-5-methylcyclopentadienyl) (2,7-di-tert-butylfluorenyl) zirconium dichloride, phenylmethylmethylene (3-tert-butyl-5-methylcyclopentadienyl) (3,6-di-tert-butylfluorenyl) zirconium dichloride, phenylmethylmethylene (3-tert-butyl-5-methylcyclopentadienyl) (octamethyloctahydridedibenzfluorenyl) zirconium dichloride, and dibromide compounds, dialkyl compounds, diaralkyl compounds, disilyl compounds, dialkoxy compounds, dithiol compounds, disulfonic acid compounds, diamino compounds or diphosphinic compounds of the above metallocene compounds, or metallocene compounds wherein in the above compound, a central metal is titanium or hafnium.

Among the transition metal compounds represented by the general formulae (II), (III) and (IV), the transition metal compounds represented by the general formulae (II) and (III) are preferable, and the transition metal compounds represented by the general formula (II) are particularly preferable.

The organoaluminum oxy compound (b) used in the present invention (also referred to hereinafter as "component (b)") may be the conventionally known aluminoxane, or may be a benzene-insoluble organoaluminum oxy compound illustrated in Japanese Patent Application No. 2-78687.

The conventionally known aluminoxane can be produced for example by the following methods (i) to (iii):

(i) A method in which an organoaluminum compound such as trialkyl aluminum is added to and reacted with a hydrocarbon suspension of a compound containing adsorbed water or a salt containing water of crystallization, for example magnesium chloride hydrate, copper sulfate hydrate, aluminum sulfate hydrate, nickel sulfate hydrate or cerous chloride hydrate.

(ii) A method in which water, ice or water vapor is allowed to act directly on an organoaluminum compound such as trialkyl aluminum in a medium such as benzene, toluene, ethyl ether or tetrahydrofuran.

(iii) A method in which an organotin oxide such as dimethyltin oxide or dibutyltin oxide is reacted with an organoaluminum compound such as trialkyl aluminum in a medium such as decane, benzene or toluene.

In the above methods, the aluminoxane is recovered as a hydrocarbon solution. From the recovered solution of the aluminoxane, a solvent or unreacted organoaluminum compound is removed by distillation, and the resulting aluminoxane may be re-dissolved in a solvent.

Specifically, the organoaluminum compound used in preparing a lumoxane includes trialkyl aluminumsuchas trimethyl aluminum, triethyl aluminum, tripropyl aluminum, triisopropyl aluminum, tri-n-butyl aluminum, triisobutyl aluminum, tri-s-butyl aluminum, tri-t-butyl aluminum, tripentyl aluminum, trihexyl aluminum, trioctyl aluminum, tridecyl aluminum etc.; tricycloalkyl aluminum such as tricyclohexyl aluminum, tricyclooctyl aluminum etc.; dialkyl aluminum halide such as dimethyl aluminum chloride, diethyl aluminum chloride, diethyl aluminum bromide, diisobutyl aluminum chloride etc.; dialkyl aluminum hydride such as diethyl aluminum hydride, diisobutyl aluminumhydride etc.; dialkyl aluminum alkoxide such as dimethyl aluminum methoxide, diethyl aluminum ethoxide etc.; and dialkyl aluminum aryloxide such as diethyl aluminum phenoxide etc.

Among these compounds, trialkyl aluminum and tricycloalkyl aluminum are particularly preferable. As the organoaluminum compound used in preparing alumoxane, isoprenyl aluminum represented by the following general formula (VI) can also be used.

$$(i-C_4H_9)_xAl_y(C_5H_{10})_z \qquad (VI)$$

wherein x, y and z each represents a positive number, and $z \geq 2x$.

The organoaluminum compounds described above are used singly or as a mixture thereof. The solvent used in production of aluminoxane includes aromatic hydrocarbons such as benzene, toluene, xylene, cumene and cymene, aliphatic hydrocarbons such as pentane, hexane, heptane, octane, decane, dodecane, hexadecane and octadecane, alicyclic hydrocarbons such as cyclopentane, cyclohexane, cyclooctane and methyl cyclopentane, petroleum fractions such as gasoline, kerosene and light oil, or halogenated products of the above-mentioned aromatic hydrocarbons, aliphatic hydrocarbons and alicyclic hydrocarbons, particularly chlorides and bromides thereof. In addition, ethers such as ethyl ether, tetrahydrofuran can also be used. Among these solvents, particularly the aromatic hydrocarbons are preferable.

The benzene-insoluble organoaluminum oxy compound that can be used in the present invention can be obtained by contacting a solution of alumoxane with water or an active hydrogen-containing compound, or by contacting the organoaluminum compound with water. In the benzene-insoluble organoaluminum oxy compound, its Al component dissolved in benzene at 60° C. is 10% or less, preferably 5% or less, more preferably 2% or less, in terms of Al atom, and the organoaluminum oxy compound is insoluble or sparingly soluble in benzene.

The above organoaluminum oxy compound (b) is usually commercially available or handled as a toluene solution. The organoaluminum oxy compound (b) used in the present invention may contain a small amount of an organic compound component of metal other than aluminum.

The (c) used in the present invention (also referred to hereinafter as "component (c)") is a multifunctional organic halide represented by the following general formula (I):

$$(Q^1)_o-R-(Q^2)_p \qquad (I)$$

wherein R is a (o+p)-valent group containing at least one halogen atom, o and p each represent a positive integer satisfying the relationship $(o+p) \geq 2$, $Q^1$ and $Q^2$ each represent —OH, —NH$_2$ or —NLH whereupon L is an arbitrary group selected from a C1 to C20 hydrocarbon group, a C1 to C20 halogen-containing hydrocarbon group, a silicon-containing group, an oxygen-containing group, a sulfur-containing group, a nitrogen-containing group and a phosphorus-containing group, and L and R, N and R, or N and N may be bound to each other to form a ring.

Among the groups represented by L in the substituent amino acid group—NLH represented by $Q^1$ and $Q^2$ in the general formula (I), the halogen atom includes chlorine, bromine, fluorine and iodine atoms, and the C1 to C20 hydrocarbon group includes, for example, an alkyl group such as methyl group, ethyl group, n-propyl group, isopropyl group, n-butyl group, isobutyl group, t-butyl group, n-hexyl group, n-decyl group etc., an aryl group such as phenyl group, 1-naphthyl group, 2-naphthyl group etc., and an aralkyl group such as benzyl group etc.

The C1 to C20 halogen-containing hydrocarbon group includes groups (for example, a trifluoromethyl group) wherein in the above-mentioned hydrocarbon group, one or more hydrogen atoms were replaced by suitable hydrogen atoms. The silicon-containing group includes a trimethyl silyl group, dimethyl (t-butyl) silyl group etc., the oxygen-containing group includes a methoxy group, ethoxy group etc., the sulfur-containing group includes a thiol group, sulfonic acid group etc., the nitrogen-containing group includes a dimethyl amino group etc., and the phosphorus-containing group includes a phenyl phosphine group etc.

As specific examples of the multifunctional organic halide represented by the above general formula (I), the OH—R—OH compound [R has the same meaning as defined in the general formula (I)] includes 3-fluorocatechol, 4-fluorocatechol, 3,4-difluorocatechol, 3,5-difluorocatechol, 3,6-difluorocatechol, 3,4,5-trifluorocatechol, 3,4,6-trifluorocatechol, tetrafluorocatechol, 3-(trifluoromethyl) catechol, 4-(trifluoromethyl) catechol, 3,4-di(trifluoromethyl) catechol, 3,5-di(trifluoromethyl) catechol, 3,6-di(trifluoromethyl) catechol, 3,4,5-tri(trifluoromethyl) catechol, 3,4,6-tri(trifluoromethyl) catechol, tetra(trifluoromethyl) catechol, 2-fluororesorcin, 4-fluororesorcin, 5-fluororesorcin, 2,4-difluororesorcin, 2,5-fluororesorcin, 4,5-difluororesorcin, 4,6-difluororesorcin, 5,6-difluororesorcin, 2,4,5-trifluororesorcin, 4,5,6-trifluororesorcin, tetrafluororesorcin, 2-(trifluoromethyl) resorcin, 4-(trifluoromethyl) resorcin, 5-(trifluoromethyl) resorcin, 2,4-di(trifluoromethyl) resorcin, 2,5-(trifluoromethyl) resorcin, 4,5-di(trifluoromethyl) resorcin, 4,6-di(trifluoromethyl) resorcin, 5,6-di(trifluoromethyl) resorcin, 2,4,5-tri(trifluoromethyl) resorcin, 4,5,6-tri(trifluoromethyl) resorcin, tetra (trifluoromethyl) resorcin, 2-fluorohydroquinone, 3-fluorohydroquinone, 2,3-difluorohydroquinone, 2,5-difluorohydroquinone, 2,6-difluorohydroquinone, 2,3,5-trifluorohydroquinone, 2,3,6-trifluorohydroquinone, tetrafluorohydroquinone, 2-(trifluoromethyl) hydroquinone, 3-(trifluoromethyl) hydroquinone, 2,3-di(trifluoromethyl) hydroquinone, 2,5-di(trifluoromethyl) hydroquinone, 2,6-di(trifluoromethyl) hydroquinone, 2,3,5-tri(trifluoromethyl) hydroquinone, 2,3,6-tri(trifluoromethyl) hydroquinone, tetra (trifluoromethyl) hydroquinone, 1,3-bis(2-hydroxyhexafluoroisopropyl) benzene, 1,4-bis(2-hydroxyhexafluoroisopropyl) benzene, 2-fluoro-1,5-dihydroxy naphthalene, 3-fluoro-1,5-dihydroxy naphthalene, 4-fluoro-1,5-dihydroxy naphthalene, 2,3-difluoro-1,5-dihydroxy naphthalene, 2,4-difluoro-1,5-dihydroxy naphthalene, 2,6-difluoro-1,5-dihydroxy naphthalene, 2,7-difluoro-1,5-dihydroxy naphthalene, 2,8-difluoro-1,5-dihydroxy naphthalene, 3,4-difluoro-1,5-dihydroxy naphthalene, 3,8-difluoro-1,5-dihydroxy naphthalene, 4,8-difluoro-1,5-dihydroxy naphthalene, 2,3,4-trifluoro-1,5-dihydroxy naphthalene, 2,3,6-trifluoro-1,5-dihydroxy naphthalene, 2,3,7-trifluoro-1,5-dihydroxy naphthalene, 2,3,8-trifluoro-1,5-dihydroxy naphthalene, 2,3,6,7-tetrafluoro-1,5-dihydroxy naphthalene, hexafluoro-1,5-dihydroxy naphthalene, 1-fluoro-2,6-dihydroxy naphthalene, 3-fluoro-2,6-dihydroxy naphthalene, 4-fluoro-2,6-dihydroxy naphthalene, 1,3-difluoro-2,6-dihydroxy naphthalene, 1,4-difluoro-2,6-dihydroxy naphthalene, 1,5-difluoro-2,6-dihydroxy naphthalene, 3,4-difluoro-2,6-dihydroxy naphthalene, 3,5-difluoro-2,6-dihydroxy naphthalene, 4,5-difluoro-2,6-dihydroxy naphthalene, 1,3,4-trifluoro-2,6-dihydroxy naphthalene, 1,3,5-trifluoro-2,6-dihydroxy naphthalene, 3,4,5-trifluoro-2,6-dihydroxy naphthalene, 1,3,4,5-tetrafluoro-2,6-dihydroxy naphthalene, hexafluoro-2,6-dihydroxy naphthalene, 2,3,4,5-tetrafluorobiphenol, 2,2',4, 4'-tetrafluoro-4,4'-biphenol, 2,2',3,3',4,4',5,5',6,6'-octafluoro-4,4'-biphenol, 4,4'-bis(2-hydroxyhexafluoroisopropyl) diphenyl, bis(2,3-difluoro-4-hydroxy) methane, bis(2,6-difluoro-4-hydroxy) methane, bis (3,5-difluoro-4-hydroxy) methane, bis(tetrafluoro-4-hydroxy) methane, 4,4'-bis(2-hydroxyhexafluoroisopropyl) diphenyl ether, 4,4'-isopropylidene bis(2,6-difluorophenol), tetrafluoroethylene glycol, hexafluoro-1,3-propane glycol, 2,2,3,3'-tetrafluoro-1,4-butane diol, octafluoro-1,4-butane diol, perfluoro-1,5-pentane diol, perfluoro-1,6-hexane diol, perfluoro-1,7-heptane diol, perfluoro-1,8-octane diol, and OH—R—OH compounds whose fluorine atom was replaced by a bromine atom or a chlorine atom.

The $H_2N$—R—$NH_2$ compound [R has the same meaning as defined in the general formula (I)] includes 2-amino-3-fluoroaniline, 2-amino-4-fluoroaniline, 2-amino-5-fluoroaniline, 2-amino-3,4-difluoroaniline, 2-amino-3,5-difluoroaniline, 2-amino-3,6-difluoroaniline, 2-amino-3,4,5-trifluoroaniline, 2-amino-3,4,6-trifluoroaniline, 2-amino-tetrafluoroaniline, 2-amino-3-(trifluoromethyl) aniline, 2-amino-4-(trifluoromethyl) aniline, 2-amino-3,4-di(trifluoromethyl) aniline, 2-amino-3,5-di(trifluoromethyl) aniline, 2-amino-3,6-di(trifluoromethyl) aniline, 2-amino-3,4,5-tri (trifluoromethyl) aniline, 2-amino-3,4,6-tri(trifluoromethyl) aniline, 2-amino-tetra(trifluoromethyl) aniline, 3-amino-2-fluoroaniline, 3-amino-4-fluoroaniline, 3-amino-5-fluoroaniline, 3-amino-2,4-difluoroaniline, 3-amino-2,5-fluoroaniline, 3-amino-4,5-difluoroaniline, 3-amino-4,6-difluoroaniline, 3-amino-5,6-difluoroaniline, 3-amino-2,4,5-trifluoroaniline, 3-amino-4,5,6-trifluoroaniline, 3-amino-tetrafluoroaniline, 3-amino-2-(trifluoromethyl) aniline, 3-amino-4-(trifluoromethyl) aniline, 3-amino-5-(trifluoromethyl) aniline, 3-amino-2,4-di(trifluoromethyl) aniline, 3-amino-2,5-(trifluoromethyl) aniline, 3-amino-4,5-di(trifluoromethyl) aniline, 3-amino-4,6-di(trifluoromethyl) aniline, 3-amino-5,6-di(trifluoromethyl) aniline, 3-amino-2, 4,5-tri(trifluoromethyl) aniline, 3-amino-4,5,6-tri(trifluoromethyl) aniline, 3-amino-tetra(trifluoromethyl) aniline, 4-amino-2-fluoroaniline, 4-amino-3-fluoroaniline, 4-amino-2,3-difluoroaniline, 4-amino-2,5-difluoroaniline, 4-amino-2,6-difluoroaniline, 4-amino-2,3,5-trifluoroaniline, 4-amino-2,3,6-trifluoroaniline, 4-amino-tetrafluoroaniline, 4-amino-2-(trifluoromethyl) aniline, 4-amino-3-(trifluoromethyl) aniline, 4-amino-2,3-di(trifluoromethyl) aniline, 4-amino-2, 5-di(trifluoromethyl) aniline, 4-amino-2,6-di(trifluoromethyl) aniline, 4-amino-2,3,5-tri(trifluoromethyl) aniline, 4-amino-2,3,6-tri(trifluoromethyl) aniline, 4-amino-tetra(trifluoromethyl) aniline, 2-amino-6-fluorobenzyl amine, 1,5-diamino-2-fluoronaphthalene, 1,5-diamino-3-fluoronaphthalene, 1,5-diamino-4-fluoronaphthalene, 1,5-diamino-2,3-difluoronaphthalene, 1,5-diamino-2,4-difluoronaphthalene, 1,5-diamino-2,6-difluoronaphthalene, 1,5-diamino-2,7-difluoronaphthalene, 1,5-diamino-2,8-difluoronaphthalene, 1,5-diamino-3,4-difluoronaphthalene, 1,5-diamino-3,8-difluoronaphthalene, 1,5-diamino-4,8-difluoronaphthalene, 1,5-diamino-2,3,4-trifluoronaphthalene, 1,5-diamino-2,3,6-trifluoronaphthalene, 1,5-diamino-2,3,7-trifluoronaphthalene, 1,5-diamino-2,3,8-trifluoronaphthalene, 1,5-diamino-2,3,6,7-tetrafluoronaphthalene, 1,5-diamino-hexafluoronaphthalene, 2,6-diamino-1-fluoronaphthalene, 2,6-diamino-3-fluoronaphthalene, 2,6-diamino-4-fluoronaphthalene, 2,6-diamino-1,3-difluoronaphthalene, 2,6-diamino-1,4-difluoronaphthalene, 2,6-diamino-1,5-difluoronaphthalene, 2,6-diamino-3,4-difluoronaphthalene, 2,6-diamino-3,5-difluoronaphthalene, 2,6-diamino-4,5-difluoronaphthalene, 2,6-diamino-1,3,4-trifluoronaphthalene, 2,6-diamino-1,3,5-trifluoronaphthalene, 2,6-diamino-3,4,5-trifluoronaphthalene, 2,6-diamino-1,3,4,5-tetrafluoronaphthalene, 2,6-diamino-hexafluoronaphthalene, 4-amino-4'-(N-methylamino)-2,3,4,5-tetrafluorobiphenyl, 4-amino-4'-(N-methylamino)-2,2',4,4'-tetrafluorobiphenyl, 4-amino-4'-(N-methylamino)-2,2',3,3',4,4',5,5',6,6'-octafluorobiphenyl, 2,2'-bis(trifluoromethyl)-4,4'-diaminobiphenyl, 3,3'-bis(trifluoromethyl)-4,4'-diaminobiphenyl, 4,4'-diaminooctafluorobiphenyl, bis(4-amino-2,3-difluorophenyl) methane, bis(4-amino-2,6-difluorophenyl) methane, bis(4-amino-3,5-difluorophenyl methane, bis(4-amino-tetrafluorophenyl) methane, 2,2-bis(3-amino-4-methylphenyl) hexafluoropropane, 2,2-bis[4-(4-aminophenyl)]-hexafluoropropane, 2,2-bis(4-aminophenyl) hexafluoropropane, 4,4'-bis(2-amino-hexafluoroisopropyl) diphenyl ether, 4,4'-isopropylidene bis(2,6-difluoroaniline), 2,4-diamino-6-(4-fluorophenyl) pyrimidine, 2,4-diamino-5-fluoroquinazoline, 4,4'-diaminooctafluorobiphenyl, tetrafluorosuccinamide, tetrafluoroethylene diamine, hexafluoro-1,3-propene diamine, 2,2',3,3'-tetrafluoro-1,4-butylene diamine, octafluoro-1,4-butylene diamine, decafluoro-1,5-pentene diamine, perfluoro-1,6-hexene diamine, perfluoro-1,7-heptene diamine, perfluoro-1,8-octene diamine, and $H_2N$—R—$NH_2$ compounds whose fluorine atom was replaced by a bromine atom or chlorine atom.

The HLN—R—NLH compound [R and L have the same meaning as defined in the general formula (I)] includes 3-fluoro-1,2-di(N-methylamino) benzene, 4-fluoro-1,2-di (N-methylamino) benzene, 3,4-difluoro-1,2-di(N-methylamino) benzene, 3,5-difluoro-1,2-di(N-methylamino) benzene, 3,6-difluoro-1,2-di(N-methylamino) benzene, 3,4,5-trifluoro-1,2-di(N-methylamino) benzene, 3,4,6-trifluoro-1, 2-di(N-methylamino) benzene, tetrafluoro-1,2-di(N-methylamino) benzene, 2-fluoro-1,3-di(N-methylamino) benzene, 4-fluoro-1,3-di(N-methylamino) benzene, 5-fluoro-1,3-di(N-methylamino) benzene, 2,4-difluoro-1,3-di(N-methylamino) benzene, 2,5-fluoro-1,3-di(N-methylamino) benzene, 4,5-difluoro-1,3-di(N-methylamino) benzene, 4,6-difluoro-1,3-di(N-methylamino) benzene, 5,6-difluoro-1,3-di(N-methylamino) benzene, 2,4,5-trifluoro-1,3-di(N-methylamino) benzene, 4,5,6-trifluoro-1,3-di(N-methylamino) benzene, tetrafluoro-1,3-di(N-methylamino) benzene, 2-fluoro-1,4-di(N-methylamino) benzene, 3-fluoro-1,4-di(N-methylamino) benzene, 2,3-difluoro-1,4-di(N-methylamino) benzene, 2,5-difluoro-1,4-di(N-methylamino) benzene, 2,6-difluoro-1,4-di(N-methylamino) benzene, 2,3,5-trifluoro-1,4-di(N-methylamino) benzene, 2,3,6-trifluoro-1,4-di(N-methylamino) benzene, tetrafluoro-1,4-di(N-methylamino) benzene, 2-fluoro-1,5-di(N-methylamino) naphthalene, 3-fluoro-1,5-di(N-methylamino) naphthalene, 4-fluoro-1,5-di(N-methylamino) naphthalene, 2,3-difluoro-1,5-di(N-methylamino) naphthalene, 2,4-difluoro-1,5-di(N-methylamino) naphthalene, 2,6-difluoro-1,5-di(N-methylamino) naphthalene, 2,7-difluoro-1,5-di(N-methylamino) naphthalene, 2,8-difluoro-1,5-di(N-methylamino) naphthalene, 3,4-difluoro-1,5-di(N-methylamino) naphthalene, 3,8-difluoro-1,5-di(N-methylamino) naphthalene, 4,8-difluoro-1,5-di(N-methylamino) naphthalene, 2,3,4-trifluoro-1,5-di(N-methylamino) naphthalene, 2,3,6-trifluoro-1,5-di(N-methylamino) naphthalene, 2,3,7-trifluoro-1,5-di(N-methylamino) naphthalene, 2,3,8-trifluoro-1,5-di(N-methylamino) naphthalene, 2,3,6,7-tetrafluoro-1,5-di(N-methylamino) naphthalene, hexafluoro-1,5-di(N-methylamino) naphthalene, 4,4'-di(N-methylamino)-2,3,4,5-tetrafluorobiphenyl, 4,4'-di(N-methylamino)-2,2',4,4'-tetrafluorobiphenyl, 4,4'-di(N-methylamino)-2,2',3,3',4,4',5,5',6,6'-octafluorobiphenyl, bis(4-(N-methylamino)-2,3-difluorophenyl) methane, bis((N-methylamino)-2,6-difluorophenyl) methane, bis(4-(N-methylamino)-3,5-difluorophenyl) methane, bis(4-(N-methylamino)-tetrafluorophenyl) methane, 4,4'-bis(2-(N-methylamino)-hexafluoroisopropyl) diphenyl ether, tetrafluoroethylene diamine, hexafluoro-1,3-propene diamine, 2,2',3,3'-hexafluoro-1,4-butylene diamine, octafluoro-1,4-butylene diamine, decafluoro-1,5-pentene diamine, perfluoro-1,6-hexene diamine, perfluoro-1,7-heptene diamine, perfluoro-1,8-octene diamine, 1,2-di(N-methylamino) tetrafluoroethane, 1,3-di(N-methylamino) hexafluoropropane, 1,4-di(N-methylamino)-2,2',3,3'-hexafluorobutane, 1,4-di(N-methylamino)-octafluorobutane, 1,5-di(N-methylamino)-decafluoropentane, 1,6-di(N-methylamino)-perfluorohexane, 1,7-di(N-methylamino)-perfluoropentane, 1,8-di(N-methylamino)-perfluorooctane, 5-fluorouracil, 6-fluorouracil, 1-fluoroxanthine, 3-fluoroxanthine, 7-fluoroxanthine, 3-fluoroadenine, 5-fluoromethyl uracil, 5-trifluoromethyl uracil, 6-fluoromethyl uracil, 1-fluoromethyl xanthine, 3-fluoromethyl xanthine, 7- fluoromethyl xanthine, 3- fluoromethyl adenine, and HLN—R—NLH compounds whose fluorine atom was replaced by a bromine atom or a chlorine atom.

The HO—R—NH$_2$ compound [R has the same meaning as defined in the general formula (I)] includes 2-amino-3-fluorophenol, 2-amino-4-fluorophenol, 2-amino-3,4-difluorophenol, 2-amino-3,5-difluorophenol, 2-amino-3,6-difluorophenol, 2-amino-3,4,5-trifluorophenol, 2-amino-3,4,6-trifluorophenol, 2-amino-tetrafluorophenol, 2-amino-3-(trifluoromethyl) phenol, 2-amino-4-(trifluoromethyl) phenol, 2-amino-3,4-di(trifluoromethyl) phenol, 2-amino-3,5-di(trifluoromethyl) phenol, 2-amino-3,6-di(trifluoromethyl) phenol, 2-amino-3,4,5-tri(trifluoromethyl) phenol, 2-amino-3,4,6-tri(trifluoromethyl) phenol, 2-amino-tetra(trifluoromethyl) phenol, 3-amino-2-fluorophenol, 3-amino-4-fluorophenol, 3-amino-5-fluorophenol, 3-amino-2,4-difluorophenol, 3-amino-2,5-fluorophenol, 3-amino-4,5-difluorophenol, 3-amino-4,6-difluorophenol, 3-amino-5,6-difluorophenol, 3-amino-2,4,5-trifluorophenol, 3-amino-4,5,6-trifluorophenol, 3-amino-tetrafluorophenol, 3-amino-2-(trifluoromethyl) phenol, 3-amino-4-(trifluoromethyl) phenol, 3-amino-5-(trifluoromethyl) phenol, 3-amino-2,4-di(trifluoromethyl) phenol, 3-amino-2,5-(trifluoromethyl) phenol, 3-amino-4,5-di(trifluoromethyl) phenol, 3-amino-4,6-di(trifluoromethyl) phenol, 3-amino-5,6-di(trifluoromethyl) phenol, 3-amino-2,4,5-tri(trifluoromethyl) phenol, 3-amino-4,5,6-tri(trifluoromethyl) phenol, 3-amino-tetra(trifluoromethyl) phenol, 4-amino-2-fluorophenol, 4-amino-3-fluorophenol, 4-amino-2,3-difluorophenol, 4-amino-2,5-difluorophenol, 4-amino-2,6-difluorophenol, 4-amino-2,3,5-trifluorophenol, 4-amino-2,3,6-trifluorophenol, 4-amino-tetrafluorophenol, 4-amino-2-(trifluoromethyl) phenol, 4-amino-3-(trifluoromethyl) phenol, 4-amino-2,3-di(trifluoromethyl) phenol, 4-amino-2,5-di(trifluoromethyl) phenol, 4-amino-2,6-di(trifluoromethyl) phenol, 4-amino-2,3,5-tri(trifluoromethyl) phenol, 4-amino-2,3,6-tri(trifluoromethyl) phenol, 4-amino-tetra(trifluoromethyl) phenol, 5-amino-2-fluoro-1-hydroxy naphthalene, 5-amino-3-fluoro-1-hydroxy naphthalene, 5-amino-4-fluoro-1-hydroxy naphthalene, 5-amino-2,3-difluoro-1-hydroxy naphthalene, 5-amino-2,4-difluoro-1-hydroxy naphthalene, 5-amino-2,6-difluoro-1-hydroxy naphthalene, 5-amino-2,7-difluoro-1-hydroxy naphthalene, 5-amino-2,8-difluoro-1-hydroxy naphthalene, 5-amino-3,4-difluoro-1-hydroxy naphthalene, 5-amino-3,8-difluoro-1-hydroxy naphthalene, 5-amino-4,8-difluoro-1-hydroxy naphthalene, 5-amino-2,3,4-trifluoro-1-hydroxy naphthalene, 5-amino-2,3,6-trifluoro-1-hydroxy naphthalene, 5-amino-2,3,7-trifluoro-1-hydroxy naphthalene, 5-amino-2,3,8-trifluoro-1-hydroxy naphthalene, 5-amino-2,3,6,7-tetrafluoro-1-hydroxy naphthalene, 5-amino-hexafluoro-1-hydroxy naphthalene, 2-amino-1-fluoro-6-hydroxy naphthalene, 2-amino-3-fluoro-6-hydroxy naphthalene, 2-amino-4-fluoro-6-hydroxy naphthalene, 2-amino-1,3-difluoro-6-hydroxy naphthalene, 2-amino-1,4-difluoro-6-hydroxy naphthalene, 2-amino-1,5-difluoro-6-hydroxy naphthalene, 2-amino-3,4-difluoro-6-hydroxy naphthalene, 2-amino-3,5-difluoro-6-hydroxy naphthalene, 2-amino-4,5-difluoro-6-hydroxy naphthalene, 2-amino-1,3,4-trifluoro-6-hydroxy naphthalene, 2-amino-1,3,5-trifluoro-6-hydroxy naphthalene, 2-amino-3,4,5-trifluoro-6-hydroxy naphthalene, 2-amino-1,3,4,5-tetrafluoro-6-hydroxy naphthalene, 2-amino-hexafluoro-6-hydroxy naphthalene, bis(4-amino-2,3-difluorophenyl) methane, bis(4-amino-2,6-difluorophenyl) methane, bis(4-hydroxy-3,5-difluorophenyl) methane, bis(4-hydroxytetrafluorophenyl) methane, 4,4'-bis(2-amino-hexafluoroisopropyl) diphenyl ether, 4,4'-isopropylidene bis(2,6-difluoroaniline), 3,5-bis(trifluoromethyl) benzamide oxime, 5-(trifluoromethyl)pyridine-2-alboxyamide oxime, 2-amino-tetrafluoroethanol, 3-amino-hexafluoro-1-propanol, 4-amino-2,2',3,3'-tetrafluoro-1-butanol, 4-amino-octafluoro-1-butanol, 5-amino-perfluoro-1-pentanol, 6-amino-perfluoro-1-hexanol, 7-amino-perfluoro-1-heptanol, 8-amino-perfluoro-1-octanol, and HO—R—NH$_2$ compounds whose fluorine atom was replaced by a bromine atom or a chlorine atom.

The HO—R—NLH compound [L and R have the same meaning as defined in the general formula (I)] includes 2-(N-methylamino)-3-fluorophenol, 2-(N-methylamino)-4-fluorophenol, 2-(N-methylamino)-3,4-difluorophenol, 2-(N- methylamino)-3,5-difluorophenol, 2-(N-methylamino)-3,6-difluorophenol, 2-(N-methylamino)-3,4,5-trifluorophenol, 2-(N-methylamino)-3,4,6-trifluorophenol, 2-(N-methylamino)-tetrafluorophenol, 3-(N-methylamino)-2-fluorophenol, 3-(N-methylamino)-4-fluorophenol, 3-(N-methylamino)-5-fluorophenol, 3-(N-methylamino)-2,4-difluorophenol, 3-(N-methylamino)-2,5-fluorophenol, 3-(N-methylamino)-4,5-difluorophenol, 3-(N-methylamino)-4,6-difluorophenol, 3-(N-methylamino)-5,6-difluorophenol, 3-(N-methylamino)-2,4,5-trifluorophenol, 3-(N-methylamino)-4,5,6-trifluorophenol, 3-(N-methylamino) tetrafluorophenol, 4-(N-methylamino)-2-fluorophenol, 4-(N-methylamino)-3-fluorophenol, 4-(N-methylamino)-2,3-difluorophenol, 4-(N-methylamino)-2,5-difluorophenol, 4-(N-methylamino)-2,6-difluorophenol, 4-(N-methylamino)-2,3,5-trifluorophenol, 4-(N-methylamino)-2,3,6-trifluorophenol, 4-(N-methylamino) tetrafluorophenol, 5-(N-methylamino)-2-fluoro-1-hydroxy naphthalene, 5-(N-methylamino)-3-fluoro-1-hydroxy naphthalene, 5-(N-methylamino)-4-fluoro-1-hydroxy naphthalene, 5-(N-methylamino)-2,3-difluoro-1-hydroxy naphthalene, 5-(N-methylamino)-2,4-difluoro-1-hydroxy naphthalene, 5-(N-methylamino)-2,6-difluoro-1-hydroxy naphthalene, 5-(N-methylamino)-2,7-difluoro-1-hydroxy naphthalene, 5-(N-methylamino)-2,8-difluoro-1-hydroxy naphthalene, 5-(N-methylamino)-3,4-difluoro-1-hydroxy naphthalene, 5-(N-methylamino)-3,8-difluoro-1-hydroxy naphthalene, 5-(N-methylamino)-4,8-difluoro-1-hydroxy naphthalene, 5-(N-methylamino)-2,3,4-trifluoro-1-hydroxy naphthalene, 5-(N-methylamino)-2,3,6-trifluoro-1-hydroxy naphthalene, 5-(N-methylamino)-2,3,7-trifluoro-1-hydroxy naphthalene, 5-(N-methylamino)-2,3,8-trifluoro-1-hydroxy naphthalene, 5-(N-methylamino)-2,3,6,7-tetrafluoro-1-hydroxy naphthalene, 5-(N-methylamino) hexafluoro-1-hydroxy naphthalene, 2-(N-methylamino)-1-fluoro-6-hydroxy naphthalene, 2-(N-methylamino)-3-fluoro-6-hydroxy naphthalene, 2-(N-methylamino)-4-fluoro-6-hydroxy naphthalene naphthalene, 2-(N-methylamino)-1,3-difluoro-6-hydroxy naphthalene, 2-(N-methylamino)-1,4-difluoro-6-hydroxy naphthalene, 2-(N-methylamino)-1,5-difluoro-6-hydroxy naphthalene, 2-(N-methylamino)-3,4-difluoro-6-hydroxy naphthalene, 2-(N-methylamino)-3,5-difluoro-6-hydroxy naphthalene, 2-(N-methylamino)-4,5-difluoro-6-hydroxy naphthalene, 2-(N-methylamino)-1,3,4-trifluoro-6-hydroxy naphthalene, 2-(N-methylamino)-1,3,5-trifluoro-6-hydroxy naphthalene, 2-(N-methylamino)-3,4,5-trifluoro-6-hydroxy naphthalene, 2-(N-methylamino)-1,3,4,5-tetrafluoro-6-hydroxy naphthalene, 2-(N-methylamino) hexafluoro-6-hydroxy naphthalene, bis(4-(N-methylamino)-2,3-difluorophenyl) methane, bis(4-(N-methylamino)-2,6-difluorophenyl) methane, bis(4-hydroxy-3,5-difluorophenyl) methane, bis(4-hydroxytetrafluorophenyl) methane, 4,4'-bis(2-(N-methylamino) hexafluoroisopropyl) diphenyl ether, 4,4'-isopropylidene bis (2,6-difluoroaniline), 2-(N-methylamino) tetrafluoroethanol, 3-(N-methylamino) hexafluoro-1-propanol, 4-(N-methylamino)-2,2',3,3'-tetrafluoro-1-butanol, 4-(N-methylamino) octafluoro-1-butanol, 5-(N-methylamino) perfluoro-1-pentanol, 6-(N-methylamino) perfluoro-1-hexanol, 7-(N-methylamino) perfluoro-1-heptanol, 8-(N-methylamino) perfluoro-1-octanol, 2-(N-trifluoromethylamino)-3-fluorophenol, 2-(N-trifluoromethylamino)-4-fluorophenol, 2-(N-trifluoromethylamino)-3,4-difluorophenol, 2-(N-trifluoromethylamino)-3,5-difluorophenol, 2-(N-trifluoromethylamino)-3,6-difluorophenol, 2-(N-trifluoromethylamino)-3,4,5-trifluorophenol, 2-(N-trifluoromethylamino)-3,4,6-trifluorophenol, 2-(N-trifluoromethylamino) tetrafluorophenol, 3-(N-trifluoromethylamino)-2-fluorophenol, 3-(N-trifluoromethylamino)-4-fluorophenol, 3-(N-trifluoromethylamino)-5-fluorophenol, 3-(N-trifluoromethylamino)-2,4-difluorophenol, 3-(N-trifluoromethylamino)-2,5-fluorophenol, 3-(N-trifluoromethylamino)-4,5-difluorophenol, 3-(N-trifluoromethylamino)-4,6-difluorophenol, 3-(N-trifluoromethylamino)-5,6-difluorophenol, 3-(N-trifluoromethylamino)-2,4,5-trifluorophenol, 3-(N-trifluoromethylamino)-4,5,6-trifluorophenol, 3-(N-trifluoromethylamino) tetrafluorophenol, 4-(N-trifluoromethylamino)-2-fluorophenol, 4-(N-trifluoromethylamino)-3-fluorophenol, 4-(N-trifluoromethylamino)-2,3-difluorophenol, 4-(N-trifluoromethylamino)-2,5-difluorophenol, 4-(N-trifluoromethylamino)-2,6-difluorophenol, 4-(N-trifluoromethylamino)-2,3,5-trifluorophenol, 4-(N-trifluoromethylamino)-2,3,6-trifluorophenol, 4-(N-trifluoromethylamino) tetrafluorophenol, 5-(N-trifluoromethylamino)-2-fluoro-1-hydroxy naphthalene, 5-(N-trifluoromethylamino)-3-fluoro-1-hydroxy naphthalene, 5-(N-trifluoromethylamino)-4-fluoro-1-hydroxy naphthalene, 5-(N-trifluoromethylamino)-2,3-difluoro-1-hydroxy naphthalene, 5-(N-trifluoromethylamino)-2,4-difluoro-1-hydroxy naphthalene, 5-(N-trifluoromethylamino)-2,6-difluoro-1-hydroxy naphthalene, 5-(N-trifluoromethylamino)-2,7-difluoro-1-hydroxy naphthalene, 5-(N-trifluoromethylamino)-2,8-difluoro-1-hydroxy naphthalene, 5-(N-trifluoromethylamino)-3,4-difluoro-1-hydroxy naphthalene, 5-(N-trifluoromethylamino)-3,8-difluoro-1-hydroxy naphthalene, 5-(N-trifluoromethylamino)-4,8-difluoro-1-hydroxy naphthalene, 5-(N-trifluoromethylamino)-2,3,4-trifluoro-1-hydroxy naphthalene, 5-(N-trifluoromethylamino)-2,3,6-trifluoro-1-hydroxy naphthalene, 5-(N-trifluoromethylamino)-2,3,7-trifluoro-1-hydroxy naphthalene, 5-(N-trifluoromethylamino)-2,3,8-trifluoro-1-hydroxy naphthalene, 5-(N-trifluoromethylamino)-2,3,6,7-tetrafluoro-1-hydroxy naphthalene, 5-(N-trifluoromethylamino) hexafluoro-1-hydroxy naphthalene, 2- (N-trifluoromethylamino)-1-fluoro-6-hydroxy naphthalene, 2-(N-trifluoromethylamino)-3-fluoro-6-hydroxy naphthalene, 2-(N-trifluoromethylamino)-4-fluoro-6-hydroxy naphthalene, 2-(N-trifluoromethylamino)-1,3-difluoro-6-hydroxy naphthalene, 2-(N-trifluoromethylamino)-1,4-difluoro-6-hydroxy naphthalene, 2-(N-trifluoromethylamino)-1,5-difluoro-6-hydroxy naphthalene, 2-(N-trifluoromethylamino)-3,4-difluoro-6-hydroxy naphthalene, 2-(N-trifluoromethylamino)-3,5-difluoro-6-hydroxy naphthalene, 2-(N-trifluoromethylamino)-4,5-difluoro-6-hydroxy naphthalene, 2-(N-trifluoromethylamino)-1,3,4-trifluoro-6-hydroxy naphthalene, 2-(N-trifluoromethylamino)-1,3,5-trifluoro-6-hydroxy naphthalene, 2-(N-trifluoromethylamino)-3,4,5-trifluoro-6-hydroxy naphthalene, 2-(N-trifluoromethylamino)-1,3,4,5-tetrafluoro-6-hydroxy naphthalene, 2-(N-trifluoromethylamino) hexafluoro-6-hydroxy naphthalene, bis(4-(N-trifluoromethylamino)-2,3-difluorophenyl) methane, bis(4-(N-trifluoromethylamino)-2,6-difluorophenyl) methane, bis(4-hydroxy-3,5-difluorophenyl) methane, bis (4-hydroxytetrafluorophenyl) methane, 4,4-bis(2-(N-trifluoromethylamino) hexafluoroisopropyl) diphenyl ether,4,4'-isopropylidene bis(2,6-difluoroaniline), 2-(N-trifluoromethylamino) tetrafluoroethanol, 3-(N-trifluoromethylamino) hexafluoro-1-propanol, 4-(N-trifluoromethylamino)-2,2',3,3'-tetrafluoro-1-butanol, 4-(N-trifluoromethylamino) octafluoro-1-butanol, 5-(N-trifluoromethylamino) perfluoro-1-pentanol, 6-(N-trifluoromethylamino) perfluoro-1-hexanol, 7-(N-trifluoromethylamino) perfluoro-1-heptanol, 8-(N- trifluoromethylamino) perfluoro-1-octanol, and HO—R—NLH compounds whose fluorine atom was replaced by a bromine atom or chlorine atom.

The H₂N—R—NHL compound [L and R have the same meaning as defined in the general formula (I)] includes 2-(N-methylamino)-3-fluoroaniline, 2-(N-methylamino)-4-fluoroaniline, 2-(N-methylamino)-3,4-difluoroaniline, 2-(N-methylamino)-3,5-difluoroaniline, 2-(N-methylamino)-3,6-difluoroaniline, 2-(N-methylamino)-3,4,5-trifluoroaniline, 2-(N-methylamino)-3,4,6-trifluoroaniline, 2-(N-methylamino) tetrafluoroaniline, 3-(N-methylamino)-2-fluoroaniline, 3-(N-methylamino)-4-fluoroaniline, 3-(N-methylamino)-5-fluoroaniline, 3-(N-methylamino)-2,4-difluoroaniline, 3-(N-methylamino)-2,5-fluoroaniline, 3-(N-methylamino)-4,5-difluoroaniline, 3-(N-methylamino)-4,6-difluoroaniline, 3-(N-methylamino)-5,6-difluoroaniline, 3-(N-methylamino)-2,4,5-trifluoroaniline, 3-(N-methylamino)-4,5,6-trifluoroaniline, 3-(N-methylamino) tetrafluoroaniline, 4-(N-methylamino)-2-fluoroaniline, 4-(N-methylamino)-3-fluoroaniline, 4-(N-methylamino)-2,3-difluoroaniline, 4-(N-methylamino)-2,5-difluoroaniline, 4-(N-methylamino)-2,6-difluoroaniline, 4-(N-methylamino)-2,3,5-trifluoroaniline, 4-(N-methylamino)-2,3,6-trifluoroaniline, 4-(N-methylamino) tetrafluoroaniline, 5-amino-2-fluoro-1-(N-methylamino) naphthalene, 5-amino-3-fluoro-1-(N-methylamino) naphthalene, 5-amino-4-fluoro-1-(N-methylamino) naphthalene, 5-amino-2,3-difluoro-1-(N-methylamino) naphthalene, 5-amino-2,4-difluoro-1-(N-methylamino) naphthalene, 5-amino-2,6-difluoro-1-(N-methylamino) naphthalene, 5-amino-2,7-difluoro-1-(N-methylamino) naphthalene, 5-amino-2,8-difluoro-1-(N-methylamino) naphthalene, 5-amino-3,4-difluoro-1-(N-methylamino) naphthalene, 5-amino-3,8-difluoro-1-(N-methylamino) naphthalene, 5-amino-4,8-difluoro-1-(N-methylamino) naphthalene, 5-amino-2,3,4-trifluoro-1-(N-methylamino) naphthalene, 5-amino-2,3,6-trifluoro-1-(N-methylamino) naphthalene, 5-amino-2,3,7-trifluoro-1-(N-methylamino) naphthalene, 5-amino-2,3,8-trifluoro-1-(N-methylamino) naphthalene, 5-amino-2,3,6,7-tetrafluoro-1-(N-methylamino) naphthalene, 5-amino-hexafluoro-1-(N-methylamino) naphthalene, 2-amino-1-fluoro-6-(N-methylamino) naphthalene, 2-amino-3-fluoro-6-(N-methylamino) naphthalene, 2-amino-4-fluoro-6-(N-tnethylamino) naphthalene naphthalene, 2-amino-1,3-difluoro-6-(N-methylamino) naphthalene, 2-amino-1,4-difluoro-6-(N-methylamino) naphthalene, 2-amino-1,5-difluoro-6-(N-methylamino) naphthalene, 2-amino-3,4-difluoro-6-(N-methylamino) naphthalene, 2-amino-3,5-difluoro-6-(N-methylamino) naphthalene, 2-amino-4,5-difluoro-6-(N-methylamino) naphthalene, 2-amino-1,3,4-trifluoro-6-(N-methylamino) naphthalene, 2-amino-1,3,5-trifluoro-6-(N-methylamino) naphthalene, 2-amino-3,4,5-trifluoro-6-(N-methylamino) naphthalene, 2-amino-1,3,4,5-tetrafluoro-6-(N-methylamino) naphthalene, 2-amino-hexafluoro-6-(N-methylamino) naphthalene, 4-amino-4'-(N-methylamino)-2,3,4,5-tetrafluorobiphenyl, 4-amino-4'-(N-methylamino)-2,2',4,4'-tetrafluorobiphenyl, 4-amino-4'-(N-methylamino)-2,2',3,3',4,4',5,5',6,6'-octafluorobiphenyl, (4-amino-2,3-difluorophenyl) (4-(N-methylamino)-2,3-difluorobiphenyl) methane, (4-amino-2,6-difluorophenyl) (4-(N-methylamino)-2,6-difluorophenyl) methane, (4-amino-3,5-difluorophenyl) (4-(N-methylamino)-3,5-difluorophenyl) methane, (4-amino-tetrafluorophenyl) (4-(N-methylamino)-tetrafluorophenyl) methane, (4-(2-amino-hexafluoroisopropyl)) (4-(4-(N-methylamino)-hexafluoroisopropyl)) diphenyl ether, 1-amino-2-(N-methylamino) tetrafluoroethane, 1-amino-3-(N-methylamino)-hexafluoropropane, 1-amino-4-(N-methylamino)-2,2',3,3'-hexafluorobutane, 1-amino-4-(N-methylamino)-octafluorobutane, 1-amino-5-(N-methylamino)-decafluoropentane, 1-amino-6-(N-methylamino)-perfluorohexane, 1-amino-7-(N-methylamino)-perfluoropentane, 1-amino-8-(N-methylamino)-perfluorooctane, (4-bromotetrafluorophenyl) hydrazine, 2-chloro-6-fluorophenyl hydrazine, 3-chloro-4-fluorophenyl hydrazine, 2-chloro-4-(trifluoromethyl) phenyl hydrazine, 2-chloro-5-trifluoromethyl phenyl hydrazine, 2,4-dictoto-6-(trifluoromethyl) phenyl hydrazine, 2,6-dictoto-6-(trifluoromethyl) phenyl hydrazine, 2,4-fluorophenyl hydrazine, 2,5-fluorophenyl hydrazine, 5-fluoro-2-methylphenyl hydrazine, 4-fluorophenyl hydrazine, pentafluorophenyl hydrazine, 4-(trifluoromethoxy) phenyl hydrazine, 2-(trifluoromethyl) phenyl hydrazine, 2-amino-6-fluoro-purine, 2-amino-6-trifluoromethyl-purine, and H₂N—R—NLH compounds whose fluorine atom was replaced by a bromine atom or chlorine atom.

Preferable among those described above are tetrafluororesorcin, tetrafluorohydroquinone, tetrabromohydroquinone, 1,4-bis(2-hydroxyhexafluoroisopropyl) benzene, 4,4'-bis(2-hydroxyhexafluoroisopropyl) diphenyl, 4,4'-bis(2-hydroxyhexafluoroisopropyl) diphenyl ether, 2,2',3,3'-tetrafluoro-1, 4-butane diol, 2-amino-5-fluoroaniline, 2-amino-6-fluorobenzyl amine, 2,2'-bis(trifluoromethyl)-4,4'-diaminobiphenyl, 3,3'-bis(trifluoromethyl)-4,4'-diaminobiphenyl, 4,40-diaminooctafluorobiphenyl, 2,2-bis (3-amino-4-methylphenyl) hexafluoropropane, 2,2-bis[4-(4-methylphenyl)]-hexafluoropropane, 2,2-bis(4-aminophenyl) hexafluoropropane, 4,40-diaminooctafluorobiphenyl, 5-trifluoromethyl uracil and 4-amino-3-fluorophenol, particularly preferably tetrafluororesorcin, tetrafluorohydroquinone, tetrabromohydroquinone, 4,4'-diaminooctafluorobiphenyl, and 2,2',3,3'-tetrafluoro-1,4-butane diol.

The organoaluminum compound (d) used if necessary in the present invention (also referred to hereinafter as "component (d)") can be exemplified by organoaluminum compounds represented by, for example, the following general formula (VII):

$$R^a{}_n AlT_{3-n} \quad (VII)$$

wherein $R^a$ represents a C1 to C12 hydrocarbon group, T represents a halogen atom or a hydrogen atom, and n is 1 to 3.

In the general formula (VII), $R^a$ is a hydrocarbon group having 1 to 12 carbon atoms, for example an alkyl group, cycloalkyl group or aryl group, specifically a methyl group, ethyl group, n-propyl group, isopropyl group, n-butyl group, isobutyl group, pentyl group, hexyl group, isohexyl group, heptyl group, nonyl group, octyl group, cyclopentyl group, cyclohexyl group, phenyl group and tolyl group. Specifically, the organoaluminum compound (d) includes trialkyl aluminum such as trimethyl aluminum, triethyl aluminum, triisopropyl aluminum, triisobutyl aluminum, trioctyl aluminum, tri-2-ethylhexyl aluminum etc.; alkenyl aluminum such as isoprenyl aluminum etc.; dialkyl aluminum halide such as dimethyl aluminum chloride, diethyl aluminum chloride, diisopropyl aluminum chloride, diisobutyl aluminum chloride, dimethyl aluminum bromide etc.; alkyl aluminum sesquihalide such as methyl aluminum sesquichloride, ethyl aluminum sesquichloride, isopropyl aluminum sesquichloride, butyl aluminum sesquichloride, ethyl aluminum sesquibromide etc.; alkyl aluminum dihalide such as methyl aluminum dichloride, ethyl aluminum dichloride, isopropyl aluminum dichloride, ethyl aluminum dibromide etc.; and alkyl aluminum hydride such as dimethyl aluminum hydride, diethyl aluminum hydride, dihydrophenyl aluminum, diisopropyl aluminum hydride, di-n-butyl aluminum hydride, diisobutyl aluminum hydride, diisohexyl aluminum hydride, diphenyl aluminum hydride, dicyclohexyl aluminum hydride, di-sec-heptyl aluminum hydride, di-sec-nonyl aluminum hydride etc.

As the organoaluminum compound (d), compounds represented by the following general formula (VIII) can also be used.

$$R^a{}_n AlU_{3-n} \quad (VIII)$$

wherein $R^a$ has the same meaning as defined above, U is —$OR^b$ group, —$OSiR^c{}_3$ group, —$OAlR^d{}_2$ group, —$NR^2{}_2$ group, —$SiR^f{}_3$ group or —$N(R^g)AlR^h{}_2$ group, n is 1 to 2, $R^b$, $R^c$, $R^d$ and $R^h$ are each a methyl group, ethyl group, isopropyl group, isobutyl group, cyclohexyl group, phenyl group or the like, $R^e$ is a hydrogen atom, methyl group, ethyl group, isopropyl group, phenyl group, trimethyl silyl group or the like, and $R^f$ and $R^g$ are each a methyl group, ethyl group or the like.

As the organoaluminum compound, the following compounds are specifically used.

(1) Compounds represented by $R^a{}_n Al(OR^b)_{3-n}$, for example, dimethyl aluminum methoxide, diethyl aluminum ethoxide, diisobutyl aluminum methoxide etc., (2) compounds represented by $R^a{}_n Al(OSiR^c{}_3)_{3-n}$, for example, $Et_2Al(OSiMe_3)$, (iso-Bu)$_2$Al (OSiMe$_3$), (iso-Bu)$_2$Al (OSiEt$_3$) etc., (3) compounds represented by $R^a{}_n Al (OAlR^d{}_2)_{3-n}$, for example, $Et_2AlOAlEt_2$, (iso-Bu)$_2$AlOAl(iso-Bu)$_2$ etc., (4) compounds represented by $R^a{}_n Al(NR^e)_{3-n}$, for example, $Me_2AlNEt_2$, $Et_2AlNHMe$, $Me_2AlNHEt$, $Et_2AlN(SiMe_3)_2$, (iso-Bu)$_2$AlN(SiMe$_3$)$_2$ etc., (5) compounds represented by $R^a{}_n Al(SiR^f{}_3)_{3-n}$, for example, (iso-Bu)$_2$AlSiMe$_3$ etc., and (6) compounds represented by $R^a{}_n Al[N(R^g) —AlR^h{}_2]_{3-n}$, for example, $Et_2AlN(Me)AlEt_2$, (iso-Bu)$_2$AlN(Et)Al(iso-Bu)$_2$ etc.

The organoaluminum compounds represented by the general formulae (VII) and (VIII) are preferably compounds represented by the general formula $R^a{}_3Al$ wherein $R^a$ is preferably a C1 to C4 alkyl group.

The above components in the olefin polymerization catalyst according to the present invention are carried on the following solid carrier. As the solid carrier used in the present invention, granular or fine particle solids made of an inorganic or organic compound having a particle diameter of 3 to 300 μm, preferably 5 to 200 μm, are used. The inorganic carrier is preferably a porous oxide, and can be specifically exemplified by $SiO_2$, $Al_2O_3$, $MgO$, $ZrO_2$, $TiO_2$, $B_2O_3$, $CaO$, $ZnO$, $BaO$ and $ThO_2$ or mixtures containing them, for example $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Preferable among these carriers is a carrier based on at least one member selected from the group consisting of $SiO_2$ and $Al_2O_3$. The above inorganic oxide may contain a small amount of carbonates, sulfates, nitrates and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$ Although the properties of such solid carriers are varied depending on the type and process thereof, the specific surface area of the solid carrier used preferably in the present invention is 50 to 1000 m$^2$/g, preferably 100 to 800 m$^2$/g, and the porosity thereof is desirably 0.3 to 2.5 cm$^3$/g. The solid carrier is used if necessary after baking at a temperature of 100 to 1000° C., preferably 150 to 700° C.

Although the properties of such solid carriers are varied depending on the type and process thereof, the specific surface area of the solid carrier used preferably in the present invention is 50 to 1000 m$^2$/g, preferably 100 to 700 m$^2$/g, and the porosity thereof is desirably 0.3 to 2.5 cm$^3$/g. The solid carrier is used if necessary after baking at a temperature of 100 to 1000° C., preferably 150 to 700° C.

The solid carrier which can be used in the present invention includes granular or fine particle solids made of an organic compound having a particle diameter of 3 to 300 μm. The organic compound can be exemplified by (co)polymers formed from C2 to C14 α-olefins such as ethylene, propylene, 1-butene, 4-methyl-1-pentene etc. as the main component or by polymers or copolymers formed from vinyl cyclohexane and styrene as the main component.

Now, the olefin polymerization solid catalyst of the present invention is described in more detail. The first olefin polymerization solid catalyst of the present invention comprises:

a solid carrier, (A) a solid transition metal catalyst component obtained by contacting (a) a compound of a transition metal of the group 4 in the periodic table, containing at least one ligand having a cyclopentadienyl skeleton, (b) an organoaluminum oxy compound, and (c) a multifunctional organic halide represented by the following general formula (I):

$$(Q^1)_o—R—(Q^2)_p \quad (I)$$

wherein R is a (o+p)-valent group containing at least one halogen atom, o and p each represent a positive integer satisfying the relationship (o+p)≧2, $Q^1$ and $Q^2$ each represent —OH, —NH$_2$ or —NLH whereupon L is an arbitrary group selected from a C1 to C20 hydrocarbon group, a C1 to C20 halogen-containing hydrocarbon group, a silicon-containing group, an oxygen-containing group, a sulfur-containing group, a nitrogen-containing group and a phosphorus-containing group, and L and R, N and R, or N and N may be bound to each other to form a ring, and (B) an organoaluminum compound.

The solid transition metal catalyst component (A) can be prepared by mixing and contacting the components (a), (b) and (c) and the solid carrier with each other in an inert hydrocarbon.

The order of mixing these components is arbitrary, but it is desirable that the components (a) and (c) are not directly mixed and contacted with each other. Such direct contact may cause decomposition and deterioration of the component (a), and it is highly possible that the catalytic activity of the finally obtained olefin polymerization catalyst is significantly deteriorated.

The preferable contact order includes, for example:

i) a method wherein component (b) is mixed and contacted with the solid carrier, then component (a) is contacted therewith, and then component (c) is contacted therewith, ii) a method wherein component (b) is mixed and contacted with the solid carrier, then component (c) is contacted therewith, and then component (a) is contacted therewith, iii) a method wherein components (a) and (b) are mixed and contacted with each other, and then the solid carrier and then component (c) are mixed and contacted therewith, iv) a method wherein the solid carrier is contacted with a contacted mixture of components (b) and (c), and then component (a) is mixed and contacted therewith, v) a method wherein component (b) is mixed and contacted with the solid carrier, then component (a) is contacted therewith, then component (c) is contacted therewith, and component (b) is contacted again therewith, vi) a method wherein component (b) is mixed and contacted with the solid carrier, then component (c) is contacted therewith, then component (b) is contacted again therewith, and further component (a) is contacted therewith, and vii) a method wherein components (a) and (b) are first mixed and contacted with each other, then the solid carrier, then component (c) and further again component (b) are mixed and contacted therewith.

The second olefin polymerization catalyst (C-2) according to the present invention comprises:

a solid carrier;
(A) a solid transition metal catalyst component obtained by contacting (a) a compound of a transition metal of the group 4 in the periodic table, containing at least one ligand having a cyclopentadienyl skeleton, (b) an organoaluminum oxy compound, (c) a multifunctional organic halide represented by the general formula (I), and (d) an organoaluminum compound, and
(B) an organoaluminum compound.

The solid transition metal catalyst component (A) can be prepared by mixing and contacting the components (a), (b), (c) and (d) and the solid carrier with each other in an inert hydrocarbon.

The order of mixing these components is arbitrary, but for the same reason as described above, it is desirable that the components (a) and (c) are not directly mixed and contacted with each other.

The preferable contact order includes, for example:

i) a method wherein component (b) is mixed and contacted with the solid carrier, then component (a) is contacted therewith, and then components (c) and (d), or a contacted mixture of components (c) and (d), is contacted therewith, ii) a method wherein component (b) is mixed and contacted with the solid carrier, then component (c) is contacted therewith, and then component (a) or (d) is contacted therewith, iii) a method wherein components (a) and (b) are first mixed and contacted with each other, and then the solid carrier and then components (c) and (d) or a contacted mixture of components (c) and (d) are mixed and contacted therewith, and iv) a method wherein the solid carrier is contacted with a contacted mixture of components (b) and (c), and then component (a) or (d) is mixed and contacted therewith.

The organoaluminum compound (B) used if necessary in the present invention (also referred to hereinafter as "component (B)") can be exemplified by the same organoaluminum compounds as for component (d), among which the organoaluminum compounds represented by the general formulae $R^a{}_3Al$, $R^a{}_nAl(OR^b)_{3-n}$, and $R^a{}_nAl(OAlR^d{}_2)_{3-n}$ are preferable wherein $R^a$ is preferably an isoalkyl group and n is preferably 2.

In the present invention, in mixing the respective components the component (a) is used in an amount of $10^{-6}$ to $5\times10^{-4}$ mole, preferably $5\times10^{-6}$ to $2\times10^{-4}$ mole, per g of the solid carrier, and the concentration of the component (a) is in the range of $10^{-5}$ to $10^{-2}$ mole/L in the solvent, preferably $5\times10^{-5}$ to $5\times10^{-3}$ mole/L in the solvent. The component (b) is used in an amount of 10 to 1000, preferably 50 to 500, in terms of the atomic ratio (Al/transition metal) of aluminum (Al) derived from the component (b) to the transition metal derived from the component (a). The component (c) is used in an amount of 0.01 to 5.0 moles, preferably 0.02 to 1.0 mole, more preferably 0.03 to 0.5 mole, per mole of aluminum derived from the component (b). When the component (d) is used, the component (d) is used such that the gram atomic ratio (Al-d/Al-b) of the aluminum atom (Al-d) in the component (d) to the aluminum atom (Al-b) in the component (b) becomes 0.01 to 2.0, preferably 0.02 to 1.0.

The mixing temperature in mixing the respective components is −50 to 150° C., preferably −20 to 120° C., and the contacting time is 1 to 1000 minutes, preferably 5 to 600 minutes. During mixing and contacting, the mixing temperature may be changed.

In a preferable contacting mode of the present invention, there is a method wherein components (b) and (c) are previously mixed and contacted with each other in an inert hydrocarbon to prepare a solution containing the components (b) and (c) mixed and contacted therein, and then the solution is mixed and contacted with the other components. When the components (b) and (c) are to be mixed and contacted with each other, the concentration of component (b) is 0.01 to 5 moles/L in the solvent, preferably 0.1 to 3 moles/L in the solvent. The amount of component (c) is desirably 0.01 to 5.0 moles, preferably 0.02 to 1.0 mole, more preferably 0.03 to 0.5 mole, per mole of aluminum derived from the component (b). The mixing temperature in mixing and contacting the components (b) and (c) is −90° C. to 150° C., preferably −80° C. to 120° C., and the contacting time is 1 to 1000 minutes, preferably 5 to 600 minutes.

Specific examples of the inert hydrocarbon used in preparing the catalyst in the present invention include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane, or mixtures thereof.

In the first olefin polymerization catalyst (C-1) according to the present invention, it is preferable that per g of the solid carrier, the transition metal atom derived from the component (a) is carried in an amount of $10^{-4}$ to $5\times10^{-2}$ gram atom, preferably $5.0\times10^{-4}$ to $2\times10^{-2}$ gram atom, the aluminum atom derived from the component (b) is carried in an amount of $10^{-4}$ to 1.0 gram atom, preferably $5\times10^{-3}$ to $5\times10^{-1}$ gram atom, and the component (c) is carried in an amount of $5\times10^{-5}$ to $5\times10^{-2}$ mole, desirably $10^{-5}$ to $10^{-2}$ mole. The component (B) used if necessary is used desirably in an amount of 500 moles or less, preferably 1 to 200 moles, per gram atom of the transition metal atom derived from the component (a).

In the second olefin polymerization catalyst (C-2) according to the present invention, it is preferable that per g of the solid carrier, the transition metal atom derived from the component (a) is carried in an amount of $5\times10^{-5}$ to $5\times10^{-2}$ gram atom, preferably $10^{-5}$ to $10^{-2}$ gram atom, the aluminum atom derived from the components (b) and (d) is carried in an amount of $10^{-3}$ to 1.0 gram atom, preferably $5.0\times10^{-3}$ to $5\times10^{-1}$ gram atom, and the component (c) is carried in an amount of $5\times10^{-5}$ to $5\times10^{-2}$ mole, desirably $10^{-5}$ to $10^{-2}$ mole. The component (B) used if necessary is used desirably in an amount of 500 moles or less, preferably 1 to 200 moles, per gram atom of the transition metal atom derived from the component (a).

The first and second olefin polymerization catalysts (C-1) and (C-2) can be used as such, or may be used after the olefin polymerization catalyst may be pre-polymerized with an olefin to form a pre-polymerized catalyst. The pre-polymerization will be described later in detail.

The third olefin polymerization catalyst (C-3) according to the present invention is characterized in that a polymer having a Z-average molecular weight of 6,000,000 or more by gel permeation chromatography and having a die-swell ratio of 1.4 or more, obtained by contacting ethylene, or ethylene and a C4 to C10 α-olefin, with a catalyst comprising a solid carrier, (A) a solid transition metal catalyst component obtained by contacting (a) a compound of a transition metal of the group 4 in the periodic table, containing at least one ligand having a cyclopentadienyl skeleton, (b) an organoaluminum oxy compound, and (c) a multifunctional organic halide represented by the general formula (I), and if necessary (B) an organoaluminum compound, wherein 0.01 to 1000 g of the polymer is pre-polymerized per g of the solid transition metal catalyst component.

The solid transition metal catalyst component used in the present invention can be prepared by mixing and contacting the components (a), (b) and (c) and the solid carrier with each other in an inert hydrocarbon. The order of mixing these components is arbitrary, but it is desirable that the components (a) and (c) are not directly mixed and contacted with each other. Such direct contact may cause decomposition and deterioration of the component (a), and it is highly possible that the catalytic activity of the finally obtained olefin polymerization catalyst is significantly deteriorated. The preferable contact order includes, for example:

(i) a method wherein component (b) is mixed and contacted with the solid carrier, then component (a) is contacted therewith, and then component (c) is contacted therewith, (ii) a method wherein component (b) is mixed and contacted with the solid carrier, then component (c) is contacted therewith, and then component (a) is contacted therewith, (iii) a method wherein components (a) and (b) are first mixed and contacted with each other, and then the solid carrier and then component (c) are mixed and contacted therewith, (iv) a method wherein the solid carrier is contacted with a contacted mixture of components (b) and (c), and then component (a) is mixed and contacted therewith, (v) a method wherein component (b) is mixed and contacted with the solid carrier, then component (a) is contacted therewith, then component (c) is contacted therewith, and component (b) is contacted again therewith, (vi) a method wherein component (b) is mixed and contacted with the solid carrier, then component (c) is contacted therewith, then component (b) is contacted again therewith, and further component (a) is contacted therewith, and (vii) a method wherein components (a) and (b) are first mixed and contacted with each other, then the solid carrier, then component (c) and further again component (b) are mixed and contacted therewith.

The fourth olefin polymerization catalyst (C-4) according to the present invention is characterized in that a polymer having a Z-average molecular weight of 6,000,000 or more by gel permeation chromatography and having a die-swell ratio of 1.4 or more, obtained by contacting ethylene, or ethylene and a C4 to C10 α-olefin, with a catalyst comprising a solid carrier, (A) a solid transition metal catalyst component obtained by contacting (a) a compound of a transition metal of the group 4 in the periodic table, containing at least one ligand having a cyclopentadienyl skeleton, (b) an organoaluminum oxy compound, (c) a multifunctional organic halide represented by the general formula (I), and (d) an organoaluminum compound, and (B) an organoaluminum compound, wherein 0.01 to 1000 g of the polymer is pre-polymerized per g of the solid transition metal catalyst component.

The solid transition metal catalyst component can be prepared by mixing and contacting the components (a), (b), (c) and (d) and the solid carrier with each other in an inert hydrocarbon. The order of mixing these components is arbitrary, but for the same reason as described above, it is desirable that the components (a) and (c) are not directly mixed and contacted with each other.

The preferable contact order includes, for example:

(i) a method wherein component (b) is mixed and contacted with the solid carrier, then component (a) is contacted therewith, and then components (c) and (d), or a contacted mixture of components (c) and (d), is contacted therewith, (ii) a method wherein component (b) is mixed and contacted with the solid carrier, then component (c) is contacted therewith, and then component (a) or (d) is contacted therewith, (iii) a method wherein components (a) and (b) are first mixed and contacted with each other, and then the solid carrier and then components (c) and (d) or a contacted mixture of components (c) and (d) are mixed and contacted therewith, and (iv) a method wherein the solid carrier is contacted with a contacted mixture of components (b) and (c), and then component (a) or (d) is mixed and contacted therewith.

When the respective components are mixed in the process of preparing the solid catalyst component of the present invention, in mixing the respective components, the component (a) is used in an amount of $10^{-6}$ to $5 \times 10^{-4}$ mole, preferably $5 \times 10^{-6}$ to $2 \times 10^{-4}$ mole, per g of the solid carrier, and the concentration of the component (a) is in the range of $10^{-5}$ to $10^{-2}$ mole/L in the solvent, preferably $5 \times 10^{-5}$ to $5 \times 10^{-3}$ mole/L in the solvent. The component (b) is used in an amount of 10 to 1000, preferably 50 to 500, in terms of the atomic ratio (Al/transition metal) of aluminum (Al) derived from the component (b) to the transition metal derived from the component (a). The component (c) is used in an amount of 0.01 to 5.0 moles, preferably 0.02 to 1.0 mole, more preferably 0.03 to 0.5 mole, per mole of aluminum derived from the component (b). When the component (d) is used, the component (d) is used in such an amount that the gram atomic ratio (Al-d/Al-b) of the aluminum atom (Al-d) in the component (d) to the aluminum atom (Al-b) in the component (b) becomes 0.01 to 2.0, preferably 0.02 to 1.0.

The mixing temperature in mixing the respective components is −50 to 150° C., preferably −20 to 120° C., and the contacting time is 1 to 1000 minutes, preferably 5 to 600 minutes. During mixing and contacting, the mixing temperature may be changed.

In a preferable contacting mode in the process for preparing the solid catalyst component in the present invention, there is a method wherein components (b) and (c) are previously mixed and contacted with each other in an inert hydrocarbon to prepare a solution containing components (b) and (c) mixed and contacted therein, and then the solution is mixed and contacted with the other components. When the components (b) and (c) are to be mixed and contacted with each other, the concentration of component (b) is 0.01 to 5 moles/L in the solvent, preferably 0.1 to 3 moles/L in the solvent. The amount of component (c) is desirably 0.01 to 5.0 moles, preferably 0.02 to 1.0 mole, more desirably 0.03 to 0.5 mole, per mole of aluminum derived from the component (b). The mixing time in mixing and contacting the components (b) and (c) is −90° C. to 150°

C., preferably −80° C. to 120° C., and the contacting time is 1 to 1000 minutes, preferably 5 to 600 minutes.

Specific examples of the inert hydrocarbon used in preparing the solid catalyst component in the present invention include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane, or mixtures thereof.

In the third solid catalyst component (C-3) according to the present invention, it is preferable that per g of the solid carrier, the transition metal atom derived from the component (a) is carried in an amount of $10^{-4}$ to $5\times10^{-2}$ gram atom, preferably $5.0\times10^{-4}$ to $2\times10^{-2}$ gram atom, the aluminum atom derived from the component (b) is carried in an amount of $10^{-4}$ to 1.0 gram atom, preferably $5\times10^{-3}$ to $5\times10^{-1}$ gram atom, and the component (c) is carried in an amount of $5\times10^{-5}$ to $5\times10^{-2}$ mole, desirably $10^{-5}$ to $10^{-2}$ mole.

In the fourth solid catalyst component (C-4) according to the present invention, it is preferable that per g of the solid carrier, the transition metal atom derived from the component (a) is carried in an amount of $5\times10^{-5}$ to $5\times10^{-2}$ gram atom, preferably $10^{-5}$ to $10^{-2}$ gram atom, the aluminum atom derived from the components (b) and (d) is carried in an amount of $10^{-3}$ to 1.0 gram atom, preferably $5\times10^{-3}$ to $5\times10^{-1}$ gram atom, and the component (c) is carried in an amount of $5\times10^{-5}$ to $5\times10^{-2}$ mole, desirably $10^{-5}$ to $10^{-2}$ mole.

The third and fourth olefin polymerization catalysts (C-3) and (C-4) according to the present invention are produced by pre-polymerizing ethylene and α-olefin in the presence of the solid catalyst components, and the Z-average molecular weight of the pre-polymer obtained by such pre-polymerization is 6,000,000 or more as determined by gel permeation chromatography, and the die-swell ratio thereof is 1.4 or more.

The α-olefin used in pre-polymerization includes propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Among these, ethylene or a combination of ethylene and the α-olefin used in polymerization is particularly preferable. The polymerization system may be any of batch, semi-continuous and continuous systems, and an arbitrary method can be selected from slurry polymerization, gaseous-phase polymerization and solution polymerization methods.

The polymerization solvent used in slurry polymerization or solution polymerization includes, for example, aliphatic hydrocarbons such as propane, butane, pentane, hexane, heptane, octane, decane, dodecane and kerosene; alicyclic hydrocarbons such as cyclopentane, cyclohexane and methylcyclohexane; aromatic hydrocarbons such as benzene, toluene and xylene; halogenated hydrocarbons such as ethylene chloride, chlorobenzene, dichloromethane and chloroform. These solvents may be used alone or as a mixture of two or more thereof. The olefin itself can also be used as the solvent.

In the pre-polymerization, the component (a) is used in an amount (in terms of transition metal) of $10^{-6}$ to $5\times10^{-4}$ mole, preferably $5\times10^{-6}$ to $2\times10^{-4}$ mole, per g of the solid carrier. The component (b) is used in an amount of 10 to 1000, preferably 50 to 500, in terms of the atomic ratio (Al/transition metal) of aluminum (Al) in the component (b) to the transition metal in the component (a). The component (c) is used in an amount of 0.01 to 5.0 mole, preferably 0.02 to 1.0 mole, more preferably 0.03 to 0.5 mole, per mole of the component (b). When the component (d) is to be used, the component (d) is used in such an amount that the gram atomic ratio (Al-d/Al-b) of the aluminum atom (Al-d) in the component (d) to the aluminum atom (Al-b) in the component (b) is 0.01 to 5.0, preferably 0.02 to 1.0.

The concentration in the pre-polymerization system using the transition metal compound (a) or the solid catalyst component formed from the respective components is usually $10^{-6}$ to $2\times10^{-1}$ mole/L, desirably $5\times10^{-5}$ to $10^{-1}$ mole/L, in terms of transition metal per of polymerization volume.

The pre-polymerization temperature is −20 to 90° C., preferably 0 to 80° C., the pre-polymerization time is 0.5 to 100 hours, preferably 1 to 80 hours, and the pre-polymerization pressure is normal pressure to 10 MPa, preferably normal pressure to 5 MPa.

In the pre-polymerization, the same olefin as used in polymerization described later is usually used, but preferably an olefin based on ethylene is used.

In the pre-polymerized catalyst, an olefin may be introduced into an olefin polymerization catalyst suspension prepared by using an inert hydrocarbon solvent, or an olefin polymerization catalyst formed in an inert hydrocarbon solvent may be separated from the suspension and then suspended again in an inert hydrocarbon, followed by introducing an olefin into the resulting suspension.

By pre-polymerization, an olefin polymer (preliminary polymer) is desirably formed in an amount of 0.01 to 1000 g, preferably 0.1 to 800 g, more preferably 0.2 to 500 g, per g of the solid carrier.

The slurry concentration is preferably lower to increase the molecular weight of the prepolymer obtained by pre-polymerization, but in consideration of productivity, the concentration of the solid catalyst component per L of the solvent is 0.5 to 500 g/ml, preferably 1 to 400 g/ml. The Z-average molecular weight as one property of the prepolymer obtained by pre-polymerization is preferably in the range of 6,000,000 to 100,000,000, more preferably 7,000,000 to 100,000,000. The die-swell ratio meaning the presence of long branches, as another property of the prepolymer, is preferably in the range of 1.4 to 5.0, more preferably 1.7 to 3.0.

The number-average molecular weight (Mn), weight-average molecular weight (Mw) and Z-average molecular weight (Mz) were calculated from a molecular-weight distribution curve obtained from a Waters model "Alliance GPC 2000" gel permeation chromatograph (high-temperature size exclusion chromatograph). The operation conditions are as follows:

<<Used apparatus and Conditions>>

Measurement apparatus: Gel permeation chromatograph Alliance GPC 2000 model (Waters)

Analysis software: Chromatography data system Empower (Waters)

Columns: TSK gel $GMH_6$-HT×2+TSK gel $GMH_6$-HTL×2 (inner diameter 7.5 mm×length 30 cm, Tosoh Corporation)

Mobile phase: o-dichlorobenzene [=ODCB] (special grade, Wako Pure Chemical Industries, Ltd.)

Detector: Differential refractometer (built-in meter in the apparatus)

Column temperature: 140° C.

Flow rate: 1.0 mL/min.

Injection volume: 500 μL

Sampling interval: 1 second

Sample concentration: 0.15% (w/v)

Molecular weight calibration: From monodisperse polystyrene (Tosoh Corporation)/molecular weight 495.

A molecular weight of 20,600,000, molecular weight distribution, and various average molecular weights were calculated as PE equivalent molecular weight according to widely used calibration procedures described in a literature [Z. Crubisic, P. Rempp, H. Benoit, *J. Polym. Sci.*, B5, 753 (1967)]

The die-swell ratio of the polymer obtained by pre-polymerization was determined by the following method.

[Preparation of A Measurement Sample]

To prevent a scatter of physical properties, the resulting pre-polymerized catalyst was subjected to melt kneading by the following method. 0.1 wt % Irganox 1076 (Ciba Specialty Chemicals) and 0.1 wt % Irgafos 168 (Ciba Specialty Chemicals) were added as heat stabilizers to the resulting pre-polymerized catalyst which was then melt-kneaded at a resin temperature of 180° C. at a revolution number of 50 rpm for 5 minutes in a Laboplast mill manufactured by Toyo Seiki Seisaku-sho, Ltd. This melted pre-polymerized catalyst was cooled under the conditions of a cooling temperature of 20° C., a cooling time of 5 minutes and a press pressure of 100 kg/cm$^2$ with a press molding machine manufactured by Shinto Metal Industries, Ltd.

[Measurement of Die-swell Ratio (SR)]

The die-swell ratio (SR) was measured by a capillary rheometer (Capillograph 1B (barrel diameter 10 mmϕ)) manufactured by Toyo Seiki Seisaku-sho, Ltd. The measurement sample, 10 g, was melted at a temperature of 190° C. for 6 minutes and then extruded at an extrusion speed of 5.0 mm/min. through a capillary shown in FIGS. 6 and 7. A strand extruded by about 30 mm from an outlet of the capillary was sampled and cooled at room temperature for 1 minute. The diameter of the strand was measured at arbitrary five points, and the average diameter was indicated as strand diameter. A value obtained by dividing the strand diameter by the capillary diameter (4.5 mm) was indicated as die-swell ratio (SR).

Then, the method of polymerizing an olefin according to the present invention is described. In the present invention, olefin polymerization is carried out in the presence of the olefin polymerization catalyst described above. The polymerization can be carried out in liquid phase polymerization such as suspension polymerization or in gaseous phase polymerization. In the liquid phase polymerization, the same inert hydrocarbon as used in producing the olefin polymerization catalyst described above can be used as the solvent, or the olefin itself can also be used as the solvent.

When olefin polymerization is conducted by using the olefin polymerization catalyst of the present invention, the above catalyst is used in an amount of $10^{-6}$ to $2\times10^{-2}$ mole/L (polymerization volume), desirably $5\times10^{-5}$ to $10^{-2}$ mole/L (polymerization volume), in terms of the concentration of the transition metal atom derived from the component (a) in the polymerization system. If desired, an organoaluminum oxy compound may be used. The amount of the organoaluminum oxy compound used is desirably in the range of 0 to 500 moles per gram atom of the transition metal atom derived from the component (a).

When the slurry polymerization is carried out, the polymerization temperature of the olefin is desirably in the range of −50 to 100° C., preferably 0 to 90° C., and when the liquid phase polymerization is carried out, the polymerization temperature is desirably in the range of 0 to 250° C., preferably 20 to 200° C. When the gaseous phase polymerization is carried out, the polymerization temperature is desirably in the range of 0 to 120° C., desirably 20 to 100° C. The polymerization pressure is under the conditions of normal pressure to 10 MPa, preferably normal pressure to 5 MPa, and the polymerization reaction can also be carried out in any method of a batch, semi-continuous or continuous system. The polymerization can also be carried out in two or more stages different in reaction conditions.

The molecular weight of the resulting olefin polymer can be regulated by allowing hydrogen to be present in the polymerization system or by changing the polymerization temperature. The olefin polymerizable by the olefin polymerization catalyst of the present invention includes ethylene and C4 to C10 α-olefins such as 1-butene, 1-pentene, 1-hexene, 4-methyl-1-pentene, 1-octene and 1-decene; and C5 to C20 cyclic olefins such as cyclopentene, cycloheptene, norbornene, 5-methyl-2-norbornene, tetracyclododecene and 2-methyl-1,4,5,8-dimethano-1,2,3,4,4a,5,8,8a-octahydronapht halene. Further, styrene, vinyl cyclohexane and diene can be used.

The bulk density of the resulting olefin polymer is 0.2 to 0.6 g/cc, more preferably 0.3 to 0.55 g/ml. The bulk density was determined according to JIS K-6721.

(3) Use of the Ethylene-Based Polymer

A thermoplastic resin composition excellent in moldability and mechanical strength is obtained by blending the ethylene-based polymer according to the present invention with another thermoplastic resin. The blending ratio of the ethylene-based polymer of the present invention to another thermoplastic resin is 99.1/0.1 to 0.1/99.9.

As another thermoplastic resin, crystalline thermoplastic resin such as polyolefin, polyamide, polyester and polyacetal, and non-crystalline thermoplastic resin such as polystyrene, acrylonitrile/butadiene/styrene copolymer (ABS), polycarbonate, polyphenylene oxide and polyacrylate are used. Polyvinyl chloride is also preferably used.

Specific examples of the polyolefin include an ethylene based polymer, propylene based polymer, butene based polymer, 4-methyl-1-pentene based polymer, 3-methyl-1-butene based polymer, hexene based polymer etc. Among these polymers, an ethylene based polymer, propylene based polymer and 4-methyl-1-pentene based polymer are preferable, and when an ethylene based polymer is used, it may be either the ethylene based polymer according to the present invention or a conventional ethylene based polymer, or maybe an ethylene/polar group-containing vinyl copolymer, but the conventional ethylene based polymer is more preferable.

Specific examples of the polyester include aromatic polyesters such as polyethylene terephthalate, polyethylene naphthalate, polybutylene terephthalate etc.; and polycaprolactone, polyhydroxybutyrate etc.

Specific examples of the polyamide include aliphatic polyamides such as nylon-6, nylon-66, nylon-10, nylon-12, nylon-46 etc. and aromatic polyamides produced from aromatic dicarboxylic acid and aliphatic diamine.

Specific examples of the polyacetal include polyformaldehyde (polyoxymethylene), polyacetaldehyde, polypropione aldehyde, polybutyl aldehyde etc. Among these, polyformaldehyde is particularly preferable.

The polystyrene may be a homopolymer of styrene or a binary copolymer of styrene and acrylonitrile, methyl methacrylate or α-methyl styrene.

The ABS used is preferably ABS containing 20 to 35 mol % constitutional unit derived from acrylonitrile, 20 to 30 mol % constitutional unit derived from butadiene and 40 to 60 mol % constitutional unit derived from styrene.

The polycarbonate includes polymers obtained from bis (4-hydroxyphenyl)methane, 1,1-bis(4-hydroxyphenyl) ethane, 2,2-bis(4-hydroxyphenyl)propane, 2,2-bis(4-hydroxyphenyl) butane etc. In particular, a polycarbonate obtained from 2,2-bis(4-hydroxyphenyl)propane is preferable.

As the polyphenyloxide, poly(2,6-dimethyl-1,4-phenylene oxide) is preferably used.

As the polyacrylate, polymethyl methacrylate or polybutyl acrylate is preferably used.

The thermoplastic resins described above may be used alone or as a mixture of two or more thereof. The thermoplastic resin is particularly preferably polyolefin, more preferably an ethylene-based polymer.

In addition to the thermoplastic resin described above, additives such as a weatherability stabilizer, a heat stabilizer, an antistatic agent, a slip inhibitor, an anti-blocking agent, a haze inhibitor, a lubricant, a pigment, a dye, a nucleating agent, a plasticizer, an aging inhibitor, an HCl absorber and an antioxidant may be incorporated into the ethylene-based polymer according to the present invention if needed in such a range that the object of the present invention is not hindered.

The ethylene-based polymer according to the present invention, and a resin composition containing the ethylene-based polymer, can be processed into a molded product, preferably a film, excellent in moldability and mechanical strength.

The ethylene-based polymer of the present invention is processed by general film molding, blow molding, injection molding and extrusion molding. The film molding includes extrusion lamination molding, T-die film molding, inflation molding (air cooling, water cooling, multi-stage cooling, high-speed processing) etc. The resulting film can be used as a single-layer film, but can be endowed with various functions by conversion into a multilayer film. In this case, co-extrusion in each of the above molding methods can be mentioned. For lamination of hardly co-extruded paper and barrier film (aluminum foil, vapor-deposited film, coating film or the like), attaching lamination molding methods such as extrusion lamination molding and dry lamination can be mentioned. Preparation of a high-function product by forming it into a multilayer through blow molding, injection molding, or extrusion molding in co-extrusion molding, is also feasible in the same manner as film molding.

Molded products by processing the ethylene-based polymer of the present invention, and a thermoplastic resin composition containing the ethylene-based polymer, include films, blown transfusion bags, blown bottles, tubes, pipes and ruptured pipes by extrusion molding, injection moldings such as articles for daily use, fibers, and large molded products by rotational molding.

Films obtained by processing the ethylene-based polymer of the present invention, and a thermoplastic resin composition containing the ethylene-based polymer, are suitable for water-wrapping bags, liquid soap-wrapping bags, liquid paper containers, laminated cloth rolls, liquid wrapping bags of special shape (standing pouch etc.), specification bags, heavy bags, wrapping film, sugar bags, oil bags, various films such as food-wrapping films, transfusion bags and agricultural materials. Further, the film may be used as a multilayer film by attaching it to a base material such as nylon, polyester etc.

Hereinafter, the present invention is described in more detail by reference to the Examples, but the present invention is not limited to the Examples.

EXAMPLES

Hereinafter, the present invention is described in more detail by reference to the Examples, but the present invention is not limited to the Examples.

☆Preparation of Solid Components (S1) to (S3)☆

Preparation of Solid Component (S1)

30 g silica ($SiO_2$) dried at 250° C. for 10 hours in a nitrogen stream was suspended in 460 mL toluene and then cooled to 0° C. 140 mL solution of methyl alumoxane (component b: a product of Mitsui Chemicals, Inc.) (1.52 mmol/mL in terms of Al atom) in toluene was added dropwise to the suspension over 1 hour during which the temperature in the system was kept at 0 to 2° C. Subsequently, the mixture was reacted at 0° C. for 30 minutes, then heated to 95° C. over 1.5 hours and reacted at this temperature for 4 hours. Thereafter, the temperature of the reaction mixture was decreased to 60° C., and the supernatant was removed by decantation. The solid component thus obtained was washed 3 times with toluene, and toluene was added thereto to prepare slurry of the solid component (S1) in toluene. A part of the resulting solid component (S1) was collected to examine its concentration, indicating that the slurry concentration was 0.124 g/mL and the Al concentration was 0.463 mmol/mL.

Preparation of Solid Component (S2)

13 g silica ($SiO_2$) dried at 250° C. for 10 hours in a nitrogen stream was suspended in 100 mL toluene and then cooled to 0° C. 52.6 mL solution of methyl alumoxane (component b: a product of Albemarle) (1.75 mmol/mL in terms of Al atom) in toluene was added dropwise to the suspension over 1 hour during which the temperature in the system was kept at 0 to 2° C. Subsequently, the mixture was reacted at 0° C. for 30 minutes, then heated to 95° C. over 1.5 hours and reacted at this temperature for 4 hours. Thereafter, the temperature of the reaction mixture was decreased to 60° C., and the supernatant was removed by decantation. The solid component thus obtained was washed 4 times with toluene, and toluene was added thereto to prepare slurry of the solid component (S2) in toluene. A part of the resulting solid component (S) was collected to examine its concentration, indicating that the slurry concentration was 0.1216 g/mL and the Al concentration was 0.575 mmol/mL. A part of the supernatant was collected to examine its concentration, indicating that the Al concentration was not higher than 0.001 mmol/mL.

Preparation of Solid Component (S3)

The solid component (S3) was prepared in the same manner as for the solid component (S2) except that it was twice that the resulting solid component after the reaction of methyl alumoxane was washed with toluene. A part of the resulting solid component (S3) was collected to examine its concentration, indicating that the slurry concentration was 0.1665 g/mL and the Al concentration was 0.697 mmol/mL. A part of the supernatant was collected to examine its concentration, indicating that the Al concentration was 0.0042 mmol/mL.

☆Preparation of Solid Catalyst Components (X-1) to (X-4)☆

Preparation of Solid Catalyst Component (X-1)

50 mL toluene was introduced into a 200-mL glass flask flushed previously with nitrogen, and then charged under stirring with the slurry of the solid component (S1) in toluene (2.0 g in terms of solids content) prepared above.

Then, 33.9 mL solution of ethylene bis(indenyl) zirconium dichloride (component a) (0.0011 mmol/mL in terms of Zr atom) in toluene was added dropwise thereto, and the mixture was reacted at room temperature for 2 hours. Thereafter, the supernatant was removed by decantation, and the remaining solids were washed 3 times with toluene and converted into 100 mL toluene slurry. Then, 135.8 mg tetrafluorohydroquinone (component c) was introduced thereinto at room temperature, and the mixture was heated to 40° C. and reacted for 30 minutes. Thereafter, the supernatant was removed by decantation, and the remaining solids were washed 3 times with toluene and converted into 50 mL toluene slurry. 50 mL solution of removed methyl alumoxane (component b) (0.15 mmol/mL in terms of Al atom) in toluene, from which trimethyl aluminum had been distilled away, was added dropwise thereto at room temperature over 15 minutes, and then the mixture was heated to 40° C. and reacted for 30 minutes. Thereafter, the supernatant was removed by decantation, and the remaining solids were washed 3 times with toluene and 3 times with hexane, followed by adding 100 mL decane, to prepare slurry of the solid catalyst component (X-1) in decane. A part of the resulting slurry of the solid catalyst component (X-1) in decane was collected to examine its concentration, indicating that the Zr concentration was 0.0263 mg/mL, and the Al concentration was 3.61 mg/mL.

Preparation of Solid Catalyst Component (X-2)

50 mL toluene was introduced into a 200-mL glass flask flushed previously with nitrogen, and then charged under stirring with slurry of a solid component in toluene (2.0 g in terms of solids content and 9.9 mmol in terms of Al atom), prepared in the same manner (reaction temperature and reaction time) as for the solid component (S1). Then, 32.6 mL solution of ethylene bis(indenyl) zirconium dichloride (component a) (0.001525 mmol/mL in terms of Zr atom) in toluene was added dropwise thereto, and the mixture was reacted at room temperature for 2 hours. Thereafter, the supernatant was removed by decantation, and the remaining solids were washed 3 times with toluene and converted into 100 mL toluene slurry. Then, 363.1 mg tetrafluorohydroquinone (component c) was introduced thereinto at room temperature, and the mixture was heated to 40° C. and reacted for 30 minutes. Thereafter, the supernatant was removed by decantation, and the remaining solids were washed 3 times with toluene and converted into 50 mL toluene slurry. 50 mL solution of methyl alumoxane (component b, a product of Albemarle) (0.199 mmol/mL in terms of Al atom) in toluene was added dropwise thereto over 10 minutes, and the mixture was heated to 40° C. and reacted for 30 minutes. Thereafter, the supernatant was removed by decantation, and the remaining solids were washed 3 times with toluene and 3 times with decane, followed by adding 75 mL decane, to prepare slurry of the solid catalyst component (X-2) in decane. A part of the resulting slurry of the solid catalyst component (X-2) in decane was collected to examine its concentration, indicating that the Zr concentration was 0.0258 mg/mL, and the Al concentration was 2.88 mg/mL.

Preparation of Solid Catalyst Component (X-3)

208 mL toluene was introduced into a 400-mL glass flask flushed previously with nitrogen, and then charged under stirring with the slurry of the solid component (S2) in toluene (8.0 g in terms of solids content) prepared above. Then, 126 mL solution of ethylene bis(indenyl) zirconium dichloride (component a) (0.0015mmol/mL in terms of Zr atom) in toluene was added dropwise thereto, and the mixture was reacted at room temperature for 2 hours. Thereafter, the supernatant was removed by decantation, and the remaining solids were washed once with toluene and converted into 250 mL toluene slurry. Then, 150 mL solution of 1.377 g tetrafluorohydroquinone (component c) in toluene was introduced thereinto at room temperature, and the mixture was heated to 40° C. and reacted for 30 minutes. Thereafter, the supernatant was removed by decantation, and the remaining solids were washed once with toluene and converted into 250 mL toluene slurry. 150 mL solution of methyl alumoxane (component b, a product of Albemarle) (0.253 mmol/mL in terms of Al atom) in toluene was added dropwise thereto over 10 minutes, and the mixture was heated to 40° C. and reacted for 30 minutes. Thereafter, the supernatant was removed by decantation, and the remaining solids were washed 3 times with toluene and 3 times with decane, followed by adding 150 mL decane, to prepare slurry of the solid catalyst component (X-3) in decane. A part of the resulting slurry of the solid catalyst component (X-3) in decane was collected to examine its concentration, indicating that the Zr concentration was 0.0892 mg/mL, and the Al concentration was 11.2 mg/mL.

Preparation of Solid Catalyst Component (X-4)

100 mL toluene was introduced into a 400-mL glass flask flushed previously with nitrogen, and then charged under stirring with the slurry of the solid component (S3) in toluene (4.0 g in terms of solids content) prepared above. Then, 55.7 mL solution of ethylene bis(indenyl) zirconium dichloride (component a) (0.0015 mmol/mL in terms of Zr atom) in toluene was added dropwise thereto, and the mixture was reacted at room temperature for 2 hours. Thereafter, the supernatant was removed by decantation, and the remaining solids were washed once with toluene and converted into 100 mL toluene slurry. Then, 100 mL solution of 608.1 mg tetrafluorohydroquinone (component c) in toluene was introduced thereinto at room temperature, and the mixture was heated to 40° C. and reacted for 30 minutes. Thereafter, the supernatant was removed by decantation, and the remaining solids were washed once with toluene and converted into 100 mL toluene slurry. 100 mL solution of methyl alumoxane (component b, a product of Albemarle) (0.167 mmol/mL in terms of Al atom) in toluene was added dropwise thereto over 10 minutes, and the mixture was heated to 40° C. and reacted for 30 minutes. Thereafter, the supernatant was removed by decantation, and the remaining solids were washed 3 times with toluene and 3 times with decane, followed by adding 75 mL decane, to prepare slurry of the solid catalyst component (X-4) in decane. A part of the resulting slurry of the solid catalyst component (X-4) in decane was collected to examine its concentration, indicating that the Zr concentration was 0.069 mg/mL, and the Al concentration was 9.23 mg/mL.

☆Preparation of Pre-polymerized Catalysts☆

Preparation of Pre-polymerized Catalyst (Q-1)

500 mL purified heptane was introduced into an SUS autoclave having an internal volume of 1 liter purged sufficiently with nitrogen, and the liquid phase and gaseous phase were saturated with ethylene by blowing ethylene. The autoclave was charged in an ethylene atmosphere at 20° C. with 0.375 mmol triisobutyl aluminum (component B) and the solid catalyst component (X-3) (0.0254 mmol in terms of zirconium atom) in this order. Polymerization was carried out at 20° C. for 8 hours at an ethylene pressure of 0.78 MPa·G, and then the autoclave was depressurized, and the ethylene in the autoclave was replaced by nitrogen. The reaction mixture was transferred into a 1-L container sufficiently purged with nitrogen, and then washed 3 times. with decane, and decane was added thereto to prepare slurry of the pre-polymerized catalyst component (Q-1) in decane. A part of the resulting slurry of the pre-polymerized catalyst component (Q-1) in decane was collected to examine the slurry concentration and the amount of the pre-polymerized catalyst, indicating that the slurry concentration was 0.1693 g/mL, and the amount of the pre-polymerized catalyst per g of the solid catalyst component was 31 g/g solid catalyst component. When gel permeation chromatography (GPC) and die-swell ratio (SR) of the polymer obtained by pre-polymerization were measured, the Mw of the prepolymer was $75.4 \times 10^4$, the Mz was $735.6 \times 10^4$, and the SR was 1.8.

Example 1

Polymerization (Two-stage Polymerization)

<Former stage> 500 mL purified heptane was introduced into an SUS autoclave having an internal volume of 1 liter purged sufficiently with nitrogen, and the liquid phase and gaseous phase were saturated with ethylene by blowing ethylene. The autoclave was charged in an ethylene atmosphere at 20° C. with 0.375 mmol triisobutyl aluminum (component B) and the solid catalyst component (X-1) prepared above (0.004 mmol in terms of zirconium atom) in this order. Polymerization was carried out at 20° C. for 30 minutes at an ethylene pressure of 0.78 MPa·G, and then the autoclave was depressurized, and the ethylene in the autoclave was replaced by nitrogen.

<Latter stage> Then, the atmosphere in the system was replaced by a hydrogen/ethylene mixed gas (hydrogen concentration: 0.55 vol %), and then 10 mL 1-hexene was added thereto, and the mixture was heated to 80° C. and polymerized for 20 minutes at an ethylene pressure of 0.78 MPa·G. The resulting polymer was vacuum-dried for 10 hours to give 35.6 g ethylene/1-hexene copolymer.

To prepare a measurement sample, 0.1 wt % Irganox 1076 (Ciba Specialty Chemicals) and 0.1 wt % Irgafos 168 (Ciba Specialty Chemicals) were added as a heat stabilizer to the resulting ethylene-based polymer which was then melt-kneaded at a resin temperature of 180° C. at a revolution number of 50 rpm for 5 minutes in a Laboplast mill manufactured by Toyo Seiki Seisaku-sho, Ltd. This melted polymer was cooled under the conditions of a cooling temperature of 20° C., a cooling time of 5 minutes and a cooling pressure of 100 kg/cm$^2$ with a press molding machine manufactured by Shinto Metal Industries, Ltd. The physical properties of the sample were measured. The results are shown in Tables 1 and 2.

Example 2

Polymerization (Two-stage Polymerization)

Polymerization was conducted in the same manner as in Example 1 except that the polymerization time of 20 minutes in the latter stage was changed to 14 minutes. The resulting polymer was vacuum-dried for 10 hours to give 23.3 g ethylene/1-hexene copolymer.

Using the resulting ethylene-based polymer, a measurement sample was prepared in the same manner as in Example 1. The physical properties of the sample were measured. The results are shown in Tables 1 and 2.

Example 3

Polymerization (Two-stage Polymerization)

Polymerization was conducted in the same manner as in Example 1 except that the polymerization time of 20 minutes in the latter stage was changed to 27 minutes. The resulting polymer was vacuum-dried for 10 hours to give 46.7 g ethylene/1-hexene copolymer.

Using the resulting ethylene-based polymer, a measurement sample was prepared in the same manner as in Example 1. The physical properties of the sample were measured. The results are shown in Tables 1 and 2.

Example 4

500 mL purified heptane was introduced into an SUS autoclave having an internal volume of 1 liter purged sufficiently with nitrogen, and the liquid phase and gaseous phase were saturated with ethylene by blowing ethylene. Then, the atmosphere in the system was replaced by a hydrogen/ethylene mixed gas (hydrogen concentration: 0.45 vol %), and then 60 mL 1-hexene, 0.375 mmol triisobutyl aluminum (component B) and 1.5 g pre-polymerized catalyst component (Q-1) were introduced thereinto in this order. The mixture was heated to 70° C. and polymerized for 90 minutes at a pressure of 0.78 MPa·G. The resulting polymer was vacuum-dried for 10 hours to give 61.4 g ethylene/1-hexene copolymer.

Using the resulting ethylene-based polymer, a measurement sample was prepared in the same manner as in Example 1. The physical properties of the sample were measured. The results are shown in Tables 1 and 2.

Example 5

500 mL purified heptane was introduced into an SUS autoclave having an internal volume of 1 liter purged sufficiently with nitrogen, and the liquid phase and gaseous phase were saturated with ethylene by blowing ethylene. Then, the atmosphere in the system was replaced by a hydrogen/ethylene mixed gas (hydrogen concentration: 0.55 vol %), and then 7.5 mL 1-hexene, 0.375 mmol triisobutyl aluminum (component B) and 1.44 g pre-polymerized catalyst component (Q-1) were introduced thereinto in this order. The mixture was heated to 90° C. and polymerized for 90 minutes at a pressure of 0.78 MPa·G. The resulting polymer was vacuum-dried for 10 hours to give 15.6 g ethylene/1-hexene copolymer.

Using the resulting ethylene-based polymer, a measurement sample was prepared in the same manner as in Example 1. The physical properties of the sample were measured. The results are shown in Tables 1 and 2.

Example 6

500 mL purified heptane was introduced into an SUS autoclave having an internal volume of 1 liter purged sufficiently with nitrogen, and the liquid phase and gaseous phase were saturated with ethylene by blowing ethylene. Then, the atmosphere in the system was replaced by a hydrogen/ethylene mixed gas (hydrogen concentration: 0.83 vol %), and then 15 mL 1-hexene, 0.375 mmol triisobutyl aluminum (component B) and 1.5 g pre-polymerized catalyst component (Q-1) were introduced thereinto in this order. The mixture was heated to 8° C. and polymerized for 270 minutes at a pressure of 0.78 MPa·G. The resulting polymer was vacuum-dried for 10 hours to give 50.8 g ethylene/1-hexene copolymer.

Using the resulting ethylene-based polymer, a measurement sample was prepared in the same manner as in Example 1. The physical properties of the sample were measured. The results are shown in Tables 1 and 2.

Example 7

Polymerization (Two-stage Polymerization)

<Former stage> 500 mL purified heptane was introduced into an SUS autoclave having an internal volume of 1 liter purged sufficiently with nitrogen, and the liquid phase and gaseous phase were saturated with ethylene by blowing ethylene. The autoclave was charged in an ethylene atmosphere at 20° C. with 0.375 mmol triisobutyl aluminum (component B) and the solid catalyst component (X-2) prepared above (0.001 mmol in terms of zirconium atom) in this order. Polymerization was carried out at 20° C. for 6 hours at an ethylene pressure of 0.78 MPa·G, and then the autoclave was depressurized, and the ethylene in the autoclave was replaced by nitrogen.

<Latter stage> Then, the atmosphere in the system was replaced by a hydrogen/ethylene mixed gas (hydrogen concentration: 0.38 vol %), and then 30 mL 1-hexene was added thereto, and the mixture was heated to 70° C. and polymerized for 160 minutes at a pressure of 0.78 MPa·G. The resulting polymer was vacuum-dried for 10 hours to give 44.8 g ethylene/1-hexene copolymer.

Using the resulting ethylene-based polymer, a measurement sample was prepared in the same manner as in Example 1. The physical properties of the sample were measured. The results are shown in Tables 1 and 2.

Example 8

500 mL purified heptane was introduced into an SUS autoclave having an internal volume of 1 liter purged sufficiently with nitrogen, and the liquid phase and gaseous phase were saturated with ethylene by blowing ethylene. Then, the atmosphere in the system was replaced by a hydrogen/ethylene mixed gas (hydrogen concentration: 0.54 vol %), and then 15 mL 1-hexene, 0.375 mmol triisobutyl aluminum (component B) and 1.5 g pre-polymerized catalyst component (Q-1) were introduced thereinto in this order. The mixture was heated to 80° C. and polymerized for 110 minutes at a pressure of 0.78 MPa·G. The resulting polymer was vacuum-dried for 10 hours to give 37.5 g ethylene/1-hexene copolymer.

Using the resulting ethylene-based polymer, a measurement sample was prepared in the same manner as in Example 1. The physical properties of the sample were measured. The results are shown in Tables 1 and 2.

Example 9

Polymerization (Two-stage Polymerization)

<Former stage> 500 mL purified heptane was introduced into an SUS autoclave having an internal volume of 1 liter purged sufficiently with nitrogen, and the liquid phase and gaseous phase were saturated with ethylene by blowing ethylene. The autoclave was charged in an ethylene atmosphere at 20° C. with 0.375 mmol triisobutyl aluminum (component B) and the solid catalyst component (X-4) prepared above (0.002 mmol in terms of zirconium atom) in this order. Polymerization was carried out at 20° C. for 120 minutes at an ethylene pressure of 0.78 MPa·G, and then the autoclave was depressurized, and the ethylene in the autoclave was replaced by nitrogen.

<Latter stage> Then, the atmosphere in the system was replaced by a hydrogen/ethylene mixed gas (hydrogen concentration: 0.83 vol %), and then 15 mL 1-hexene was added thereto, and the mixture was heated to 80° C. and polymerized for 40 minutes at a pressure of 0.78 MPa·G. The resulting polymer was vacuum-dried for 10 hours to give 43.7 g ethylene/1-hexene copolymer.

Using the resulting ethylene-based polymer, a measurement sample was prepared in the same manner as in Example 1. The physical properties of the sample were measured. The results are shown in Tables 1 and 2.

Example 10

Polymerization (Two-stage Polymerization)

<Former stage> 500 mL purified heptane was introduced into an SUS autoclave having an internal volume of 1 liter purged sufficiently with nitrogen, and the liquid phase and gaseous phase were saturated with ethylene by blowing ethylene. The autoclave was charged in an ethylene atmosphere with 20 mL-1-hexene, 0.375 mmol triisobutyl aluminum [component B] and the solid catalyst component (X-2) prepared above (0.002 mmol in terms of zirconium atom) in this order. The mixture was heated to 80° C. and polymerized for 15 minutes at an ethylene pressure of 0.78 MPa·G, and then the autoclave was depressurized, and the ethylene in the autoclave was replaced by nitrogen.

<Latter stage> Then, the atmosphere in the system was replaced by a hydrogen/ethylene mixed gas (hydrogen concentration: 1.25 vol %), and then 10 mL 1-hexene was added thereto, and the mixture was heated to 80° C. and polymerized for 180 minutes at a pressure of 0.78 MPa·G. The resulting polymer was vacuum-dried for 10 hours to give 41.6 g ethylene/1-hexene copolymer.

Using the resulting ethylene-based polymer, a measurement sample was prepared in the same manner as in Example 1. The physical properties of the sample were measured. The results are shown in Tables 1 and 2.

Comparative Example 1

Preparation of Solid Component (S)

179 g silica ($SiO_2$) dried at 250° C. for 10 hours in a nitrogen stream was suspended in 2.75 L toluene and then cooled to 0° C. 810 mL solution of methyl alumoxane (component b) (1.52 mmol/mL interms of Al atom) in toluene was added dropwise to the suspension over 1 hour during which the temperature in the system was kept at 0 to 2° C. Subsequently, the mixture was reacted at 0° C. for 30 minutes, then heated to 95° C. over 1.5 hours and reacted at this temperature for 4 hours. Thereafter, the temperature of the reaction mixture was decreased to 60° C., and the supernatant was removed by decantation. The solid component thus obtained was washed 3 times with toluene, and toluene was added thereto to prepare 1225 mL slurry of the solid component (S) in toluene. A part of the resulting solid component (S) was collected to examine its concentration, indicating that the slurry concentration was 0.203 g/mL and the Al concentration was 0.985 mmol/mL. A part of the solid component (S) was dried and examined for its composition, indicating that 131 mg Al atom was contained per g of the solid component.

Preparation of Solid Catalyst Component (X)

5.00 L solution of ethylene bis(indenyl) zirconium dichloride (component a) (1.21 mmol/L in terms of Zr atom) in toluene was added dropwise under stirring at 75° C. over 30 minutes to the toluene slurry of the solid component (S) prepared above, and the mixture was heated to 80° C. and reacted at this temperature for 2 hours. Thereafter, the supernatant was removed, and the remaining solids were washed twice with hexane, and hexane was added thereto to prepare 3.32 L slurry of the solid catalyst component (X) in hexane. A part of the resulting solid catalyst component (X) was dried and examined for its composition, indicating that 2.1 mg Zr atom was contained per g of the solid catalyst component.

Preparation of Preliminarily Polymerized Catalyst (X')

The hexane slurry of the solid catalyst component (X) obtained above was cooled to 10° C., and then ethylene was fed successively to the system at normal pressures. In this step, the temperature of the system was kept at 10 to 15° C. Thereafter, 133 mL solution of triisobutyl aluminum (component B) in decane (1.0 mmol/mL in terms of Al atom) and 16.6 mL 1-hexene were added thereto to initiate preliminary polymerization. After 15 minutes, the temperature of the system was increased to 35° C., but thereafter, the system temperature was kept at 32 to 35° C. 70 minutes after the preliminary polymerization was initiated, 5.5 mL 1-hexene was added again thereto. Further, 160 minutes and 220 minutes thereafter, 5.5 mL 1-hexene was similarly added thereto.

275 minutes after the preliminary polymerization was initiated, the atmosphere in the system was replaced by nitrogen to terminate the preliminary polymerization. Then, the supernatant was removed, and the remaining solids were washed twice with hexane, to give a preliminarily polymerized catalyst (X') wherein 3 g polymer was preliminarily polymerized per g of the solid catalyst component (X).

Polymerization

Using a continuous fluidized bed gaseous phase polymerizer, ethylene and 1-hexane were copolymerized at a total pressure of 20 kg/cm$^2$-G, at a polymerization temperature of 80° C. and a gas lineal speed of 0.8 m/sec. The preliminarily polymerized catalyst (X') prepared above was dried and fed continuously at a rate of 10 g/hr, while ethylene, 1-hexene, hydrogen and nitrogen were continuously fed so that the gas composition was kept constant during the polymerization (gas composition: 1-hexene/ethylene=1.1×10$^{-2}$, ethylene concentration=62%) The yield of the resulting ethylene/1-hexene copolymer was 6.1 kg/hr.

Using the resulting ethylene-based polymer, a measurement sample was prepared in the same manner as in Example 1. The physical properties of the sample were measured. The results are shown in Tables 1 and 2.

Comparative Example 2

Product pellets of ethylene/1-hexene copolymer (trade name: EVOLUE SP1520) produced by gaseous phase polymerization, commercially available from Mitsui Chemicals, Inc. were used to prepare a measurement sample to evaluate its physical properties. The results are shown in Tables 1 and 2.

Comparative Example 3

Product pellets of ethylene/1-octene copolymer (trade name: Affinity PF1140) produced by solution polymerization, commercially available from Dow Chemical Company, were used to prepare a measurement sample to evaluate its physical properties. The results are shown in Tables 1 and 2.

In Comparative Examples 1, 2 and 3, LNR and MT/η* were outside of the requirements described in claims 1 and 2. Accordingly, the neck-in of the products during molding is estimated to be higher than that of the products in Examples 1 to 9.

Comparative Example 4

Product pellets of polyethylene (trade name: MIRASON M11) produced by high-pressure radical polymerization, commercially available from Mitsui Chemicals, Inc. were used to prepare a measurement sample to evaluate its physical properties. The results are shown in Tables 1 and 2.

In Comparative Example 4, the take-up speed at break (DS) is outside of the requirements described in claim 1. Accordingly, the product is estimated to inferior in high-speed film processability to the products in Examples 1, 2, 4, 5 and 7. Further, the sum of methyl branches and ethyl branches (A+B) is outside of the requirements described in claim 1. Accordingly, the product is estimated to be inferior in mechanical strength to the products in Examples 1 to 9.

Comparative Example 5

Product pellets of ethylene/1-hexene copolymer (trade name: Marlex HHM5502) commercially available from Phillips were used to prepare a measurement sample to evaluate its physical properties. The results are shown in Tables 1 and 2.

In Comparative Example S, LNR and MT/η* are outside of the requirements described in claims 1 and 2. Accordingly, the neck-in of the product during molding is estimated to be higher than that of the products in Examples 1 to 9. Further, the number of terminal vinyl groups (V) per molecular chain is outside of the requirements described in claim 3. Accordingly, the product is estimated to be inferior in thermal stability during molding processing to the products in Examples 1 to 9.

Comparative Example 6

Product pellets of ethylene/1-hexene copolymer (trade name: Toughsen TUF-2060) commercially available from Nippon Unicar Company Limited were used to prepare a measurement sample to evaluate its physical properties. The results are shown in Tables 1 and 2.

Comparative Example 7

Product pellets of ethylene/1-hexene copolymer (trade name: Toughsen TUF-2070) commercially available from Nippon Unicar Company Limited were used to prepare a measurement sample to evaluate its physical properties. The results are shown in Tables 1 and 2.

Comparative Example 8

Product pellets of ethylene/1-hexene copolymer (trade name: Sumikasen-αGZ701) commercially available from Sumitomo Chemical Co., Ltd. were used to prepare a measurement sample to evaluate its physical properties. The results are shown in Tables 1 and 2.

In Comparative Examples 6 to 8, LNR and MT/η* are outside of the requirements described in claims 1 and 2. Accordingly, the neck-in of these products during molding is estimated to be higher than the products in Examples 1 to 9. Further, the relationship between the melting-point maximum peak (Tm) and the density (d) is outside of the requirements described in claim 3. Accordingly, these products are estimated to be inferior in low-temperature sealing properties to the products in Examples 1 to 9.

TABLE 1

| | Comonomer | MFR g/10 min. | Density kg/m³ | MT g | η* P | MT/η* g/P | Sum of Me branches and Et branches (A + B)/1000C | LNR — | DS m/min | *2 | *3 |
|---|---|---|---|---|---|---|---|---|---|---|---|
| Example 1 | Hexene-1 | 6.71 | 945 | 6.4 | $1.85 \times 10^4$ | $3.46 \times 10^{-4}$ | 0.47 | 1.16 | 66 | 36 | 495 |
| Example 2 | Hexene-1 | 5.36 | 948 | 7.8 | $2.08 \times 10^4$ | $3.75 \times 10^{-4}$ | 0.11 | 1.16 | 50 | 32 | 435 |
| Example 3 | Hexene-1 | 6.77 | 945 | 6.5 | $1.88 \times 10^4$ | $3.46 \times 10^{-4}$ | 0.09 | 1.21 | | | |
| Example 4 | Hexene-1 | 16.1 | 900 | 1.6 | $5.88 \times 10^3$ | $2.72 \times 10^{-4}$ | *1 | 1.09 | 131 | 60 | 820 |
| Example 5 | Hexene-1 | 2.43 | 945 | 10.8 | $3.68 \times 10^4$ | $2.93 \times 10^{-4}$ | 0.29 | 1.17 | 38 | 20 | 275 |
| Example 6 | Hexene-1 | 30.7 | 941 | 2.8 | $3.75 \times 10^3$ | $7.46 \times 10^{-4}$ | 0.45 | 1.04 | | | |
| Example 7 | Hexene-1 | 1.93 | 925 | 11 | $4.60 \times 10^4$ | $2.40 \times 10^{-4}$ | 0.36 | 1.06 | 39 | 18 | 241 |
| Example 8 | Hexene-1 | 7.70 | 934 | 3.8 | $1.34 \times 10^4$ | $2.83 \times 10^{-4}$ | 0.21 | 1.18 | | | |
| Example 9 | Hexene-1 | 15.8 | 939 | 7.1 | $8.62 \times 10^3$ | $8.24 \times 10^{-4}$ | 0.64 | 0.94 | | | |
| Example 10 | Hexene-1 | 6.29 | 931 | 9.1 | $2.14 \times 10^4$ | $4.25 \times 10^{-4}$ | 0.25 | 1.07 | | | |
| Comparative Example 1 | Hexene-1 | 1.99 | 919 | 3.9 | $5.94 \times 10^4$ | $6.57 \times 10^{-5}$ | 0.16 | 1.54 | | | |
| Comparative Example 2 | Hexene-1 | 1.86 | 913 | 0.83 | $3.68 \times 10^4$ | $2.25 \times 10^{-5}$ | *1 | 2.86 | | | |
| Comparative Example 3 | Octene-1 | 1.70 | 899 | 2.0 | $5.85 \times 10^4$ | $3.35 \times 10^{-5}$ | *1 | 2.10 | 225 | 16 | 224 |
| Comparative Example 4 | — | 7.06 | 918 | 3.8 | $1.49 \times 10^4$ | $2.56 \times 10^{-4}$ | 9.40 | 1.00 | 33 | 37 | 510 |
| Comparative Example 5 | Hexene-1 | 0.32 | 958 | 12.0 | $1.44 \times 10^5$ | $8.36 \times 10^{-5}$ | *1 | 1.59 | | | |
| Comparative Example 6 | Hexene-1 | 2.47 | 924 | 0.85 | $3.45 \times 10^4$ | $2.47 \times 10^{-5}$ | 0.30 | 2.40 | | | |
| Comparative Example 7 | Hexene-1 | 3.02 | 939 | 0.75 | $2.85 \times 10^4$ | $2.63 \times 10^{-5}$ | 0.27 | 2.43 | | | |
| Comparative Example 8 | Hexene-1 | 5.97 | 921 | 0.27 | $1.46 \times 10^4$ | $1.85 \times 10^{-5}$ | 0.90 | 2.49 | | | |

*1: Detection lower limit (0.02/1000C) or less
*2: Value of $12 \times MFR^{0.577}$
*3: Value of $165 \times MFR^{0.577}$

TABLE 2

| | GPC | | | | | Number of terminal vinyl groups (v)/ 1000C | Number of terminal vinyl groups (V)/ 1 molecular chain | Tm °C. | *4 | *5 |
|---|---|---|---|---|---|---|---|---|---|---|
| | Mn | Mw | Mz | Mw/Mn | Mz/Mw | | | | | |
| Example 1 | 9000 | 84000 | 2800000 | 9.49 | 33.4 | 0.19 | 0.12 | 120.0 | 97.7 | 127.7 |
| Example 2 | 9000 | 110000 | 4100000 | 11.6 | 38.3 | 0.19 | 0.12 | 120.0 | 98.6 | 128.6 |
| Example 3 | 8000 | 82000 | 4400000 | 10.2 | 54.8 | 0.16 | 0.09 | 120.0 | 97.7 | 127.7 |
| Example 4 | 9500 | 52000 | 2000000 | 5.43 | 39.4 | 0.21 | 0.14 | 88.1 | 83.5 | 113.5 |
| Example 5 | 13000 | 97000 | 4000000 | 7.36 | 41.7 | 0.12 | 0.11 | 124.0 | 97.7 | 127.7 |
| Example 6 | 8600 | 91000 | 5200000 | 10.5 | 57.5 | 0.08 | 0.05 | 118.4 | 96.4 | 126.4 |
| Example 7 | 8000 | 92000 | 3900000 | 11.5 | 42.4 | 0.13 | 0.07 | 117.7 | 91.4 | 121.4 |
| Example 8 | 12000 | 80000 | 4300000 | 6.40 | 53.8 | 0.18 | 0.15 | 118.7 | 94.2 | 124.2 |
| Example 9 | 11000 | 94000 | 5300000 | 8.89 | 56.9 | 0.14 | 0.11 | 119.0 | 95.8 | 125.8 |
| Example 10 | 3600 | 82000 | 4300000 | 22.4 | 53.1 | | | | | |
| Comparative Example 1 | 20000 | 79000 | 280000 | 3.96 | 3.57 | 0.07 | 0.10 | 115.6 | 89.5 | 119.5 |
| Comparative Example 2 | 30000 | 73000 | 140000 | 2.41 | 1.96 | 0.08 | 0.17 | 113.6 | 87.6 | 117.6 |
| Comparative Example 3 | 29000 | 62000 | 120000 | 2.15 | 1.95 | 0.03 | 0.07 | 92.1 | 83.2 | 113.2 |
| Comparative Example 4 | 17000 | 150000 | 700000 | 8.55 | 4.78 | 0.04 | 0.05 | 104.1 | 89.2 | 119.2 |
| Comparative Example 5 | 18000 | 100000 | 1200000 | 5.87 | 11.2 | 0.76 | 0.95 | 131.7 | 101.8 | 131.8 |
| Comparative Example 6 | 20000 | 78000 | 310000 | 3.90 | 3.91 | 0.14 | 0.20 | 125.0 | 91.1 | 121.1 |
| Comparative Example 7 | 21000 | 74000 | 280000 | 3.54 | 3.74 | 0.19 | 0.29 | 126.7 | 95.8 | 125.8 |
| Comparative Example 8 | 14000 | 58000 | 170000 | 4.18 | 2.91 | 0.42 | 0.42 | 123.5 | 90.1 | 120.1 |

*4: Value of $0.315 \times d - 200$
*5: Value of $0.315 \times d - 170$

INDUSTRIAL APPLICABILITY

The ethylene-based polymer of the present invention, and a thermoplastic resin composition containing the ethylene-based polymer, are used suitable in molded products, preferably films, excellent in moldability and mechanical strength.

The invention claimed is:

1. An ethylene-based polymer which is an ethylene/C4 to C10 α-olefin copolymer and satisfies the following requirements [k1] to [k3] simultaneously:
   [k1] melt flow rate (MFR) under a loading of 2.16 kg at 190° C. is in the range of 1.0 to 50 g/10 minutes;
   [k2] LNR defined as a scale of neck-in upon film molding is in the range of 0.6 to 1.4; and
   [k3] take-up speed at break [DS (m/min)] at 160° C. and melt flow rate (MFR) satisfy the following relationship (Eq-1):

$$12 \times MFR^{0.577} \leq DS \leq 165 \times MFR^{0.577} \tag{Eq-1}.$$

2. The ethylene-based polymer according to claim 1, which simultaneously satisfies the following requirements [m1] to [m3]:
   [m1] density [d] is in the range of 890 to 950 kg/m$^3$;
   [m2] ratio [MT/η* (g/Poise)] of melt tension [MT (g)] at 190° C. to shearing viscosity [η* (Poise)] at 200° C. at an angular velocity of 1.0 rad/sec. is in the range of $2.00 \times 10^{-4}$ to $9.00 \times 10^{-4}$; and
   [m3] sum [(A+B)(/1000C)] of the number of methyl branches [A (/1000C)] and the number of ethyl branches [B (/1000C)] per 1000 carbon atoms measured by $^{13}$C-NMR is 1.4 or less.

3. The ethylene-based polymer according to claim 1 or 2, which satisfies at least one of the following requirements [n1] to [n3]:
   [n1] ratio (Mz/Mw) of Z-average molecular weight (Mz) to weight-average molecular weight (Mw), measured by GPC, is 10 or more;
   [n2] the number of terminal vinyl groups (V) per molecular chain is not higher than 0.47 per molecular chain and is calculated from the number of terminal vinyl groups [v (/1000C)] per 1000 carbon atoms measured by IR and number-average molecular weight (Mn) measured by GPC; or
   [n3] melting-point maximum peak [Tm (° C.)] in DSC and density (d) satisfy the following relationship (Eq-2):

$$(0.315 \times d) - 200 \leq Tm \leq (0.315 \times d) - 170 \tag{Eq-2}.$$

4. The ethylene-based polymer according to claim 1, which is obtained by polymerization using an olefin polymerization catalyst formed from:
   a solid carrier, and
   (A) a solid transition metal catalyst component obtained by contacting:
   (a) a compound of a transition metal of the group 4 in the periodic table, containing at least one ligand having a cyclopentadienyl skeleton,
   (b) an organoaluminum oxy compound, and
   (c) a multifunctional organic halide represented by the following general formula (I):

$$(Q^1)_o\text{—}R\text{—}(Q^2)_p \tag{I}$$

wherein R is a (o+p)-valent group containing at least one halogen atom, o and p each represent a positive integer satisfying the relationship (o+p)≧2, $Q^1$ and $Q^2$ each represent —OH, —NH$_2$ or —NLH whereupon L is an arbitrary group selected from a C1 to C20 hydrocarbon group, a C1 to C20 halogen-containing hydrocarbon group, a silicon-containing group, an oxygen-containing group, a sulfur-containing group, a nitrogen-containing group or a phosphorus-containing group, and L and R, N and R, or N and N may be bound to each other to form a ring, and if necessary
   (d) an organoaluminum compound, and if necessary
   (B) an organoaluminum compound.

5. The ethylene-based polymer according to claim 4, which is obtained by polymerization in the presence of a catalyst formed from:
   a preliminary polymer having a z-average molecular weight of 6,000,000 or more by GPC and having a die-swell ratio of 1.4 or more, pre-polymerized by ethylene, or ethylene and a C4 to C10 α-olefin, with the solid transition metal catalyst component, wherein 0.01 to 1000 g of the polymer is contained per g of the solid transition metal catalyst component, and if necessary
   (B) an organoaluminum compound.

6. The ethylene-based polymer according to claim 4, wherein the compound (a) of a transition metal of the group 4 in the periodic table, containing at least one ligand having a cyclopentadienyl skeleton, is a compound represented by the following general formula (II), (III) or (IV):

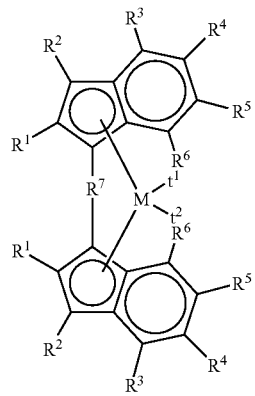

(II)

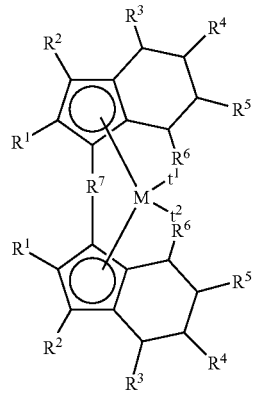

(III)

wherein $R^1$ to $R^6$ are independently selected from a hydrogen atom, a halogen atom, a C1 to C20 alkyl group, a C3 to C20 cycloalkyl group, a C2 to C20 alkenyl group, a C6 to C20 aryl group, and a C7 to C20 arylalkyl group, respectively, or can contain a silicon, halogen or germanium atom, and at least one pair of $R^3$ and $R^4$, $R^4$ and $R^5$, and $R^5$ and $R^6$ may be bound to each other to form a ring, $R^7$ is a divalent group having two ligands, and is a C1 to C20 hydrocarbon group, a C1 to C20 halogen-containing hydrocarbon group, a silicon-containing group or a germanium- or tin-containing group, and two substituent groups on the same carbon, silicon, germanium or tin atom may be bound to each other to form a ring, $t^1$ and $t^2$ independently represent a group selected from a hydrogen atom, a halogen atom, a C1 to C20 hydrocarbon group, a C1 to C20 halogen-containing hydrocarbon group, a silicon-containing group, an oxygen-containing group, a sulfur-containing group, a nitrogen-containing group or a phosphorus-containing group, respectively, and M is a transition metal selected from titanium, zirconium or hafnium,

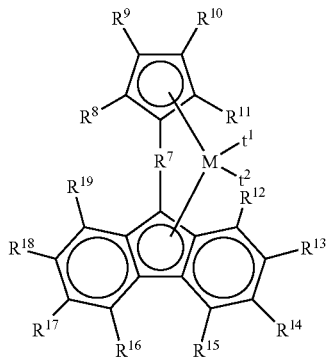

(IV)

wherein $R^7$, $t^1$, $t^2$ and M each have the same meaning as defined in formula (II), $R^8$ to $R^{19}$ independently represent a hydrogen atom, a halogen atom, a C1 to C20 alkyl group, a C3 to C20 cycloalkyl group, a C2 to C20 alkenyl group, a C6 to C20 aryl group or a C7 to C20 arylalkyl group, respectively, and can contain a silicon, halogen or germanium atom, and adjacent substituent groups out of $R^8$ to $R^9$ may be bound to each other to form a ring.

7. A thermoplastic resin composition comprising the ethylene-based polymer according to claim 1.

8. A molded product obtained from the ethylene-based polymer according to claim 1.

9. A molded product obtained from the thermoplastic resin composition according to claim 7.

10. The molded product according to claim 8 or 9, wherein the molded product is a film.

* * * * *